(12) United States Patent
Yamauchi et al.

(10) Patent No.: US 6,497,488 B1
(45) Date of Patent: Dec. 24, 2002

(54) ILLUMINATION SYSTEM AND PROJECTOR

(75) Inventors: Satoshi Yamauchi, Kanagawa (JP);
Kenji Kameyama, Kanagawa (JP);
Kazuya Miyagaki, Kanagawa (JP);
Yasuyuki Takiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 76 days.

(21) Appl. No.: 09/631,791

(22) Filed: Aug. 3, 2000

(30) Foreign Application Priority Data

Aug. 6, 1999 (JP) ............................................ 11-223328
Nov. 15, 1999 (JP) ............................................ 11-324273

(51) Int. Cl.[7] ..................... G03B 21/14; G03B 21/00; G03B 21/26; G02F 1/1335
(52) U.S. Cl. ............................ 353/38; 353/20; 353/31; 353/33; 353/34; 353/37; 349/5; 349/7; 349/8; 349/9
(58) Field of Search ................... 349/5, 7, 8, 9; 353/102, 20, 31, 33, 34, 37, 38

(56) References Cited

U.S. PATENT DOCUMENTS 6,257,726 B1 * 7/2001 Okuyama .................... 353/20
6,273,567 B1 * 8/2001 Conner et al. ................. 353/20
6,344,926 B1 * 2/2002 Arimoto et al. ............. 359/443

FOREIGN PATENT DOCUMENTS

| JP | 3-249639 | 11/1991 | ........... G03B/33/12 |
| JP | 7-294906 | 11/1995 | ........... G02F/1/1335 |
| JP | 8-304739 | 11/1996 | ........... G02B/27/28 |
| JP | 10-161065 | 6/1998 | ........... G02B/27/28 |

* cited by examiner

*Primary Examiner*—Russell Adams
*Assistant Examiner*—Melissa J Koval
(74) *Attorney, Agent, or Firm*—Oblon, Spivak, McClelland, Maier & Neustadt, P.C.

(57) ABSTRACT

An illumination system having a light-emitting unit and a reflecting mirror for condensing light is described. The illumination system includes a lens plate having a plurality of approximately identical lens elements. The lens plate is disposed away from the light-emitting unit and the plurality of lens elements are arranged two-dimensionally and approximately perpendicular to a main optical axis of a projection lens system and an object to be projected. The illumination system further includes first and second lenticules, and at least one convex lens disposed so as to refract a light path of the light flux formed by each of the plurality of lens elements such that the light flux illuminates a surface of the object to be projected after passing through the first and second lenticules.

37 Claims, 48 Drawing Sheets

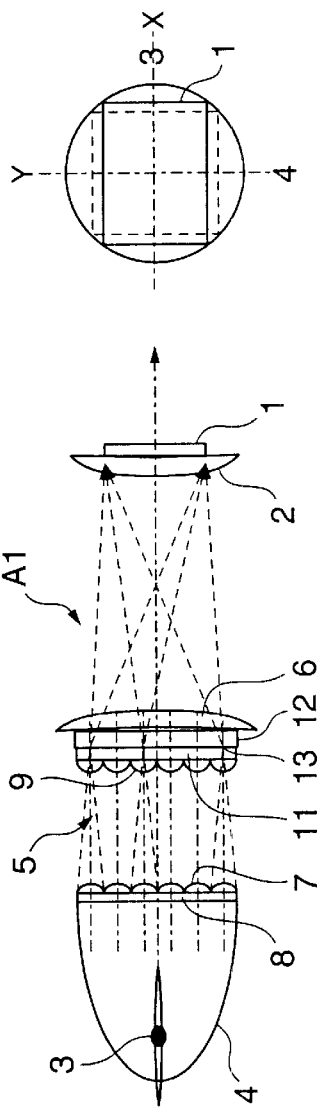

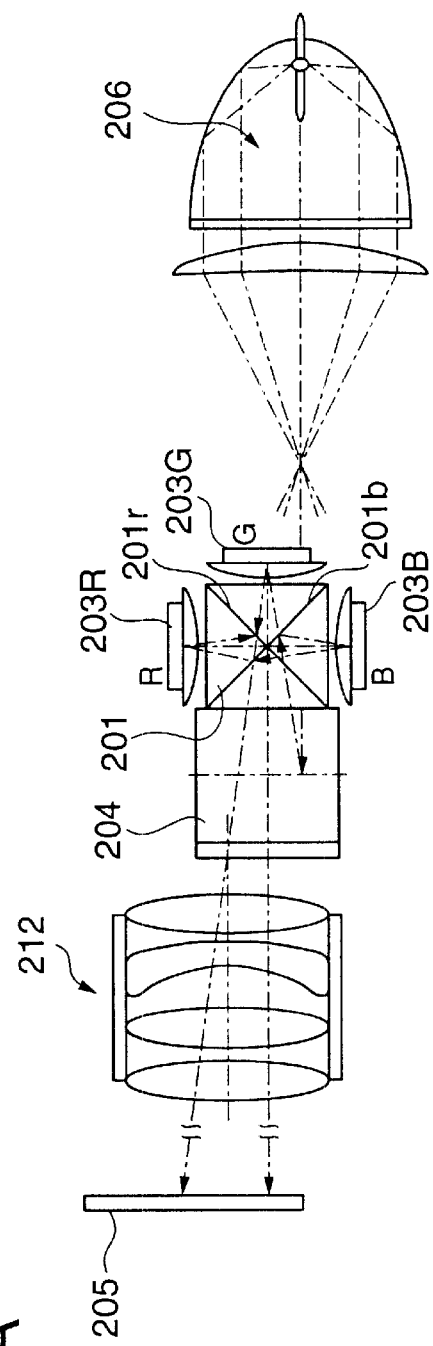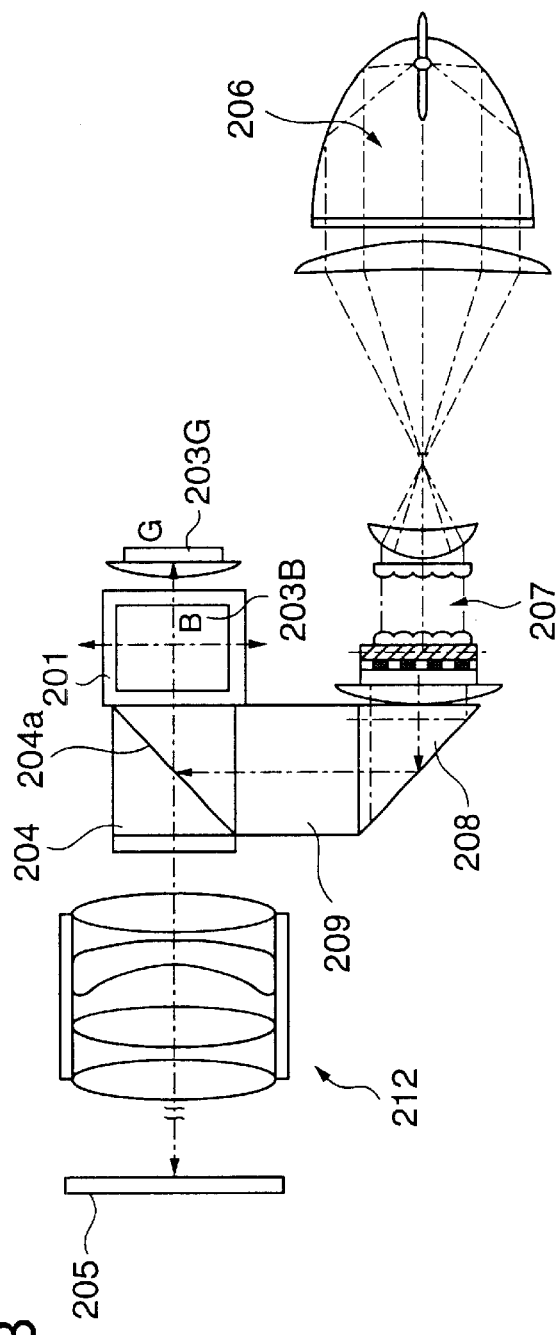
FIG. 40A
FIG. 40B

ILLUMINATION SYSTEM AND PROJECTOR

BACKGROUND OF THE INVENTION

1. Field of the Invention

The present invention generally relates to an illumination system suitable to illuminate a rectangular object to be projected such as a liquid crystal panel, a liquid crystal projector using this illumination system, and a projector using an image forming member such as a reflection-type liquid crystal panel and a dichroic prism alone having a function as a color separation/combination device.

2. Description of the Related Art

For example, Japanese Laid-Open Patent Application No. 3-11806 discloses an integrator optical system having a combination of two sets of lens arrays as an illuminating optical system for uniformly illuminating a rectangular object to be projected such as a liquid crystal panel.

In the integrator optical system, a light flux from a light source is separated by a plurality of rectangular condenser lenses constituting a first lens array so as to form secondary light source images, which then superposedly form images on a same object to be projected through a second lens array having a plurality of condenser lenses corresponding to the plurality of condenser lenses of the first lens array. They say that, by such an integrator optical system, utilization efficiency of the light from the light source is improved, and, also, it is possible to make uniform an intensity distribution on the object to: be projected. In particular, by forming each condenser lens of the first and second lens arrays to have a rectangular shape having an aspect ratio of 4:3, for example, corresponding to the aspect ratio of the rectangular object to be projected, it is possible to improve the light utilization efficiency and make uniform the intensity distribution.

On the other hand, a liquid crystal projector using a liquid crystal panel of a type of modulating a polarized light can use only one type of a polarized light of a P-polarized component and a S-polarized component. Thereby, when a light source emits a random polarized light, approximately a half the light from the light source is not used. Accordingly, the light utilization efficiency is bad. In order to improve the light utilization efficiency, various types of polarization transformation arrangements have been proposed.

The principle thereof will now be described. After a random polarized light is separated into two orthogonal polarized components (P-polarized component and S-polarized component), one thereof is rotated by 90 degrees through a ½ phase plate or the like so as to be one having the same polarization direction as that of the other, and the optical axes of both are made coincident. Accordingly, for example, a polarization beam splitter and a rectangular prism are both provided, and a ½ phase plate is disposed on the light emitting side of the polarization beam splitter or rectangular prism. By such a polarization transformation optical system arrangement, the polarized directions can be made coincident. Japanese Laid-Open Patent Application No. 7-294906 discloses an arrangement in which light from a light source is converged onto an operation surface (dielectric multi-layer film of 45°) of the polarization beam splitter through a lens plate in order to improve a transformation efficiency in this case.

However, in an arrangement in which simply a polarization beam splitter and a rectangular prism are provided together, the lateral width or longitudinal width of the entire poetical system is approximately doubled, and, therefore, a projection lens having a small F number and a very large aperture or diameter should be used. In order to solve this problem, Japanese Laid-Open Patent Application 8-304739 discloses an example of arrangement in which the integrator optical systems disclosed in Japanese Laid-Open Patent Application 3-11806 are combined. There, in summary, a plurality of minute light fluxes (secondary light-source images) are formed through a first lens array consisting of a plurality of minute rectangular condenser lenses, these light fluxes are separated into P-polarized components and S-polarized components having different polarization directions, then, the polarized components of one polarization direction are rotated so that the polarization planes thereof are made coincident, and the thus-obtained light fluxes are emitted. That is, as a result of separating of polarized light being performed by utilizing a process of generating of minute secondary light-source images which is a feature of the integrator optical system, it is possible to control spatial expansion of light paths due to separation of the polarized light.

Further, Japanese Laid-Open Patent Application No. 10-161065 discloses to condense parallel light from a light source through a convex lens, then, transform the light into parallel light again, and, thereby, to make the beam diameter approximately half, and direct it to a polarization transformation arrangement. Thereby, the polarization transformation arrangement and integrator optical system can be substantially miniaturized.

However, these arrangements have problems in that the arrangement of the integrator optical system is complex and thereby difficult to be manufactured, efficiency in polarization alignment is not sufficient, and so forth.

For example, with regard to the integrator optical system, each of the first and second lens arrays should be formed to a special shape having many lens elements to the amount of m×n pieces like a two-dimensional array. Therefore, it is difficult to make them. Further, it is not easy to manufacture them correspond to the aspect ratio such as 4:3 of a liquid crystal panel.

Further, when, as disclosed in Japanese Laid-Open Patent Application No. 8-304739, a polarization aligning arrangement is disposed subsequent to the second lens array in order to make polarization directions coincident, the second lens array condenses light two-dimensionally (not only in the width direction of the polarization beam splitters but also in the longitudinal direction, being separated into a plurality of divisions) although polarization beam splitters and so forth of the polarization aligning arrangement are formed to be like an array. Therefore, the power in the condensing part is large and the load (stress) on the polarization beam splitters is large. Furthermore, it is difficult to make an arrangement such that correspondence is secured between the polarization beam splitter row, total reflection mirror row and one array of the second lens array.

Generally, there are various types of projectors. For example, in comparison to using a transmission-type liquid crystal panel, by using a reflection-type liquid crystal panel, it is easy to obtain high resolution and high luminance, and, also, it is possible to use a single optical component both as a color separating component and a color combining component, thereby miniaturization thereof being able to be achieved.

When such a reflection-type liquid crystal panel is used in a projector, a polarization beam splitter and a dichroic mirror as a color separation/color combining component disposed on incident and emitted light paths are used, color separation of light from a light source and color combination of modulated light reflected by the reflection-type liquid-crystal panels for respective colors are performed, the thus-obtained light is incident on a projection lens system so that a projected color image is obtained, as disclosed in Japanese Laid-Open Patent Application No. 3-249639.

FIG. 1 shows a proposed example of a liquid crystal projector using such a basic idea using reflection-type liquid-crystal panels. This liquid crystal projector includes a light source 101, an illumination system 102, a total reflection prism 103, a connection prism 104, a polarization beam splitter 105, a color separation/color combination component 106, three reflection-type liquid crystal panels 107R, 107G and 107B, and a condenser lens 108 for each of the reflection-type liquid crystal panels 107R, 107G and 107B. The light source 101 includes a lamp 109 and an ellipse surface mirror 110. The illumination system 102 includes a total reflection mirror 111 for deflecting a light path, a collimator lens 112, a pair of fly-eye lens plates 113, 114 forming an integrator optical system, a polarization aligning prism array 115, and a condenser liens 116. The integrator optical system is well known from Japanese Laid-Open Patent Application No. 3-11806 and so forth.

The polarization beam splitter 105 is disposed on a superposed incident/emitted light path, and reflects an S-polarized component of light incident thereon from the illumination system 102 by 90° toward the color separation/color combination component 106. A dichroic prim is used as the color separation/color combination component 106. This dichroic prism 106 is formed to be an optical element having a cubic shape or rectangular-parallelepiped shape in which a dichroic film 106r for red having a property of reflecting a long-wave-length range of red light R so as to separate the long-wave-length range of red light R and a short-wave-length range than green light G and a dichroic film 106b for blue having a property of reflecting a shortwave-length range of blue light B so as to separate the short-wave-length range of blue light B and a long-wavelength range than the green light G are disposed orthogonally. Accordingly, the dichroic prism 106 has the dichroic film 106r for red parallel to the reflective surface 105a of the polarization beam splitter 105 and the dichroic film 106b for blue perpendicular to the dichroic film 106r for red formed therein. These dichroic films 106r and 106b are formed as dielectric multi-layer films.

The three reflection-type liquid crystal panels 107R, 107G and 107B are disposed correspondingly to the dichroic film 106r for red and dichroic film 106g for green of the dichroic prism 106. That is, the reflection-type liquid crystal panel 107R is disposed in the direction in which the light of wavelength equal to or longer than the red light R is reflected by the dichroic film 106r, the reflection-type liquid crystal panel 107B is disposed in the direction in which the light of wavelength equal to or shorter than the green light G is reflected by the dichroic film 106b, and the reflection-type liquid crystal panel 107G is disposed in the direction in which the light is transmitted by the dichroic film 106r for red and dichroic film 106b for blue. These reflection-type liquid crystal panels 107R, 107G and 107B have images of respective colors formed therein to be projected formed through ON/OFF control of respective liquid crystal elements thereof by an information display system (not shown in the figure).

Further, a projection lens system 119 having a projection lenses 118 is provided on the emitted light path between the polarization beam splitter 105 and a screen 117. There, light paths from a virtual light-source surface provided by the integrator optical system to the respective reflection-type liquid crystal panels 107R, 107G and 107B are approximately equal to each other, and the light paths between the respective reflection-type liquid crystal panels 107R, 107G and 107B and projection lens 118 are approximately equal to each other.

In this arrangement, the light flux caused to have only the S-polarized component from the illumination system 102 is directed by the total reflection prism 103 and polarization beam splitter 105, and is incident on the dichroic prism 106. There, the incident light is separated into the red,light R, green light G and blue light B in accordance with the wavelengths thereof, and these lights are incident on the respective reflecting liquid crystal panels 107R, 107G and 107B. The respective reflection-type liquid crystal panels 107R, 107G and 107B are turned on and off in accordance with image signals input to the liquid crystal projector from the information display system. When they are turned off, the S-polarized light component is reflected thereby as it is. When they are turned on, the S-polarized light component is reflected thereby being transformed (modulated) into the P-polarized light component. The light including the S-polarized light component and P-polarized light component reflected by the respective reflection-type liquid crystal panels 107R, 107G and 107B is collected and combined by the dichroic prism 107, respectively, and returns to the polarization beam splitter 105. At this time, only the P-polarized component reflected by each of the respective reflection-type liquid crystal panels 107R, 107G and 107B at turned on liquid crystal elements thereof is transmitted by the polarization beam splitter 105. Thereby, the thus-transmitted light is magnified and projected onto the screen 117 through the projection lens system 119. Thereby, an image in accordance with the image signals input to the liquid crystal projector is displayed on the screen as a color image.

Thus, the dichroic prism 106 is used for both color separation and color combination. Thereby, it is possible to miniaturize the entirety.

However, with regard to the dichroic prism 106, it is not possible to provide the dichroic film 106r for red and dichroic film 106b for blue having properties of efficiently reflecting the P-polarized light components and S-polarized light components in the same degree. Thereby, when the function of separating the light coming from the illumination system 102 into the red light R, green light G and blue light B, and the function of combining the light obtained as, a result of the thus-separated lights being modulated by the reflection-type liquid crystal panels 107R, 107G and 107B for the respective colors are executed by the same dichroic prism 106, the performance is very bad in comparison to a case of a projector in which color separation and color combination are performed by separate optical components.

This matter will now be described in more detail. When polarization characteristics of a dichroic prism on the market were examined, results shown in FIGS. 2A and 2B were obtained. FIG. 2A shows reflection characteristics for blue light B of the dichroic film 106b for blue and FIG. 2B shows reflection characteristics for red light R of the dichroic film 106r for red, as polarization characteristics for P-polarized light components, S-polarized light components and P*S light. It can be seen therefrom that, in any case, the reflection characteristic varies depend on the polarization state of the incident light. In particular, the reflectivity for the P-polarized light components is low.

This dichroic prism was used as a dichroic prism for color combination for transmission-type liquid crystal panels 121R, 121G and 121B on which light obtained from color separation performed by another optical component were incident respectively, as shown in FIG. 3A. Then, S-polarized light was obtained from the color combination. In this case, the polarization combination characteristics are shown in FIG. 3B. Thus, the characteristics were superior, as shown in the figure.

However, when the dichroic prism was used as the dichroic prism 106 for color separation/color combination for the reflection-type liquid crystal panels 107R, 107G and 107B, as shown in FIG. 4A, and the characteristics of separation of a S-polarized light component and combination of a P-polarized light component were examined, the intensities of red light R and blue light B were low, and a color image having a sufficient color balance could not be obtained, in the separation/combination by the same dichroic prism 107 used for both purposes, as shown in FIG. 4B.

SUMMARY OF THE INVENTION

An object of the present invention is to provide an illumination system and a liquid crystal projector in which arrangements thereof are simplified and thereby manufacture thereof is easy without the function required for the integrator optic al system being degraded.

Another object of the present invention is to provide an illumination system and a liquid crystal projector having a superior property in matching with a polarization alignment arrangement for making polarization directions coincident and which can reduce a load on a polarization separating prism of the arrangement.

Another object of the present invention is to provide a projector which can be miniaturized and made to have a light weight as a result of a dichroic prism which can achieve, in a condition in which there is almost no difference in intensity therebetween, a color separating function of separating incident light into red light, green light and blue light, and a color combining function of combining the thus-separated color light being used as a color separation/color combination component in a condition in which there is no problem in optical characteristics in comparison to a case of transmission-type liquid crystal panels.

Another object of the present invention is to provide a projector using a dichroic prism which can achieve a color balance and light utilization efficiency in no way inferior to a case where separate optical components are used for performing color separating function and color combining function by having a filtering function such that a polarized component of one of P-polarization and S-polarization has a fixed shift in characteristics thereof with respect to a polarized component of the other one.

Another object of the present invention is to provide a projector which can prevent keystoning.

Another object of the present invention is to provide a projector which can be miniaturized, have a light weight, and a reduced luminance variation.

Another object of the-present invention is to provide a projector which is small-sized, has a light weight, has a high light utilization efficiency of a light-source light, and displays a bright projected image.

An illumination system according to the present invention comprises:
- at least one light-emitting unit;
- at least one reflecting mirror for condensing light;
- a lens plate disposed on the side of an object to be projected with respect to the reflecting mirror, having a plurality of lens elements arranged two-dimensionally, approximately perpendicular to a main optical axis of a projection lens system and the object to be projected, each having a shape approximately similar to a shape of the object to be projected and approximately the same as each other, for dividing light into a plurality of light fluxes;
- a first lenticule having a plurality of cylindrical lenses arranged and disposed at or near a position to which light passing through the respective lens elements of the lens plate is condensed;
- a second lenticule disposed subsequent to the first lenticule and having a plurality of cylindrical lenses arranged in a direction perpendicular to the direction in which the plurality of cylindrical lenses of the first lenticule are arranged; and
- at least one convex lens disposed so as to refracting the light path of the light flux formed by each of the plurality of lens elements of the lens plate so that the light flux illuminates the entire surface of the object to be projected after passing through the first and second lenticules.

Accordingly, instead of a so-called second lens array of an integrator optical system for reducing an expansion of the secondary light-source images acting as the virtual light source for illuminating the object to be projected, the first and second lenticules having array structures of cylindrical lenses are used. Thereby, it is possible to reduce the number of necessary lenses from m×n into m+n, and, also, manufacture of these lenticules is easy because each has the array structure of cylindrical lenses merely in one direction. Further, it is possible to deal with the aspect ratio of the object to be projected, such as a liquid crystal panel or the like by the combination of the first and second lenticules. Accordingly, in comparison to the second lens array, it is easy to deal with the aspect ratio.

The reflection mirror may comprises a spheroid mirror having the light-emitting unit disposed therein at or near a first focal point thereof;
- the device may further comprise another convex lens disposed outside of a second focal point of the spheroid mirror; and
- the lens plate may be disposed on the side of the object to be projected with respect to the other convex lens.

Accordingly, even in the arrangement in which the spheroid mirror is used in the light source part, the same advantages are obtained. In particular, as a result of the spheroid mirror being used as the reflection mirror of the light source part, the light emitting unit being disposed at the first focal point thereof and the convex lens being disposed outside of the second focal point, it is possible to cause the light to be transformed into a parallel light flux through the convex lens and then incident on the first lens array of the integrator optical system after the light from the light emitting unit is efficiently condensed toward the second focal point by the spheroid mirror. Thereby, it is possible to improve the optical characteristics in comparison to the case where the light is transformed into a parallel light flux as a result of a concave lens being inserted on a light path through which the light is condensed toward the second focal point. And also, it is possible to reduce an expansion of the secondary light-source images acting as the virtual light source for illuminating the object to be projected to the utmost. Thus, the present arrangement is advantageous for reducing the apertures/diameters of the projection lenses in the condition in which the spatial distance between the light emitting unit and the object to be projected is short.

An illumination system according to another aspect of the present invention comprises:

at least one light-emitting unit;

a unit forming an approximately parallel light;

a unit condensing the approximately parallel light and forming a focal point;

a first convex lens disposed outside of the focal point;

a lens plate disposed on the side of an object to be projected with respect to the first convex lens, having a plurality of lens elements arranged two-dimensionally, approximately perpendicular to a main optical axis of a projection lens system and the object to be projected, each having a shape approximately similar to a shape of the object to be projected and approximately the same as each other, for dividing light into a plurality of light fluxes;

a first lenticule having a plurality of cylindrical lenses arranged and disposed at or near a position to which light passing through the respective lens elements of the lens plate is condensed;

a second lenticule disposed subsequent to the first lenticule and having a plurality of cylindrical lenses arranged in a direction perpendicular to the direction in which the plurality of cylindrical lenses of the first lenticule are arranged; and at least one second convex lens disposed so as to refracting the light flux formed by each of the plurality of lens elements of the lens plate so that the light flux illuminates the entire surface: of the object to be projected after passing through the first and second lenticules.

Accordingly, also in an arrangement in which at least one light emitting unit, a unit forming approximately parallel light, a unit condensing the approximately parallel light and forming a focal point and a first convex lens disposed outside of the focal point are used in a light source part, for example, in an arrangement in which a parabolic mirror or a spheroid mirror is used, the same advantages are obtained.

The device according to the other aspect of the present invention may further comprise a polarization aligning prism array having polarization separating prisms and total reflection prisms arranged alternately, and $\lambda/2$-phase-difference plates arranged for light fluxes of one type of two types obtained from the polarization separating prisms, wherein the particular cylindrical lenses of the first lenticule are made to correspond to the particular polarization separating prisms, an arrangement is made such that all the light fluxes passing through the particular cylindrical lenses pass through approximately the corresponding polarization separating prisms, and, thus, random light fluxes are made to be of polarized components of only one type, wherein the second lenticule is disposed subsequent to the polarization aligning prism array.

Accordingly, by combining a polarization alleging prism array which makes random light fluxes be of polarized components in one type, because the polarization separating prisms and so forth of the polarization aligning prism array are formed to have an array-like structure and correspondingly thereto the respective cylindrical lenses of the first lenticule condense the light only in one direction, it is possible to reduce power in the portion toward which the light is condensed, and to reduce the load (stress) on the polarization separating prisms. And also, it is easy to make an arrangement such that a respective one of the polarization separating prisms and a respective one of the total reflection prisms correspond to each of the cylindrical lenses of the first lenticule.

The at least one reflection mirror may comprise a spheroid mirror having the light-emitting unit disposed therein at or near a first focal point thereof;

the device may further comprise another convex lens disposed outside of a second focal point of the spheroid mirror; and the lens plate may be disposed on the side of the object to be projected with respect to the other convex lens.

Accordingly, also in the arrangement in which the spheroid mirror is used in the light source part, the same advantages are obtained.

The device having at least one light emitting unit, a unit forming approximately parallel light, a unit condensing the approximately parallel light and forming a focal point and first convex lens disposed outside of the focal point in a light source part may further comprise a polarization aligning prism array having polarization separating prisms and total reflection prisms arranged alternately, and $\lambda/2$-phase-difference plates arranged for light fluxes of one type of two types obtained from the polarization separating prisms, wherein the particular cylindrical lenses of the first lenticule are made to correspond to the particular polarization separating prisms, an arrangement is made such that all the light fluxes passing through the particular cylindrical lenses pass through approximately the corresponding polarization separating prisms, and, thus, random light fluxes are made to be of polarized components of only one type, wherein the second lenticule is disposed subsequent to the polarization aligning prism array.

Accordingly, also in an arrangement in which at least one light emitting unit, a unit forming approximately parallel light, a unit condensing the approximately parallel light and forming a focal point and first convex lens disposed outside of the focal point are used in a light source part, for example, in an arrangement in which a parabolic mirror or a spheroid mirror is used, the same advantages are obtained.

The first lenticule may have an aperture width of at least one cylindrical lens at and/or near the center thereof made larger than the others.

Accordingly, because, when the light source of the light emitting unit cannot be regarded as a pointy source, the energy around the center is large and blur occurs, and, thereby, the light fluxes are likely to expand around the center, it is possible to obtain total balance by enlarging the aperture width of the cylindrical lenses there.

The second lenticule may have an aperture width of at least one cylindrical lens at and/or near the center thereof made larger than the others.

Accordingly, because, when the light source of the light emitting unit cannot be regarded as a pointy source, the energy around the center is large and blur occurs, and, thereby, the light fluxes are likely expand around the center, it is possible to obtain total balance by enlarging the aperture width of the cylindrical lenses there.

The first lenticule may have, an aperture width of at least one cylindrical lens at and/or near the center thereof made larger than the others; and the polarization aligning prism array may have a size of a pair of prisms changed correspondingly to the aperture width of the at least cylindrical lens of the first lenticule.

Accordingly, in the arrangement in which the polarization aligning prism array is provided, it is possible to cause the polarization aligning function to be performed sufficiently when the aperture widths of the cylindrical lenses around the center are enlarged.

The polarization aligning prism array may have polarization separating prisms arranged symmetrically at the center thereof, and total reflection prisms arranged outside thereof, thus the entirety of the polarization aligning prism array including further outside thereof being symmetrical.

Accordingly, in the arrangement in which the polarization aligning prism array is provided, it is possible to cause the polarization aligning function to be performed sufficiently when the aperture widths of the cylindrical lenses around the center are enlarged. And also, because the symmetrical structure is employed, it is easy to manufacture the polarization aligning prism array.

The device may further comprise a polarization aligning unit comprising a combination of a polarization separating prism, a total revelation prism and a $\lambda/2$-phase-difference plate, disposed on the side of the object to be projected with respect to the reflection mirror for condensing light and making random light fluxes be of polarized components of one type,
wherein the lens plate is disposed on the side of the object to be projected with respect to the polarization aligning unit.

Accordingly, the two polarization aligning units are provided and two steps of polarization aligning process are performed therethrough, the degree (purity) of polarization aligning is increased, and, thereby, it is possible to increase the light utilization efficiency.

The at least one reflection mirror may comprise a spheroid mirror having the light-emitting unit disposed therein at or near a first focal point thereof; and
the device may further comprise another convex lens disposed outside of a second focal point of the spheroid mirror.

Accordingly, even in the arrangement in which the spheroid mirror is used in the light source part, the same advantages are obtained. In particular, as a result of the spheroid mirror being used as the reflection mirror of the light source part, the light emitting unit being disposed at the first focal point thereof and the convex lens being disposed outside of the second focal point, it is possible to cause the light to be transformed into a parallel light flux through the convex lens and then incident on the first lens array of the integrator optical system after the light from the light emitting unit is efficiently condensed toward the second focal point by the spheroid mirror. Thereby, it is possible to improve the optical characteristics in comparison to the case where the light is transformed into a parallel light flux as a result of a concave lens being inserted on a light path through which the light is condensed toward the second focal point. And also, it is possible to reduce an expansion of the secondary light-source images acting as the virtual light source for illuminating the object to be projected to the utmost. Thus, the present arrangement is advantageous for reducing the apertures/diameters of the projection lenses in the condition in which the spatial distance between the light emitting unit and the object to be projected is short.

Also the device according to the abovementioned other aspect of the present invention may further comprise, in addition to the polarization aligning prism array, a polarization aligning unit comprising a combination of a polarization separating prism, a total revelation prism and a $\lambda/2$-phase-difference plate, and making random light fluxes be polarized components of one type,
wherein the lens plate is disposed on the side of the object to be projected with respect to the polarization aligning unit.

Accordingly, the two polarization aligning units are provided and two steps of polarization aligning process are performed therethrough, the degree (purity) of polarization aligning is increased, and, thereby, it is possible to increase the light utilization efficiency.

A central wavelength of the $\lambda/2$-phase-difference plate of the polarization aligning unit may coincide with a central wavelength of the: $\lambda/2$-phase-difference plates of the polarization aligning prism array.

Accordingly, although depending on the light emitting unit and utilization purpose, by making the central wavelength of the $\lambda/2$-phase-difference plates of the two polarization aligning units be equal, it is possible to sharpen the polarization aligning characteristics, and, also, to increase the degree (purity) of polarization alignment.

A central wavelength of the $\lambda/2$-phase-difference plate of the polarization aligning unit and a central wavelength of the $\lambda/2$-phase-difference plates of the polarization aligning prism array may be caused to differ to the amounts of ± a predetermined wavelength from a green wavelength, respectively.

Accordingly, although depending on the light emitting unit and utilization purpose, by making the central wavelength of the $\lambda/2$-phase-difference plate of the polarization aligning unit and the central wavelength of the $\lambda/2$-phase-difference plates of the polarization aligning prism array be different to the amounts of ± a predetermined wavelength from a green wavelength, respectively, it is possible to increase the polarization transformation performance otherwise decreasing at both sides, and, as a result, to uniform the polarization characteristics by defining a wavelength band through which the function is performed. For example, ±50 nm are the amounts of ± the predetermined wavelength, and, thereby, the polarization aligning function is performed for the wavelength band of approximately 500 through 600 nm.

A liquid crystal projector according to the present invention comprises:
at least one liquid crystal panel in which an image to be projected is formed by an information display system;
the illumination system described above illuminating the liquid crystal plate regarded as the object to be projected; and
a projection lens system for,projecting the image formed in the liquid crystal panel onto a screen.

Accordingly, because any of the above-described illumination systems is used for illuminating the liquid crystal panel, it is possible to illuminate the liquid crystal panel through the illumination system having the entirely simple structure, to perform projection onto the screen through the projection lenses having the reduced apertures/diameters, and to miniaturize the entirety of the liquid crystal projector.

The liquid crystal panel used there may be either a reflection-type one or a transmission-type one. Further, in a case of color display, ordinary, three liquid crystal panels for three primary colors, RGB (red, green and blue) are used together with a spectro device such as a dichroic prism or mirror and so forth, for example.

A projector according to another aspect of the present invention comprises:
three reflection-type image forming members for forming an image to be projected by modulating a polarization state for each color region of a red region, a green region and a blue region;
a light source emitting light for illuminating the image forming menders;
a polarization beam splitter disposed on a light path comprising both an incident light path from the light source to the image forming members and an emitted light path from the image forming members to a projection lens system, reflecting one of P-polarized light and S-polarized light from the light source and transmitting the other thereof in an approximately 90° different direction; and a dichroic prism disposed on a light path between the polarization beam splitter and the three image forming members, and having a dichroic film for red separating a long wavelength band of red light from a wavelength band shorter than green light and a dichroic film for blue separating a short wavelength band from a wavelength band longer than the green light, the dichroic prism acting a color separating/color combining device having both a function of separating the light of the polarized component of one type obtained from the polarization beam splitter into a red region, a green region and a blue region and directing them to the corresponding image forming members, and a function of combining light of the respective regions having the polarization states modulated by the image forming members and then incident again thereto, wherein the dichroic film for red has the maximum reflectivity for a polarized component in one of S-polarization or P-polarization of the red light is equal to or higher than 80% of the maximum reflectivity thereof for a polarized component in the other polarization of the red light, and the dichroic film for blue has the maximum reflectivity for a polarized component in one of S-polarization or P-polarization of the blue light is equal to or higher than 80% of the maximum reflectivity thereof for a polarized component in the other polarization of the blue light Accordingly, with regard to the dichroic prism used as the color separating/color combining device, by using one having the dichroic film for red and dichroic film for blue having equivalent characteristics such that each thereof has the maximum reflectivity for one of S-polarized light or P-polarized light of corresponding color equal to or higher than 80% of the maximum reflectivity for the other polarized light as a result of a special arrangement concerning multilayer films being made for those films, the polarization dependency is reduced, it is possible to equalize the reflection characteristics for polarized components when color separation is performed to the reflection characteristics for polarized components when color combination is performed such that the light modulated by reflection-type liquid crystal panels as the image forming members and again incident is combined. Thereby, it is possible to use the single device to perform the functions of the color separating/color combining device by which commercial-values can be secured. As result, it is possible to miniaturize and reduce in weight the entirety of the projector.

A projector according to another aspect of the present invention comprises:

three reflection-type image forming members for forming an image to be projected by modulating a polarization state for each color region of a red region, a green region and a blue region;

a light source emitting light for illuminating the image forming menders;

a polarization beam splitter disposed on a light path comprising both an incident light path from the light source to the image forming members and an emitted light path from the image forming members to a projection lens system, reflecting one of P-polarized light and S-polarized light from the light source and transmitting the other thereof in an approximately 90° different direction; and a dichroic prism disposed on a light path between the polarization beam splitter and the three image forming members, and having a dichroic film for red separating a long wavelength band of red light from a wavelength band shorter than green light and a dichroic film for blue separating a short wavelength band from a wavelength band longer than the green light, the dichroic prism acting a color separating/color combining device having both a function of separating the light of the polarized component of one type obtained from the polarization beam splitter into a red region, a green region and a blue region and directing them to the corresponding image forming members, and a function of combining light of the respective regions having the polarization states modulated by the image forming members and then incident again thereto, wherein 10 nm $\leq |\lambda_{50P} - \lambda_{50S}| \leq 50$ nm, where $\lambda_{50P}$ represents the wavelength at which the reflectivity of the dichroic film for red for P-polarized light becomes 50% and $\lambda_{50S}$ represents the wavelength at which the reflectivity thereof for S-polarized light becomes 50% in the wavelength band of 550 nm$\leq \lambda \leq$700 nm, and, also, 10 nm$\leq |\lambda_{50P} - \lambda_{50S}| \leq$50 nm, where $\lambda_{50P}$ represents the wavelength at which the reflectivity of the dichroic film for blue for P-polarized light becomes 50% and $\lambda_{50S}$ represents the wavelength at which the reflectivity thereof for S-polarized light becomes 50% in the wavelength band of 400 nm$\leq \lambda \leq$550 nm.

Same as the above, with regard to the dichroic prism used as the color separating/color combining device, the difference in the polarization dependency of the dichroic film for red and dichroic film for blue should be reduced. However, although it is preferable to equalize the polarization dependencies of these dichroic films, it is not possible to completely equalize them. Therefore, as a result of an arrangement is made for the films such that the films have filtering functions in which the shift amount of the characteristic for one polarized component with respect to the characteristic for the other polarized component is controlled within a fixed amount, it is possible to perform color combination with a color balance in no way inferior to a case where separate optical components are used for providing color separating function and color combining function, and to increase the light utilization efficiency.

The dichroic prism may have the dichroic film for red and dichroic film for blue arranged orthogonally, and, also, an incidence surface of the polarization beam splitter may be approximately perpendicular to incidence surfaces of these dichroic films.

Accordingly, by making an arrangement such that an incidence surface of the polarization beam splitter is approximately perpendicular to incidence surfaces of these dichroic films, allowance in incidence angle increases, and the light utilization efficiency can be increased. Thereby, it is possible to perform a design more advantageously.

The dichroic prism may have the dichroic film for red and dichroic film for blue arranged orthogonally, and, also, incident light may be incident on the dichroic film for red and dichroic film for blue with approximately equal shift angles.

Accordingly, as a result of shifting the image forming members in a direction perpendicular to the optical axis, and making an arrangement such that incident light may be incident on the dichroic film for red and dichroic film for blue with approximately equal shift angles, it is possible to prevents keystoning from occurring on the screen.

The dichroic prism may have the dichroic film for red and dichroic film for blue arranged orthogonally, and, also, an arrangement may be made such that incident light is incident on one of the dichroic film for red and dichroic film for blue with a predetermined incidence angle smaller than 45° while the incident light is incident on the other dichroic film with a predetermined incidence angle equal to or larger than 45°.

Accordingly, same as the above, it is possible to prevent keystoning from occurring on the screen. Further, in particular, by shifting the incident light in a direction perpendicular to the intersecting line on which the dichroic film for red and dichroic film for blue of the dichroic prism intersect, it is possible to obtain the performance equivalent to the case where the incident light is not shifted, by modifying the characteristics of the dichroic films in consideration of the amount of inclination of the chief ray of the illuminating light made in order to shift the incident light.

The projector may further comprise an illumination system having at least one pair of fly-eye lens plates on an incident light path from the light source to the polarization beam splitter.

Accordingly, in configuring any of the above-described projectors, as a result of providing the illumination system employing the so-called integrator optical system on the incident light path, it is possible to illuminate the image forming members each having the approximately rectangular shape without unevenness in illumination, and to improve the quality of the projected image.

The projector may further comprises an illumination system having at least one fly-eye lens plate, a first lenticule having a plurality of cylinder lenses arranged and disposed at or near a position to which light passing through the fly-eye lens plate is condensed, and a second lenticule disposed subsequent to the first lenticules and having a plurality of cylindrical lenses arranged in a direction perpendicular to a direction in which the plurality of cylindrical lenses of the first lenticule are arranged, on an incident light path from the light source to the polarization beam splitter.

Accordingly, in configuring any of the above-described projectors, as a result of providing the illumination system employing the so-called integrator optical system on the incident light path, it is possible to illuminate the image forming members each having the approximately rectangular shape without unevenness in illumination, and to improve the quality of the projected image.

The projector may further comprise a polarization aligning device on a light path between the first and second lenticules, the polarization aligning device making random light fluxes be of polarized components of only one type.

Accordingly, in configuring any of the above-described projectors, as a result of providing the polarization alleging device in the illumination system, it is possible to use almost all of the light from the light source for illuminating the image forming members, to increase the light utilization efficiency, and to achieve high-luminance projecting display Other objects and further features of the present invention will become more apparent from the following detailed description when read in conjunction with the accompanying drawings.

BRIEF DESCRIPTION OF THE DRAWINGS

FIGS. 5A through 5D show an optical system arrangement showing an illumination system in a first embodiment of the present invention;

FIGS. 40A and 40B show an example of an arrangement of the entirety of a projector in an eleventh embodiment of the present invention (FIG. 40A showing a plan view thereof, and FIG. 40B showing a side view thereof);

DETAILED DESCRIPTION OF THE PREFERRED EMBODIMENTS

Figure 1:
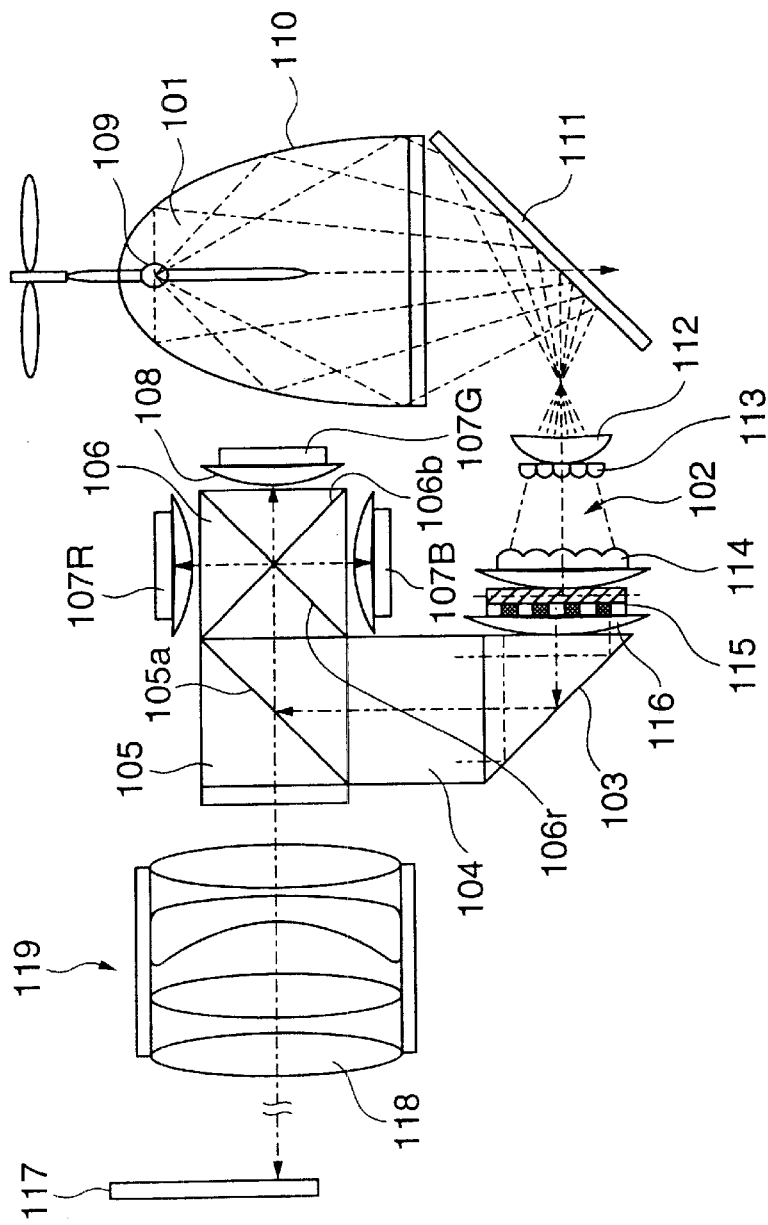
FIG. 1 shows an example of a reflection-type liquid crystal projector in the related art.
Figure 2A:
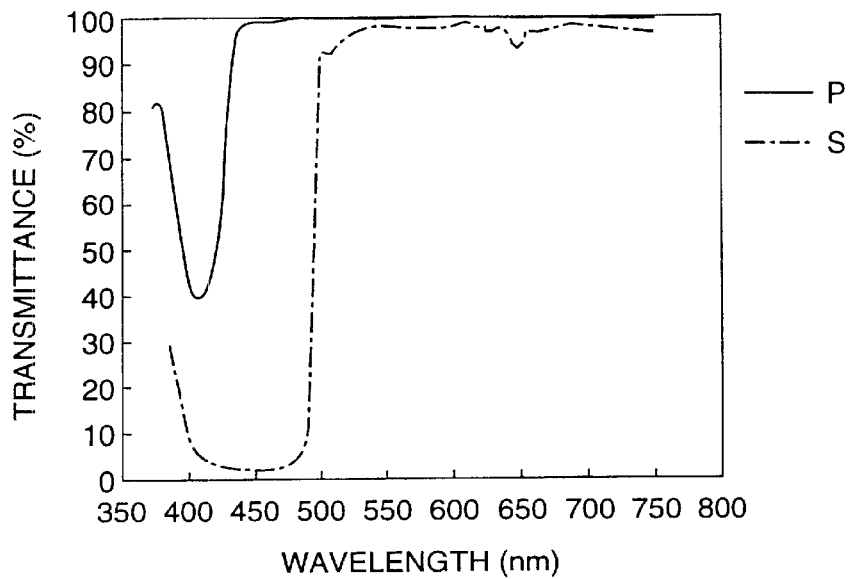
FIGS. 2A and 2B show polarization characteristics of a dichroic prism in the related art.
Figure 2B:
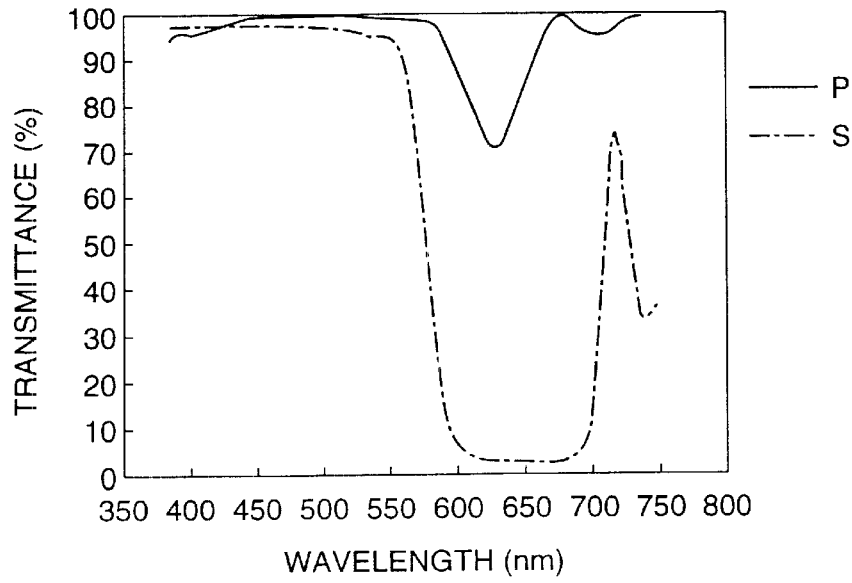
Figure 3A:
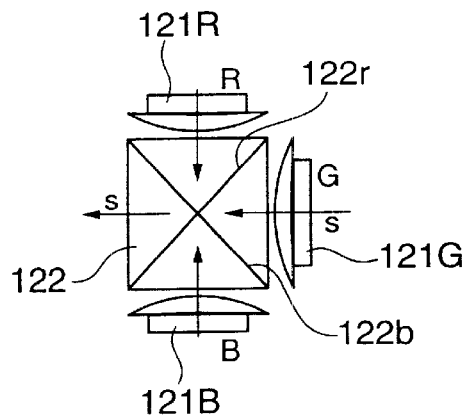
FIGS. 3A and 3B illustrate an arrangement in a case where the dichroic prism is applied to transmission-type liquid crystal panels and polarization combining characteristics of the dichroic prism.
Figure 3B:
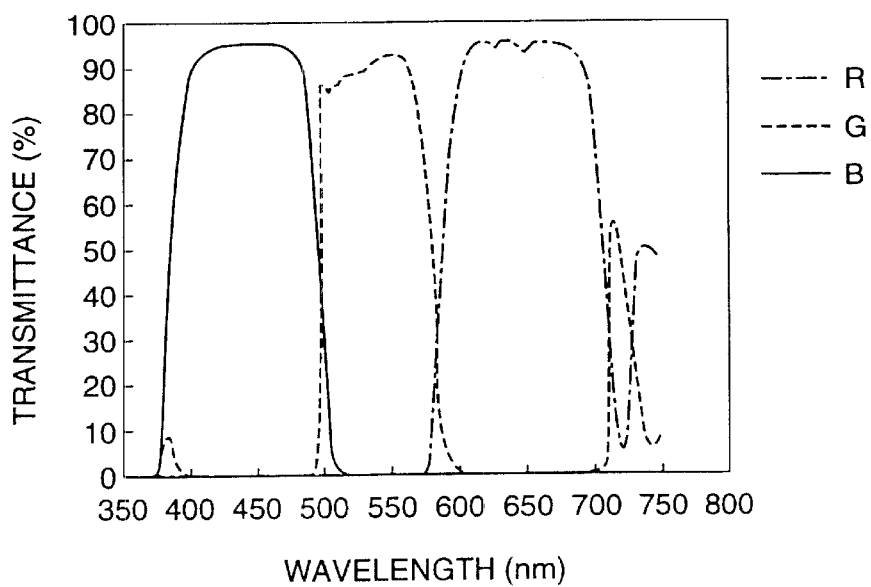

A first embodiment of the present invention will now be described with reference to FIGS. 5A through 5D and 6. FIGS. 5A through 5D show a general arrangement of an illumination system Al in the first embodiment of the present invention.

The illumination system A1 is provided for a rectangular liquid crystal panel 1 having an aspect ratio of vertical and horizontal directions of 4:3 regarded as an object to be projected. A condenser lens 2 for condensing light for each liquid crystal element of the liquid crystal plate 1 is attached to the front surface of the liquid crystal panel 1. For this liquid crystal panel 1, the illumination system A1 has a light source 3, a parabolic mirror 4 used as a reflecting mirror for condensing light in which the light source 3 is built, an integrator optical system 5, and a convex lens 6.

The integrator system 5 includes a lens plate 8 having a plurality of lens elements 7 two-dimensionally arranged therein and having a rectangular shape having an aspect ratio of 4:3 approximately similar to the shape of the liquid crystal panel 1 (rectangular shape shown in FIG. 5D having the aspect ratio of 4:3), a pair of lenticules consisting of a first lenticule 11 and second lenticule 12 each having a plurality of cylindrical lenses 9 and 10 arranged in directions perpendicular to one another. The lens plate 8 disposed at the opening of the parabolic mirror 4 is a so-called first lens array of the integrator optical system, and forms secondary light-source images 13 as divisions from the light emitted from the light source 3 and reflected by the parabolic mirror 4. Thereby, the plane on which the secondary light-source images 13 are formed is a virtual light-source plane. The first lenticule 11 is disposed in position of this virtual light-source plane, and the respective one of the cylindrical lenses 9 is located at a position at which light passes through each column of lens elements 7 of the lens plate 8 is condensed. Each cylindrical lens 10 of the second lenticule 12 disposed immediately subsequent to the first lenticule 11 corresponds to a respective one of the rows of the lens elements 7 of the lens plate 8. That is, the cylindrical lenses 9 and 10 are disposed in the directions perpendicular to one another, and the pair of lenticules 11 and 12 thus have lens elements arranged two-dimensionally, and are a so-called second lens array of the integrator optical system. The convex lens 6 is disposed so as to refract the light path of the light flux produced by each of the lens elements 7 of the lens plate 8 so that the light flux illuminates the entire surface of the,liquid crystal panel 1 after passing through the first and second lenticules 11 and 12.

FIG. 5A typically expresses outlines of beams of light each parallel to the main optical axis and reaching as parallel light up to the lens plate 8. FIG. 5B typically expresses a beam of light emitted from the periphery of the light source 3 and passing through the center of each lens element 7 of the lens plate 8 (suffering the function of a cylindrical lens 9) in a case where the light source 3 cannot be regarded as a point source but has a volume. FIG. 5C typically expresses a beam of light emitted from the periphery of the light source 3 and passing through the center of each lens element 7 of the lens plate 8 (suffering the function of a cylindrical lens 10) in a case where the light source 3 cannot be regarded as a point source but has a volume, after rotation by 90° about the main optical axis.

Accordingly, the parallel light emitted from the light source 3 and reflected by the parabolic mirror 4 is incident on the lens plate 8, and secondary light-source images 13 are formed by the respective lens elements 7 of the lens plate 8 as mentioned above (see FIG. 5A). The light flux emitted from a respective one of the secondary light-source images 13 formed by each of the lens elements 7 is directed to the center of the liquid crystal panel 1 by the convex lens 6. Thereby, the light fluxes passing through the respective particular lens elements 7 each having a rectangular shape having the aspect ratio of 4:3 illuminate the liquid crystal panel 1 in a condition in which the light fluxes are superposed on each other on the liquid crystal panel 1. Actually, the light source 3 is not a point source but has a volume. Thereby, each particular secondary light-source image 13 is not a point source but has a volume. However, by disposing the first and second lenticules 11 and 12 having the cylindrical lenses 9 and 10 at these positions particularly, the light is projected onto the liquid crystal panel 1 in a condition in which the light is highly converged. Thereby, a satisfactory illumination condition is obtained.

In the first embodiment, instead of the so-called second lens array of the integrator optical system for reducing a spatial expansion of the secondary light-source images 13 which act as virtual light sources for illuminating the liquid crystal panel 1, the first and second lenticules 11 and 12 having structures of arrays of cylindrical lenses 9 and 10 are used. Thereby, as can be seen from FIG. 6, the number of lenses needed can be reduced from m×n=4×4=16 to m+n=4+4=8, and, also, manufacture of the lenticules 11 and 12 are easy because they have the structure of arrays of cylindrical lenses 9, and 10 simply in the single directions. Further, it is possible to deal with the aspect ratio of vertical and horizontal directions of the liquid crystal panel 1 by a combination of the first and second lenticules 11 and 12. Thereby, in comparison to the case using the second lens array, it is easy to deal with the aspect ratio.

A second embodiment of the present invention will now be described based on FIGS. 7A through 7C. The same reference numerals are given to the parts/components same as those of the above-described first embodiment, and description thereof will be omitted (This manner will also be applied to the embodiments described hereinafter). In an illumination system A2 in the second embodiment, the convex lens 6 is disposed immediately subsequent to the lens plate 8.

Figure 7A:
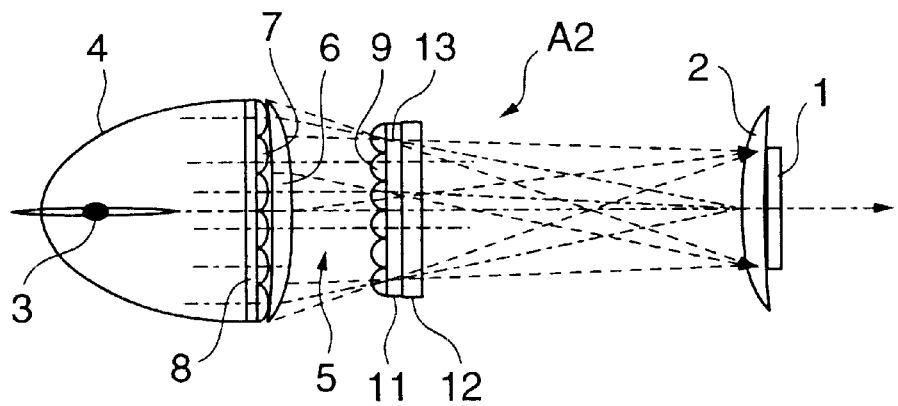
FIGS. 7A through 7C show an optical system arrangement showing an illumination system in a second embodiment of the present invention.
Figure 7B:
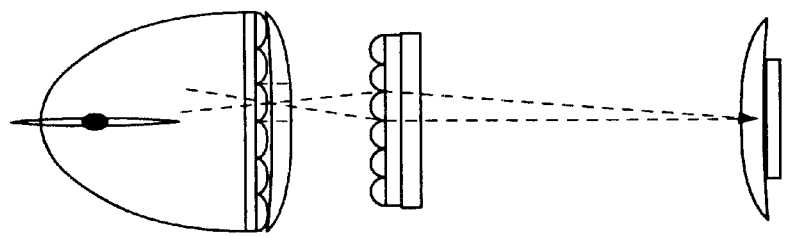
Figure 7C:
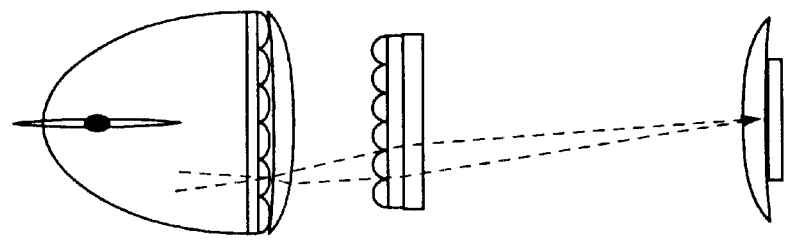

FIG. 7A typically expresses outlines of beams of light each parallel to the main optical axis and reaching as parallel light up to the lens plate 8. FIG. 7B typically expresses a beam of light emitted from the periphery of the light source 3 and passing through the center of each lens element 7 of the lens plate 8 (suffering the function of a cylindrical lens 9) in a case where the light source 3 cannot be regarded as a point source but has a volume. FIG. 7C typically expresses a beam of light emitted from the periphery of the light source 3 and passing through the center of each lens element 7 of the lens plate 8 (suffering the function of a cylindrical lens 10) in a case where the light source 3 cannot be regarded as a point source but has a volume, after rotation by 90° about the main optical axis.

Also in the illumination system A2 in the second embodiment, the functions are the same as those of the illumination system A1 in the first embodiment. However, the light fluxes are condensed by the convex lens 6 disposed immediately subsequent to the lens plate 8. Thereby, it is possible to miniaturize the first and second lenticules 11 and 12 disposed subsequently. Accordingly, the second embodiment is advantageous for miniaturizing the entire arrangement.

Figure 8A:
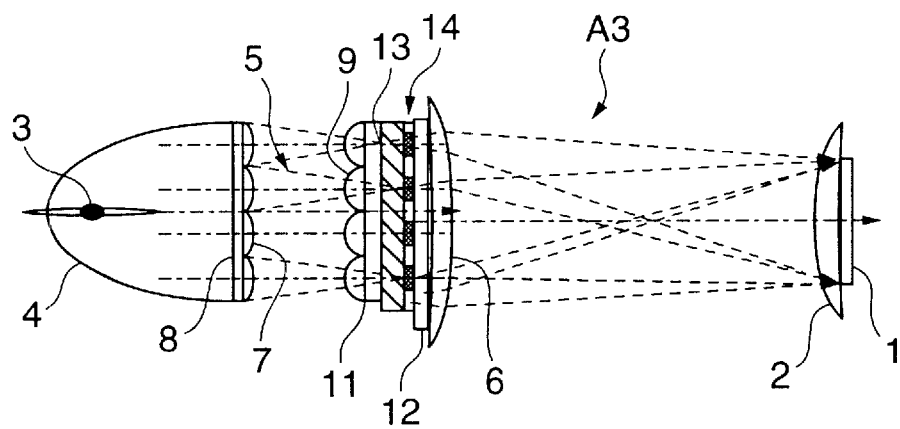
FIGS. 8A through 8C show an optical system arrangement showing an illumination system in a third embodiment of the present invention.
Figure 8B:
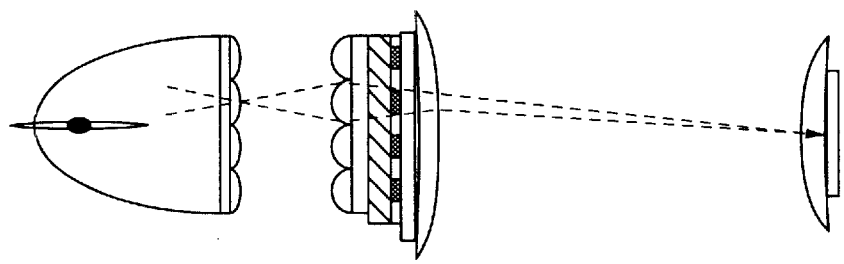
Figure 8C:
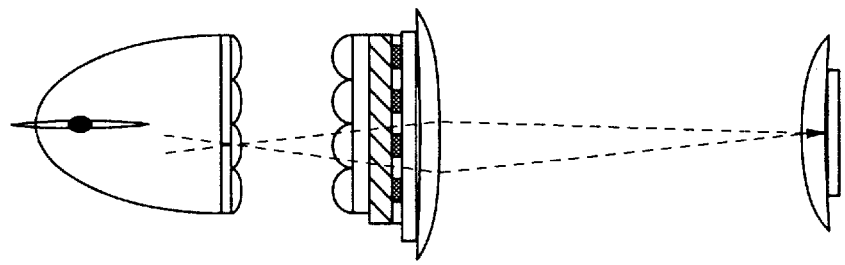

A third embodiment of the present invention will now be described based on FIGS. 8A through 8C, 9A, 9B, 10 and 11A, 111B. FIGS. 8A through 8C show a general arrangement of an illumination system A3 in the third embodiment. In the third embodiment, a polarization aligning prism array 14 which makes random light fluxes become ones of polarized components of only one type is inserted between the first and second lenticules 11 and 12.

FIG. 8A typically expresses outlines of beams of light each parallel to the main optical axis and reaching as parallel light up to the lens plate 8. FIG. 8B typically expresses a beam of light emitted from the periphery of the light source 3 and passing through the center of each lens element 7 of the lens plate 8 (suffering the function of a cylindrical lens 9) in a case where the light source 3 cannot be regarded as a point source but has a volume. FIG. 8C typically expresses a beam of light emitted from the periphery of the light source 3 and passing through the center of each lens element 7 of the lens plate 8 (suffering the function of a cylindrical lens 10) in a case where the light source 3 cannot be regarded as a point source but has a volume, after rotation by 90° about the main optical axis.

Figure 9A:
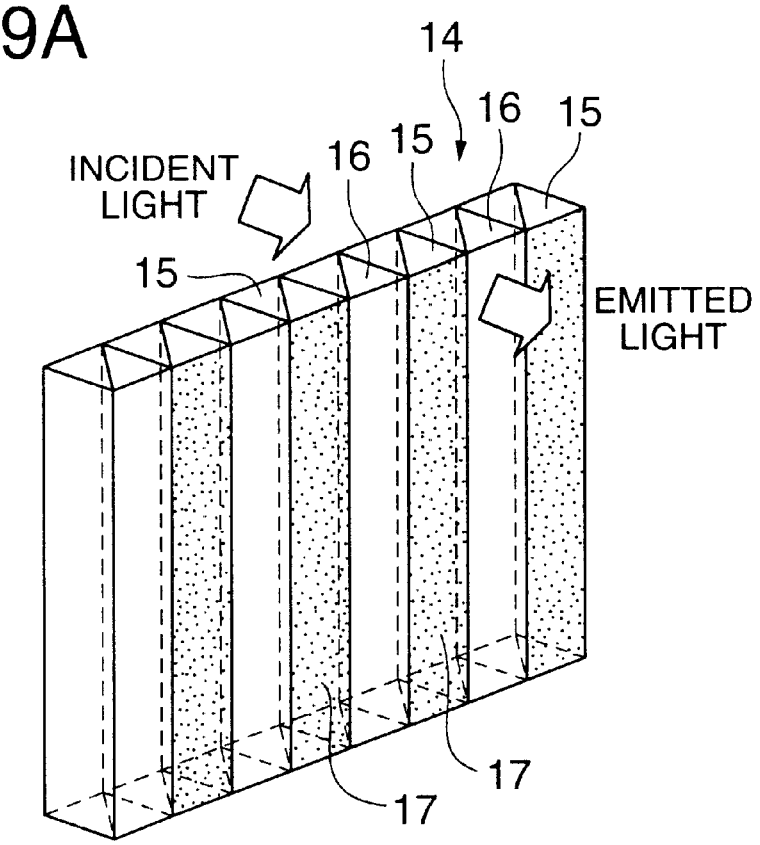
FIGS. 9A and 9B show perspective view showing examples of a polarization aligning prism array.
Figure 9B:
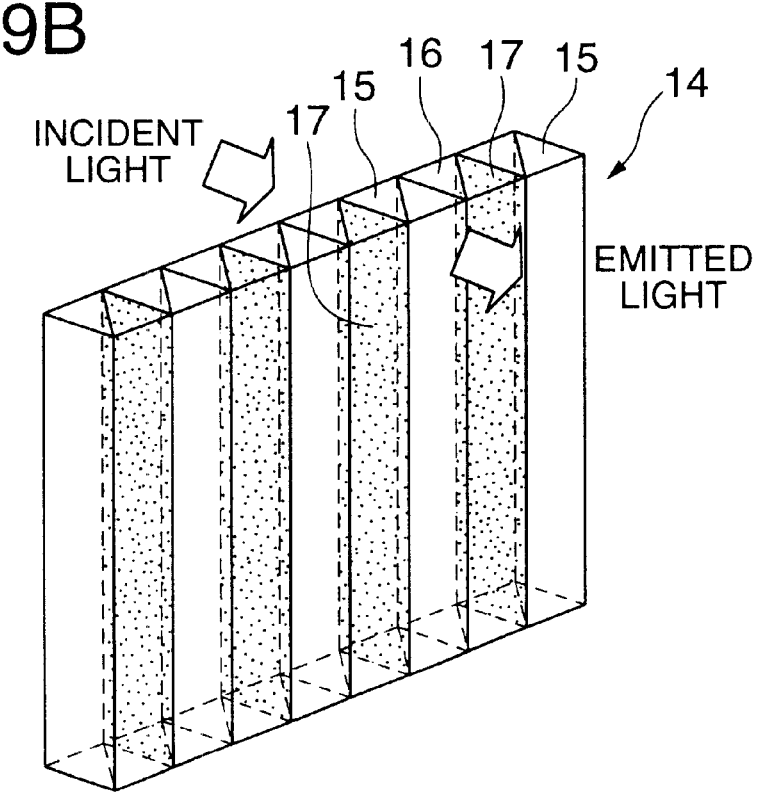
Figure 10:
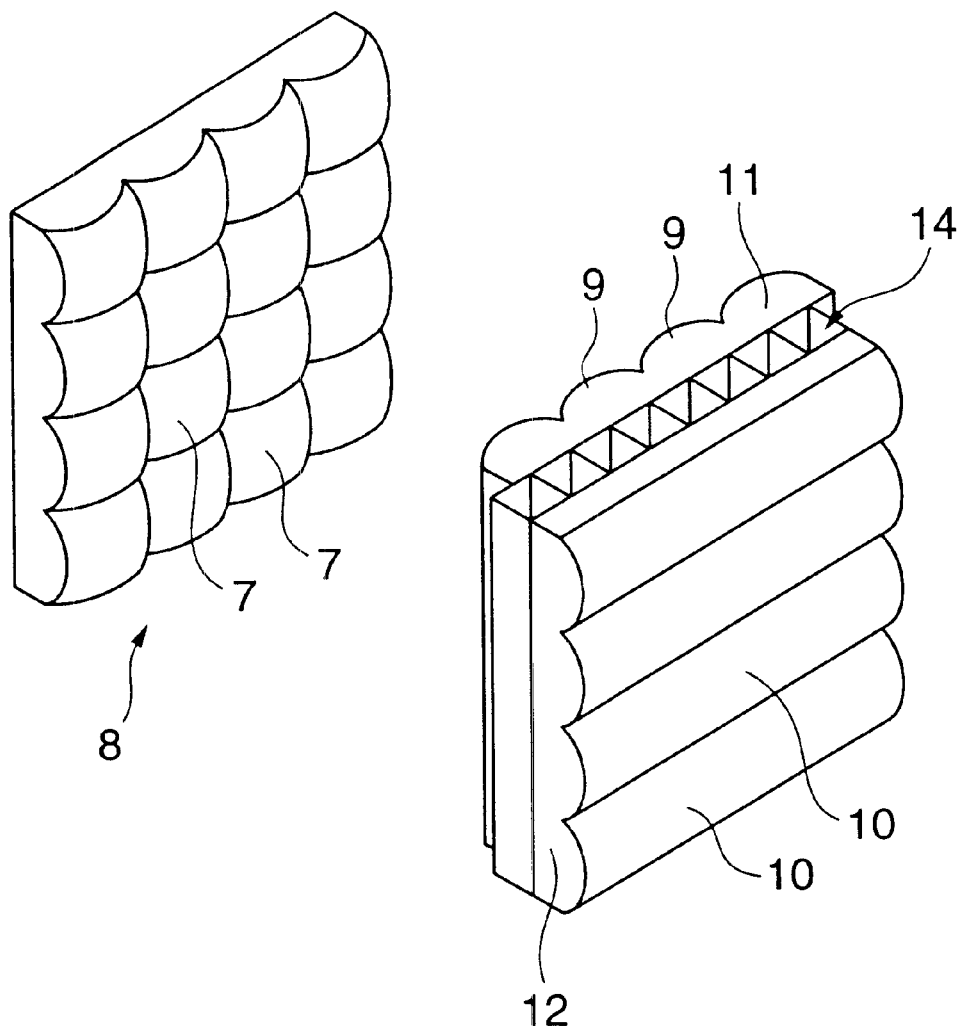
FIG. 10 shows a perspective view showing correspondence relationship between the lens plate, first and second lenticules and polarization aligning prism array.

The polarization aligning prism array 14 has, for example, as shown in FIG. 9A, polarization separating prisms 15 for separating P-polarized components and S-polarized components and total reflection prisms 16 disposed alternately, and, also, $\lambda/2$-phase-difference plates 17 disposed on the surfaces through which the light fluxes of polarized components of one type (P-polarized components or S-polarized components) obtained from the separation through the polarization separating prisms 15 output. However, alternatively, the $\lambda/2$-phase-difference plates 17 may be disposed on the output surfaces of the total reflection prisms 16. Further, alternatively, as shown in FIG. 9B, the $\lambda/2$-phase-difference plates 17 may be disposed between the polarization separating prisms 15 and total reflection prisms 16. Further, the polarization aligning prism array 14 is disposed so that the particular cylindrical lenses 9 of the first lenticule 11 correspond to the particular polarization separating prisms 15, respectively, and all the light fluxes passing through the particular cylindrical lenses 9 approximately pass through the corresponding polarization separating prisms 15, respectively (see FIG. 12A).

For example, with regard to respective light fluxes (P+S) having random polarization directions emitted from the light source 3, in the polarization aligning prism array 14, the P-polarized components are transmitted by the polarization separating prisms 15 and rotated by 90 degrees through the $\lambda/2$-phase-difference plates 17 so as to be transformed into S-polarized components, while the S-polarized components are reflected by the polarization separating prisms 15 and total reflection prisms 16 and emitted therefrom as they are. Thereby, all the light fluxes having passed through the polarization aligning prism array 14 become ones of the S-polarized components. That is, the light fluxes having random polarization directions emitted from the light source 3 are incident on the polarization aligning prism array 14, and are then emitted therefrom as only the S-polarized components. In this polarization transformation process, the transformation efficiency is better when light incident on the polarization aligning prism array 14 is of parallel light fluxes.

In the third embodiment, preceding to the polarization separating prisms 15 of the polarization aligning prism array 14, the first lenticule 11 having the array-structure cylindrical lenses 9 same as the polarization separating prisms 15 arranged therein is disposed, light is converged only in one direction (width direction of the polarization separating prisms 15) by each cylindrical lens 9. Thereby, it is possible to reduce the power in the condensing part and to reduce the load (stress) on the beam splitter surfaces of the polarization separating prisms 15. Further, in view of shapes, it is easy to make an arrangement such that the row of the polarization separating prisms 15 and the row of the total reflection prisms 16 of the polarization aligning prism array 14 correspond to the respective cylindrical lenses 9 of the first lenticule 11.

Figure 11A:
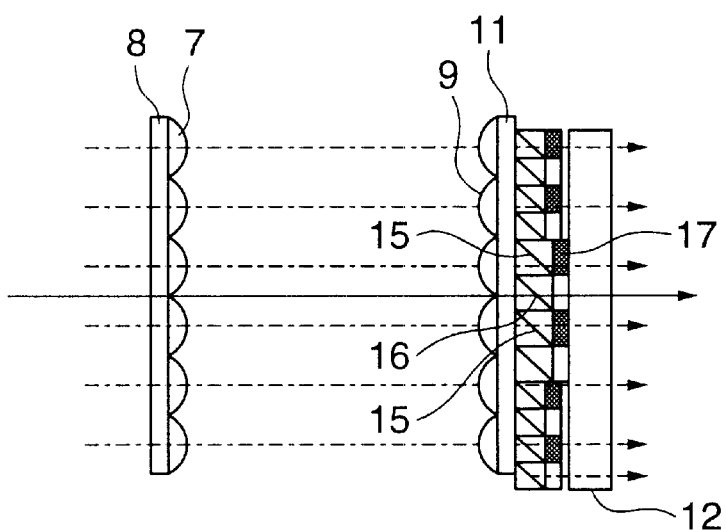
FIGS. 11A and 11B show an arrangement showing the correspondence relationship between the lens plate, first and second lenticules and polarization aligning prism array.
Figure 11B:
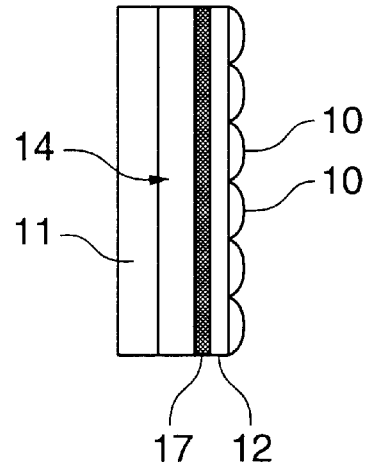

As described above, the light source 3 is actually not a point source but has a volume. Accordingly, energy is large and blur occurs at a center, and, a light flux is likely to expand nearer to the center. In such a case where the light source cannot be regarded as a point source, it is possible to balance the entirety by enlarging the aperture widths of the cylindrical lenses 9 and 10 at the center, as shown in FIGS. 11A and 11A. In this case, the sizes of the pairs of prisms (polarization separating prisms 15 and total reflection prisms 16) are changed correspondingly to the aperture widths of the cylindrical lenses 9 and 10 of the first and second lenticules 11 and 12. Accordingly, in the third embodiment in which the polarization aligning prism array 14 is provided, the polarization aligning function can be sufficiently performed in the case where the aperture widths of the cylindrical lenses 9 and 10 of the first and second lenticules 11 and 12 are enlarged.

Figure 12A:
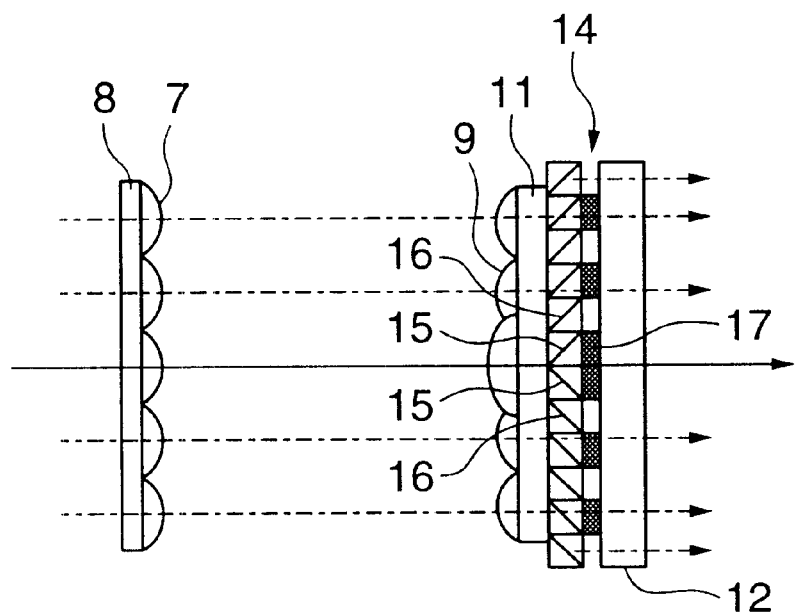
FIGS. 12A and 12B show a variant example of an arrangement showing the correspondence relationship between the lens plate, first and second: lenticules and polarization aligning prism array.
Figure 12B:
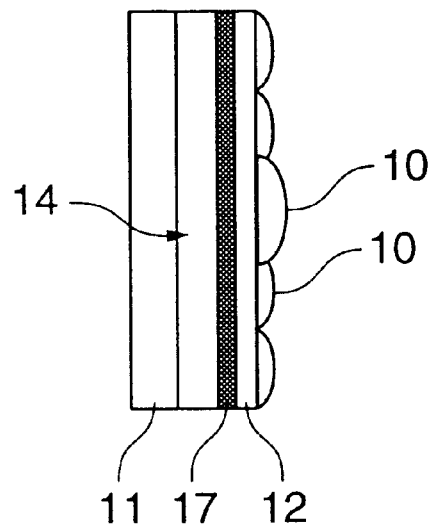

Alternatively, as shown in FIGS. 12A and 12B, an arrangement may be made such that only single cylindrical lenses 9 and 10 at the center heave wider apertures, and the polarization aligning prism array 14 is arranged symmetrically at the center. More specifically, the polarization alighting prism array 14 has the polarization separating prisms 15 disposed symmetrically at the center, and the corresponding total reflection prisms 16 disposed at the outside thereof, and, thereby, the entirety of the polarization alleging prism array 14 including the outside thereof: is symmetrical. Thereby, in the arrangement in which the polarization alighting prism array 14 is provided, the polarization aligning function can be sufficiently performed in the case where the aperture widths of the cylindrical lenses 9 and 10 of the first and second lenticules 11 and 12 are enlarged, and, also, manufacture of the polarization aligning prism array 14 is easy because it has the symmetrical structure.

Figure 13A:
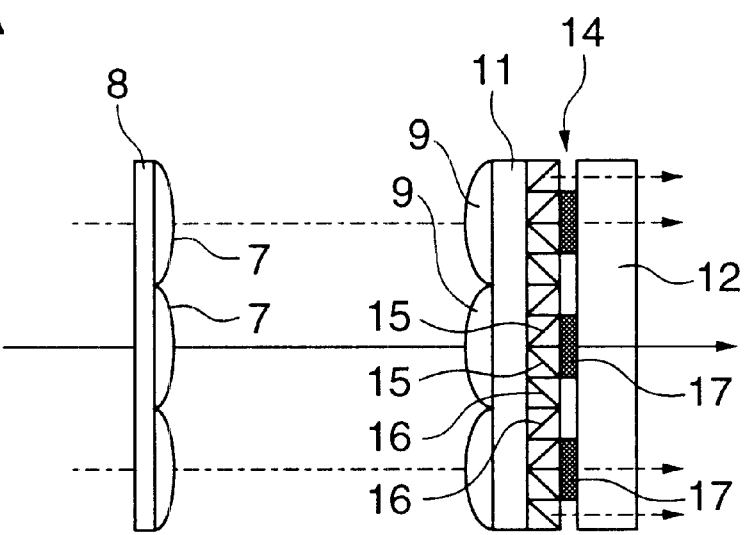
FIGS. 13A and 13B show another variant example of an arrangement showing the correspondence relationship between the lens plate, first and second lenticules and polarization aligning prism array.
Figure 13B:
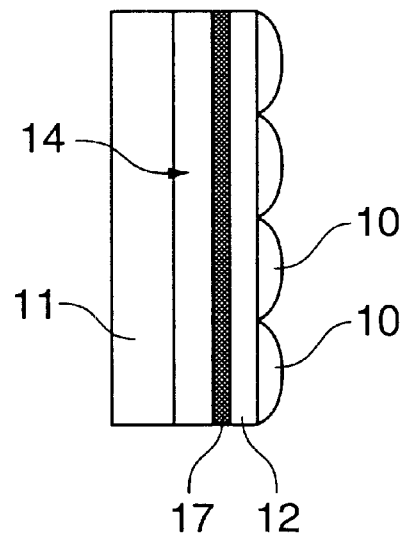
Figure 14:
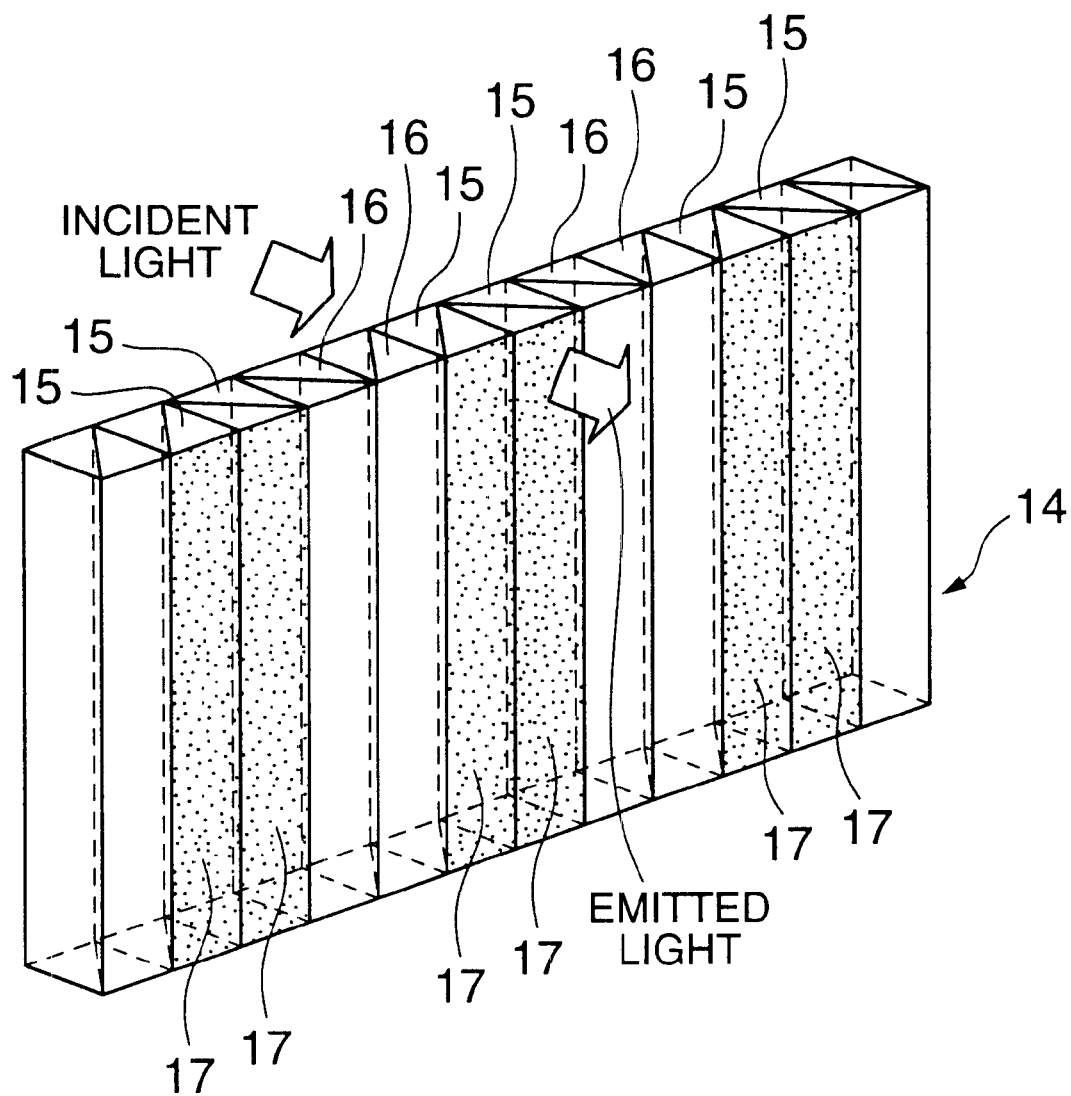
FIG. 14 shows a perspective view of that example of the arrangement of the polarization aligning prism array.

Further, as a variant embodiment thereof, in a case where the lens elements 7 of the lens plate 8 have an arrangement of 3×4 pieces, and the cylindrical lenses 10 of the second lenticule 12 are the same as each other, an arrangement may be made such that central symmetrical two pairs of polarization separating prisms 15 and total reflection prisms 16 correspond to each cylindrical lens 9, as shown in FIGS. 13A, 13B and 14. In this case, the λ/2-phase-difference plates 17 may be disposed on the output surfaces of the total reflection prisms 16, or may be disposed between the polarization separating prisms 15 and total revelation prisms 16.

Figure 15A:
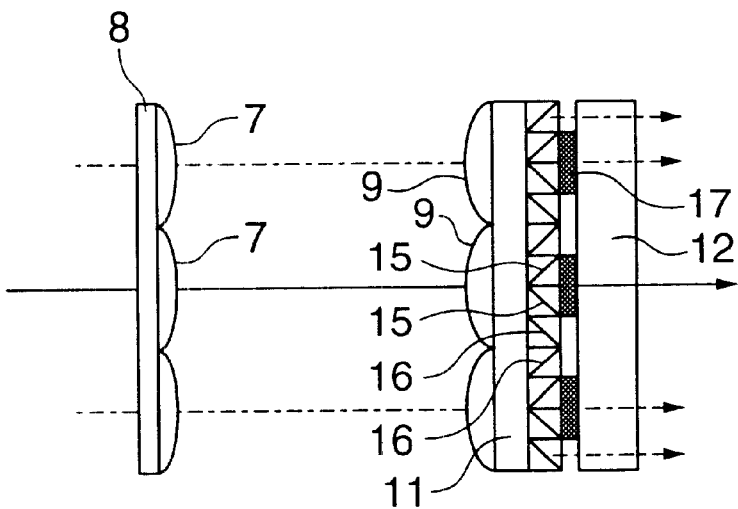
FIGS. 15A and 15B show a further variant example of an arrangement showing the correspondence relationship between the lens plate, first and second lenticules and polarization aligning prism array.
Figure 15B:
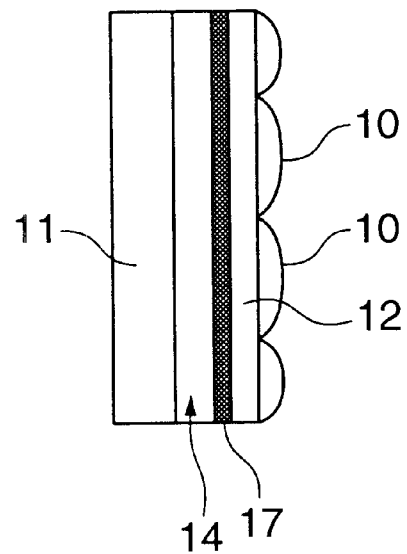

Further, in the case where the lens elements 7 of the lens plate 8 have the arrangement of 3×4 pieces, the aperture widths of the cylindrical lenses 10 of the second lenticule 12 at the center may be enlarged, as shown in FIGS. 15A and 15B.

Figure 16:
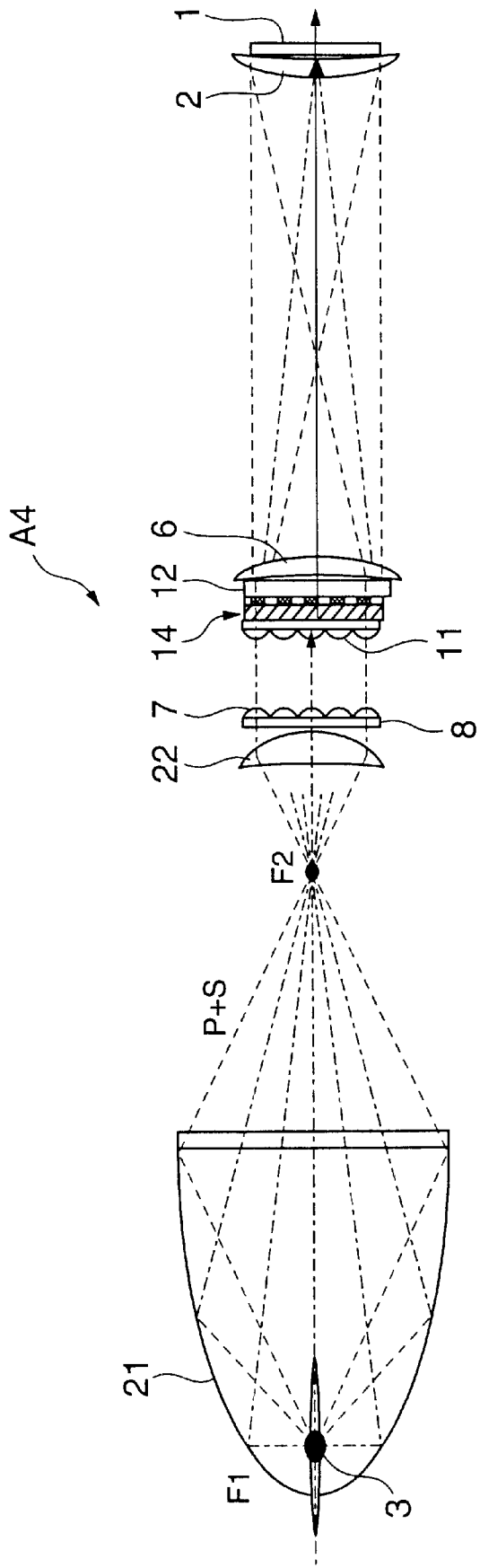
FIG. 16 shows an optical system arrangement in a fourth embodiment of the present invention.

A fourth embodiment of the present invention will now be described based on FIG. 16. FIG. 16 shows a general arrangement of an illumination system A4 in the fourth embodiment.

This illumination system A4 employs a spheroid mirror 21 as a reflection mirror in which a light source 3 is built.

This spheroid mirror 21 has a first focal point F1 and a second focal point F2, and has an opening formed intermediately between the first and second focal points F1 and F2. The spheroid mirror 21 has a function of condensing light emitted from the light source 3 disposed at or near the first focal point F1 toward the second focal point F2. A convex lens 22 is disposed outside of the second focal point F2, that is, at a position on the side of the liquid crystal panel 1 with respect to the second focal point F2. The convex lens 22 has a function of transforming a light flux which is condensed toward the focal point F2 and then again diverges into a parallel light flux. Subsequent to the convex lens 22, the integrator optical system 5 having the arrangement described above is disposed. In this arrangement, the polarization aligning prism array 14 is also included.

In this arrangement, light emitted from the light source 3 disposed at the first focal point F1 and efficiently reflected by the spheroid mirror 21 is condensed to the second focal point F2, and, in a process of again diverging, is transformed into a parallel light flux by the convex lens 22 and incident on the lens plate 8, and, forms secondary light-source images 13 as divisions thereof by the respective lens elements 7 of the lens plate 8. As a result of the light fluxes emitted from the secondary light-source images 13 formed by the respective lens elements 7 being directed toward the center of the liquid crystal panel 1, the light fluxes passing through the particular lens elements 7 each having a rectangular shape having an aspect ratio of 4:3 illuminate the liquid crystal panel 1 in a condition of being superposed on each other. In this case, as a result of the light-source unit having the spheroid mirror 21 as the reflection mirror thereof, the light source 3 being disposed at or near the first focal point F1 thereof and the convex lens 22 being disposed outside of the second focal point F2, it is possible that the light flux from the light source 3 is efficiently condensed by the spheroid mirror 21 toward the second focal point F2, and, then, is transformed into a parallel light flux by the convex lens 22, and is incident on the integrator optical system 5. Thereby, in comparison to a case where a light flux is transformed into a parallel light flux as a result of being caused to diverse by a concave lens disposed on a path along which the light flux is condensed toward the second focal point, it is possible to improve optical characteristics, and, also, to reduce expansion of the secondary light-source images 13 acting as the virtual light sources to the utmost. As a result, this arrangement is advantageous for reducing the apertures or diameters of the projection lenses in a condition in which the spatial distance between the light source 3 and liquid crystal panel 1 is short. With regard to the other points, the fourth embodiment is the same as the above-described embodiments.

Figure 17:
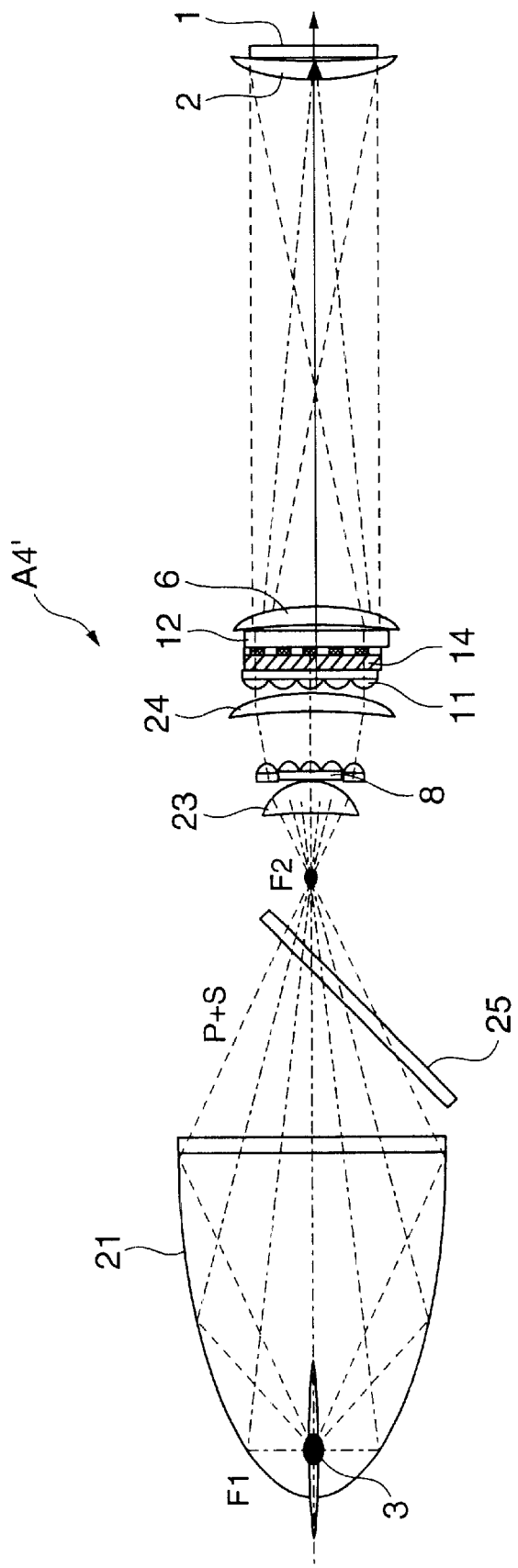
FIG. 17 shows an optical system arrangement in a variant embodiment of the fourth embodiment of the present invention.

As a variant embodiment of the fourth embodiment, an arrangement may be made such that two convex lenses 23 and 24 are provided, the convex lens 23 is disposed preceding to the lens plate 8, the convex lens 24 is disposed preceding to the first lenticule 11, as shown in FIG. 17. Thereby, the light flux is transformed into a parallel light flux by the convex lens 23 and incident on the lens plate 8, and, then, the light emitted from the lens plate 8 is transformed into a parallel light flux by the convex lens 24 and is incident on the first lenticule 11 and polarization aligning prism array 14. Thereby, a designing work for the convex lenses 23 and 24 is easy. Further, a reflection mirror 25 is provided as shown in the figure in a case where the spheroid mirror 21 is disposed in a condition in which the orientation thereof is changed by 90°.

Figure 18:
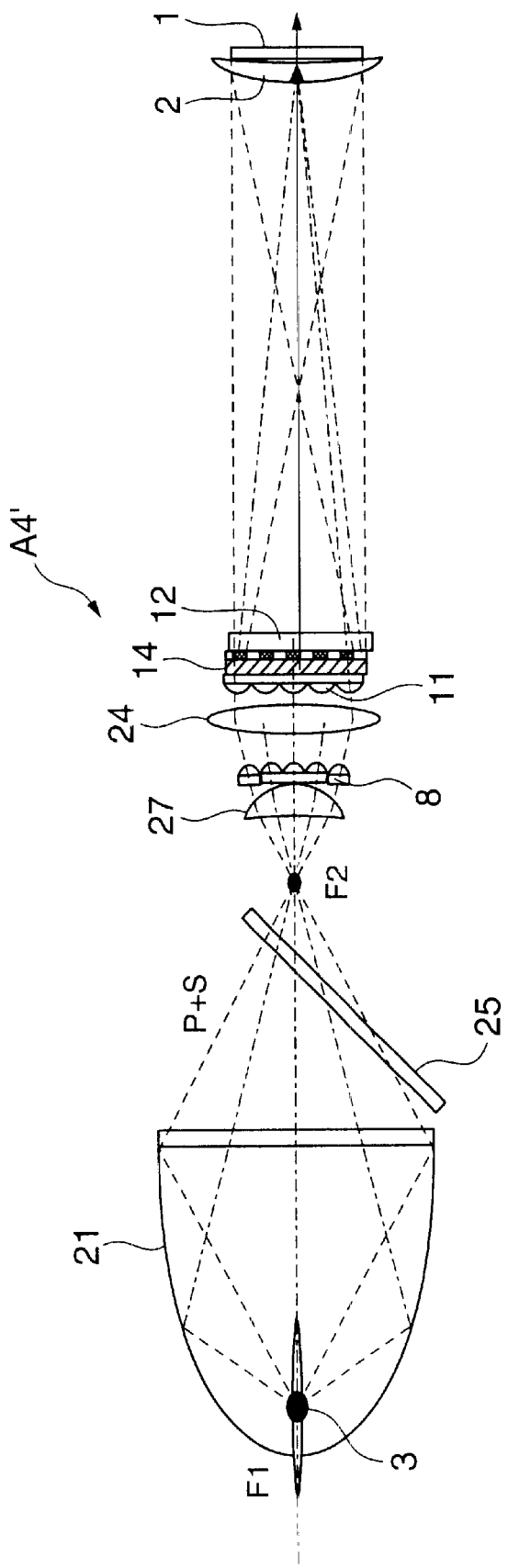
FIG. 18 shows an optical system arrangement in another variant embodiment of the fourth embodiment of the present invention.

When the distance between the second lenticule 12 and liquid crystal panel 1 is long, the convex lens 6 (on the output side) subsequent to the second lenticule 12 may be omitted as shown in FIG. 18.

Figure 19:
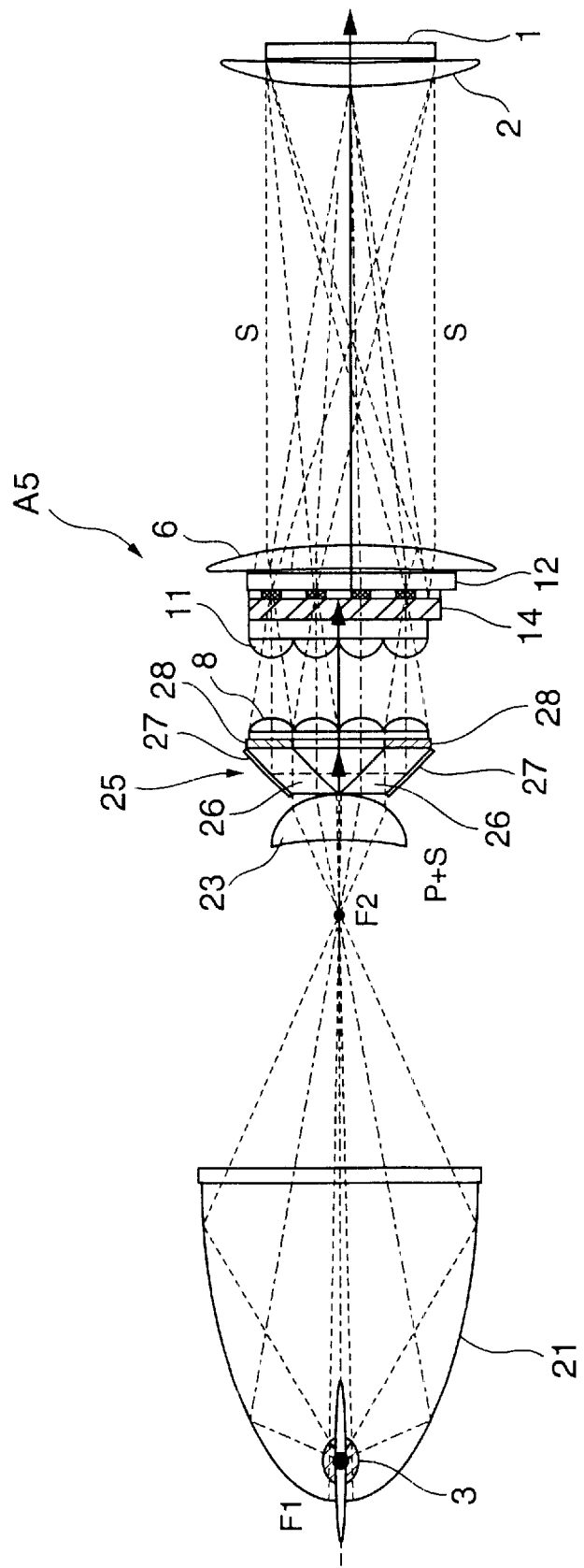
FIG. 19 shows an optical system arrangement in a fifth embodiment of the present invention.

A fifth embodiment of the present invention will now be described based on FIG. 19. An illumination system A5 in the fifth embodiment has a first polarization aligning unit 25 provided between the convex lens 23 and lens plate 8, and the polarization aligning prism array 14 is used as a second polarization aligning unit.

The first polarization aligning unit 25 has approximately parallel light fluxes having random polarization directions emitted from the light source 3 incident thereon and emits polarized components of one type (P-polarized components or S-polarized components). Basically, the first polarization aligning unit 25 is configured with a combination of a polarization separating prism 26, a total reflection prism 27 and a λ/2-phase difference plate 28 as a unit. For example, the S-polarized component of P+S polarized light incident on the polarization separating prism 26 is transmitted thereby as it is, and emitted therefrom. On the other hand, the P-polarized component is reflected by the polarization and separation surface of the polarization separating prism 26, and, also, is reflected by the total reflection prism 27 in the direction same as that of the S-polarized component, and the polarization plane thereof is rotated by 90 degrees by the λ/2-phase-difference plate 28, thus being transformed into the S-polarized component. As a result, all the light flux incident on the first polarization aligning unit 25 is emitted as the light flux of the S-polarized component to the lens plate 8. In the fifth embodiment, two pairs of elements thereof disposed central-symmetrically are used as the first polarization aligning unit 25. That is, two polarization separating prisms 26, two total revelation prisms 27 and two λ/2-phase-difference plates 28 are combined in!such a manner that the two polarization separating prisms 26 are adjacent to one another.

Accordingly, in the illumination system A5 in the fifth embodiment, the two polarization aligning units, i.e., the first polarization alleging unit 25 and polarization aligning prism array 14, are provided, and two steps of polarization aligning process are performed. Thereby, the degree (purity) of polarization alignment increases, and, as a result, the light utilization efficiency can be improved.

Although depending on a purpose of utilization of the illumination system, when the central wavelength of the λ/2-phase-difference plates 28 of the first polarization aligning unit 25 and the central wavelength of the λ/2-phase-difference plates 17 of the polarization aligning prism array 14 are made to be coincident with one another, for example, the aligned polarization characteristics can be sharpened, and the degree of polarization alignment can be increased. Alternatively, the central wavelength of the λ/2-phase-difference plates 28 of the first polarization aligning unit 25 and the central wavelength of the λ/2-phase-difference plates 17 of the polarization aligning prism array 14 may differ by the amounts of ± a predetermined wavelength, for example, approximately ±50 nm, from the green wavelength, respectively. Thereby, a wavelength band is provided. Thereby, it is possible to increase the polarization transformation performance at both sides at which the efficiency otherwise decreases. As a result, by providing the wavelength band, it is possible to make the polarization characteristic uniform.

Figure 20:
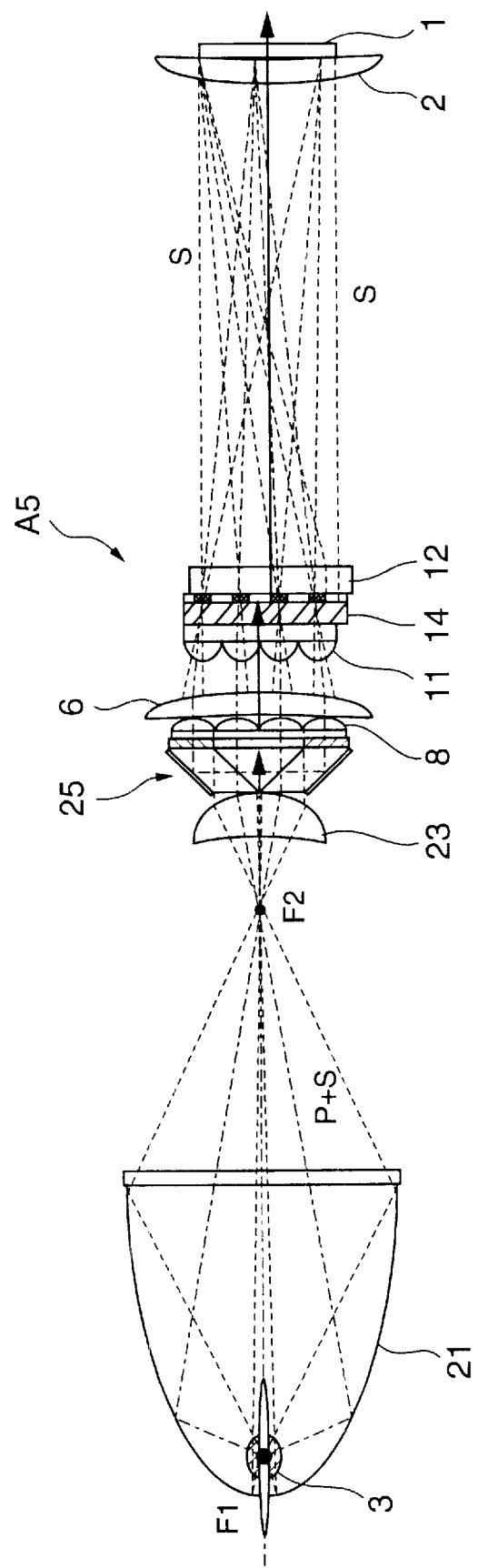
FIG. 20 shows an optical system arrangement in a variant embodiment of the fifth embodiment of the present invention.

Further, instead of disposing the convex lens 6 subsequent to the second lenticule 12, the convex lens 6 may be disposed immediately subsequent to the lens plate 8, as shown in FIG. 20.

Figures 21A, 21B:
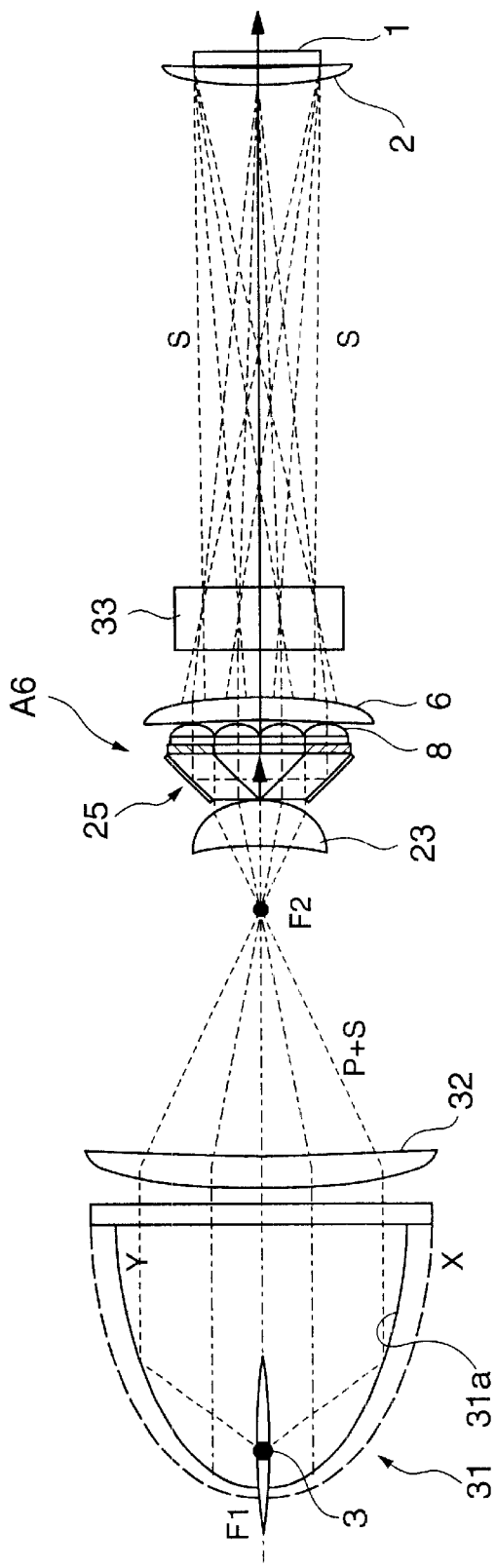
FIGS. 21A and 21B show an optical system arrangement in a sixth embodiment of the present invention.

A sixth embodiment of the present invention will now be described based on FIGS. 21A, 21B and 22. An illumination system A6 in the sixth embodiment employs a flat parabolic mirror 31 in the light-source part for forming an approximately parallel light. That is, the reflection mirror for the light source 3 is not a parabolic mirror having a cross section of a true circle, but is formed to a shape having a paraboloid of revolution 31b but being made to be flat so that the shape of the opening thereof 31a has a ratio of 4:3 in the X and Y directions in accordance with the aspect ratio 4:3 in the vertical and horizontal directions of the liquid crystal panel 1, as shown in FIG. 21B. FIG. 21A shows different states having different expansions of paraboloid by a solid line and a broken line. The focal point F of the flat parabolic mirror 31 is single, that is, is set to be common regardless of the X and Y directions, and the light source 3 is disposed at the focal point F.

Figure 22:
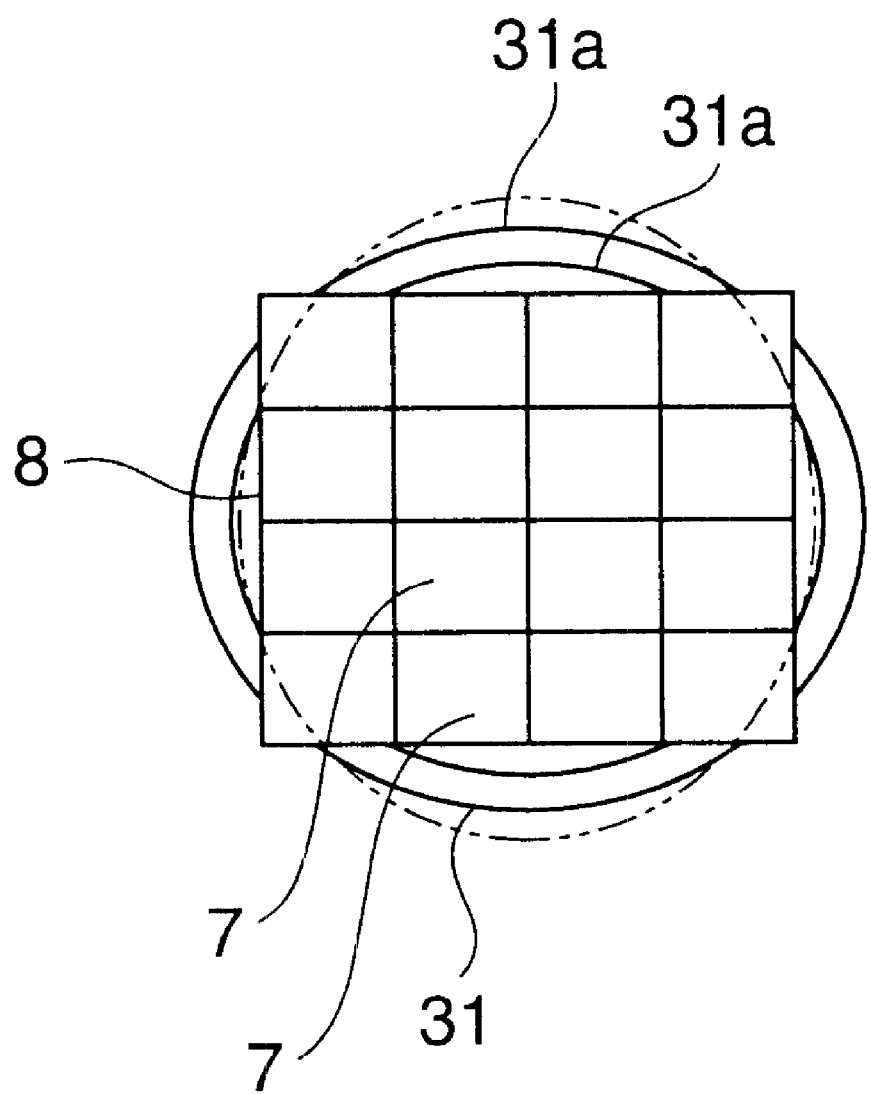
FIG. 22 illustrates a correspondence relationship between an opening of a flat parabolic mirror and a fly-eye lens plate of the sixth embodiment shown in FIGS. 21A and 21B.

FIG. 22 typically shows a relationship between the size of the opening 31a of the flat parabolic mirror 31 and the size of the lens plate 8. The ratio of the opening 31a in the X and Y directions is 4:3, the ratio of each lens element 7 is 4:3, and, also, the ratio of the lens plate 8 itself is 4:3. The lens elements 7 are arranged to the amount of 4 rows ×4 columns. When the light from the light source is incident on all the lens elements 7, the size of the opening 31a is determined to the size such that the opening 31a circumscribes the lens plate 8 (the largest one). When the light from the light source is incident on all the lens elements 7 but those at the four corners, the size of the opening 31a is determined to the size such that the opening 31a inscribes the lens plate 8 (the smallest one). Alternatively, size of the opening 31a may be determined to the size intermediate therebetween.

A convex lens 32 condenses the light fluxes emitted from the flat parabolic mirror 31 as an approximately parallel light toward a position corresponding to the second focal point F2 thereof. Further, a group 33 of condensing lenses may be an optical device including the above-described first and second lenticules 11 and 12, polarization aligning prism array 14 and so forth, and may be of any combination of those shown in FIGS. 16 through 20.

Accordingly, in the sixth embodiment, the reflection mirror itself is not a parabolic mirror having an opening of a shape of a true circle, but the flat parabolic mirror 31 having the shape of the paraboloid of revolution 31 but deformed to be flat to have the ratio in accordance with the aspect ratio of the liquid crystal panel 1 which is an object of illumination in a condition in which the focal point at which the light source 3 is disposed is made to be common. Thereby, the light emitted as a result of being reflected by the flat parabolic mirror 31 has a shape near to the liquid crystal panel 1, that is, the field angle. Accordingly, it is possible to efficiently utilize all the light fluxes emitted by the light source. Thereby, it is possible to reduce the light components emitted from the light source but not incident on the lens plate 8 to the utmost.

Figure 23:
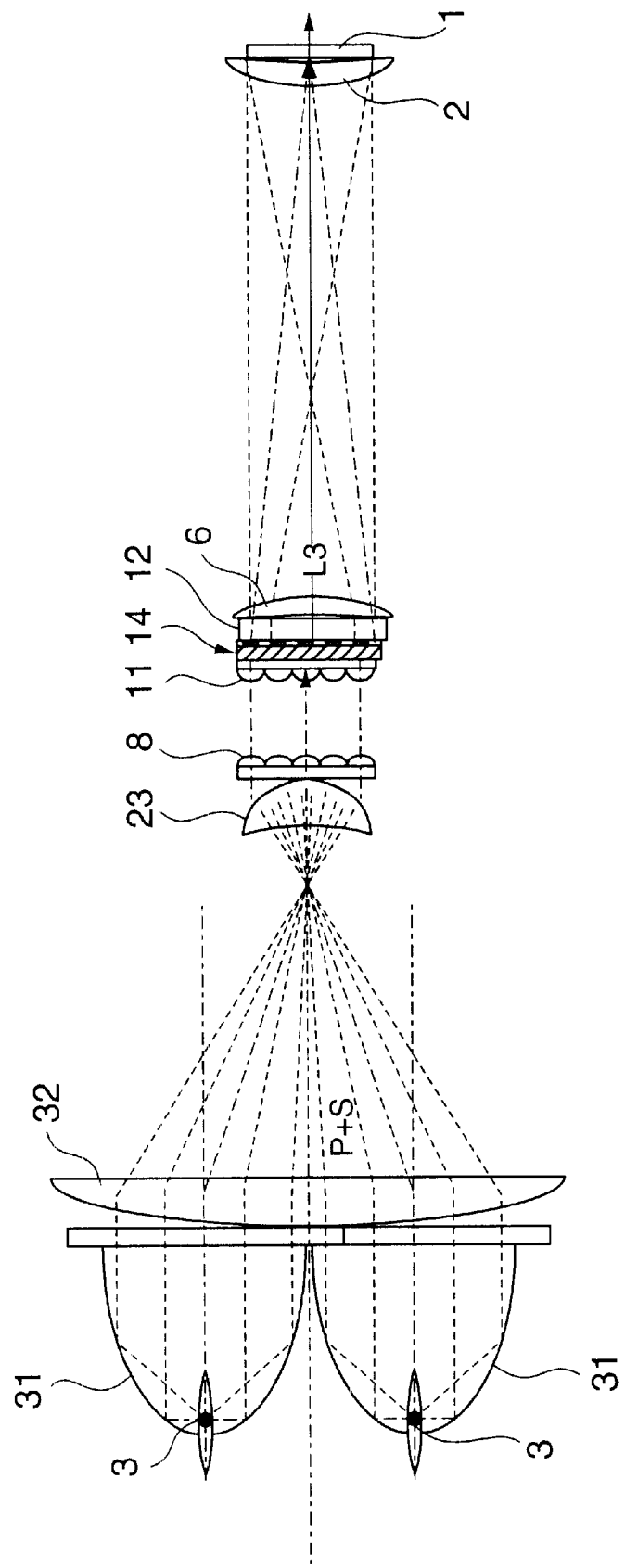
FIG. 23 shows an optical system arrangement in a variant embodiment of the sixth embodiment of the present invention.

Instead of the single light source 3 and so forth, a plurality thereof may be provided. For example, as shown in FIG. 23, a plurality of pairs each consisting of the light source 3 and flat parabolic mirror 31 may be provided. The essential point is that the light fluxes incident on the convex lens 32 should be of parallel light. In this case, instead of the flat parabolic mirrors 31, the parabolic mirrors 4 or the like may also be used.

Figure 24:
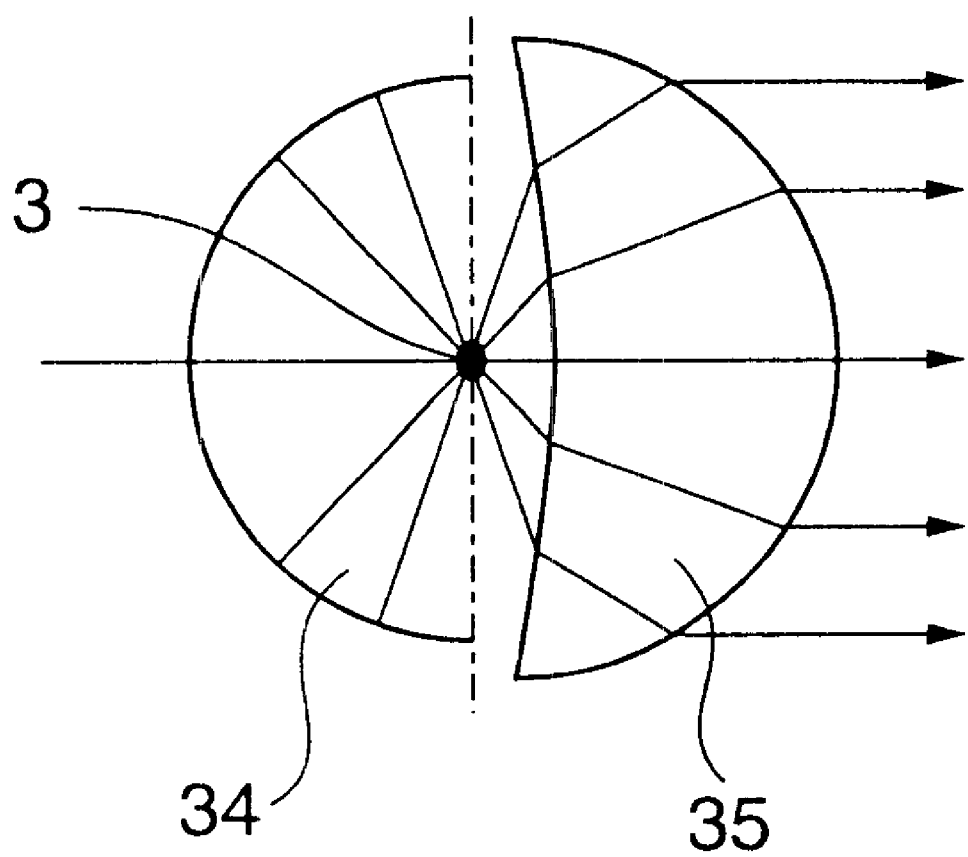
FIG. 24 shows an optical system arrangement showing a light-source device in a seventh embodiment of the present invention.

A seventh embodiment of the present invention will now be described based on FIG. 24. In this embodiment, a parallel light flux is obtained using a combination of a spherical mirror 34 and an aspherical convex lens 35 in a light source part. With regard to an arrangement subsequent to the aspherical. convex lens 35 the corresponding part of each embodiment described above may be applied thereto.

Figure 25:
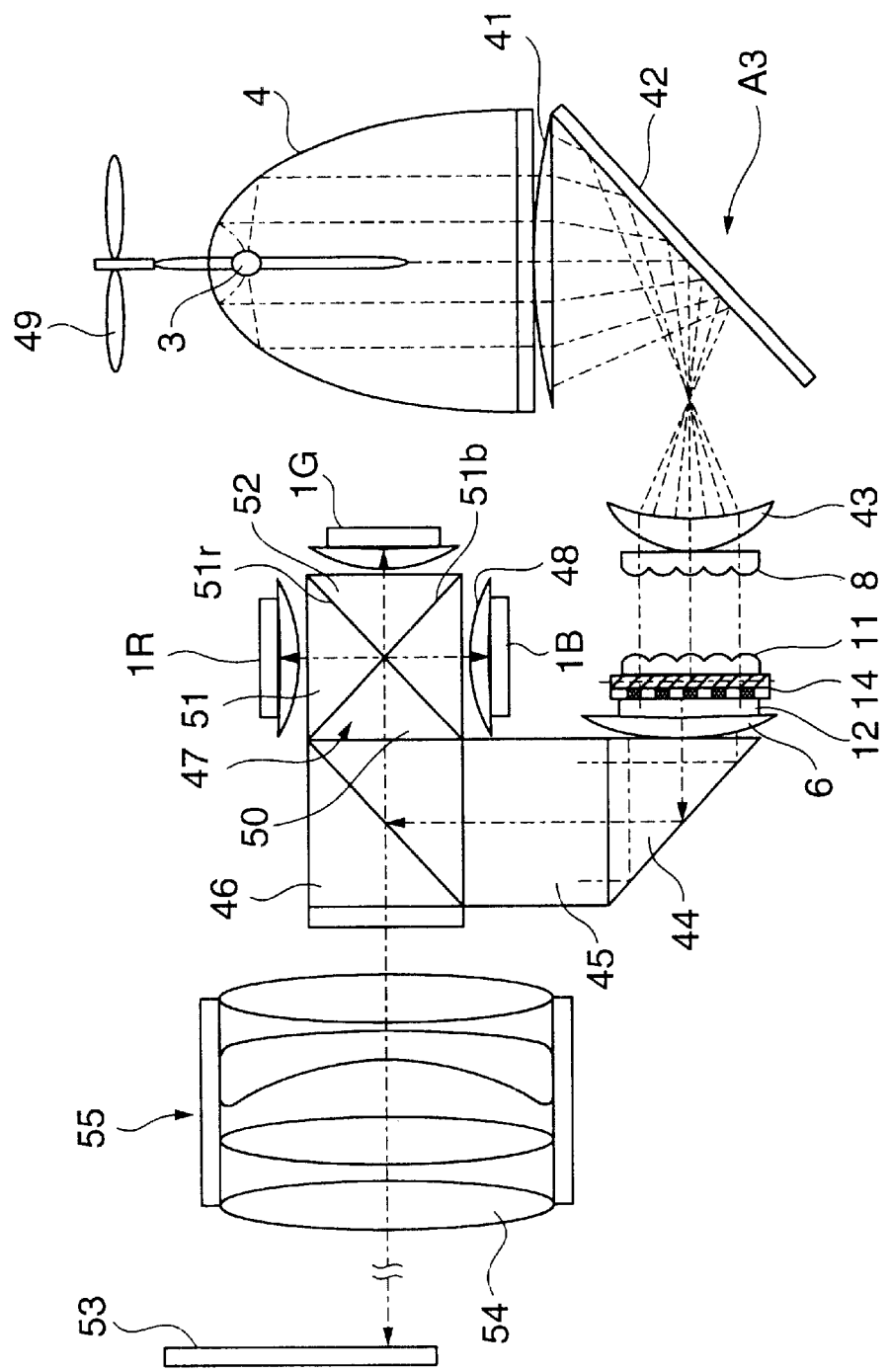
FIG. 25 shows a liquid crystal projector in an eighth embodiment of the present invention.

An eighth embodiment of the present invention will now be described based on FIG. 25. FIG. 25 shows an example of an arrangement of a liquid crystal projector in the eighth embodiment. This liquid crystal projector is an example employing the illumination system A3 shown in FIGS. 8A through 8C for example (however, a convex lens 41, a total reflection mirror 42 for deflecting a light path, and a collimator lens 43 being inserted on the light path between the parabolic mirror 4 and lens plate 8), and further includes a total reflection prism 44, a connection prism 45, a polarization beam splitter 46, a spectro condensing device 47, three reflection-type liquid-crystal panels 1R, 1G and 1B, a condenser lens 48 for each one of the reflection-type liquid-crystal panels 1R, 1G and 1B. Further, a cooling fan 49 is provided.

The polarization beam splitter 46 reflects the light of an S-polarized component emitted from the illumination system A3 by 90 degrees toward the spectro condensing device 47. A dichroic prism 50 is used as the spectro condensing device 47 in this embodiment. The dichroic prism 50 is a cube-shaped optical device configured to have four prisms 51 and 52 bonded together, where the pair of prisms 51 provided with a red layer 51r having a property of reflecting only light having a wavelength equal to or longer than the red R and blue layer 51b having a property of reflecting only light having a wavelength equal to or shorter than the blue B are disposed at vertically symmetrical positions, and the pair of ordinary prisms 52 are disposed at horizontally symmetrical positions. Accordingly, when the dichroic prism 50 is considered as a single spectro condensing device, the dichroic prism 50 has the red layer 51r parallel to the reflection surface of the polarization beam splitter 46 and the blue layer 51b perpendicular to the red layer 51r. The red layer 51r and blue layer 51b are formed of multilayer nonmetallic films.

The three reflection-type liquid crystal panels 1R, 1G and 1B are disposed correspondingly to the red layer 51r and blue layer 51b of the dichroic prism 50. That is, the reflection-type liquid crystal panel 1R is disposed in the direction in which the light having the wavelength equal to or longer than the red R is reflected by the red layer 51r, the reflection-type liquid crystal panel 1B is disposed in the direction in which the light having the wavelength equal to or shorter than the blue B is reflected by the blue layer 51b, and the reflection-type liquid crystal panel 1G is disposed in the direction in which the light is transmitted by the red layer 51r and blue layer 51b. Images of the respective colors to be projected are formed in these reflection-type liquid crystal panels 1R, 1G and 1B through on/off control of each liquid crystal element thereof by an information display system not shown in the figure.

A projection lens system 55 having projection lenses 54 is provided on the optical axis between the polarization beam splitter 46 and a screen 53. There, the light paths from a virtual light-source surface (positions of secondary light-source images 13) to the respective reflection-type liquid crystal panels 1R, 1G and 1B are approximately equal to each other, and the light paths between the respective reflection-type liquid crystal panels 1R, 1G and 1B and projection lenses 54 are approximately equal to each other.

In this arrangement, the light flux from the illumination system A3 made to be of only S-polarized component is reflected by the total reflection prism 44 and polarization beam splitter 46, and is incident on the spectro condensing device 46. There, the light is separated into the red R, green G and blue B in accordance with the wavelengths thereof, which are then incident on the corresponding reflection-type liquid crystal panels 1R, 1G and 1B, respectively. The respective reflection-type liquid crystal panels 1R, 1G and 1B are turned on and off in accordance with image signals input to the liquid crystal projector from the information display system. When they are turned off, the S-polarized component is reflected thereby as it is. When they are turned on, the S-polarized component is reflected thereby being transformed (modulated) into the P-polarized component. The light including the S-polarized light component and P-polarized light component reflected by the respective reflection-type liquid crystal panels 1R, 1G and 1B is collected and combined by the dichroic prism 50, respectively, and returns to the polarization beam splitter 46. At this time, only the P-polarized component reflected by each of the respective reflection-type liquid crystal panels 1R, 1G and 1B at the turned on liquid crystal elements thereof is transmitted by the polarization beam splitter 46. Thereby, the thus-transmitted light is magnified and projected onto the screen 53 through the projection lens system 55. Thereby, an image in accordance with the image signals input to the liquid crystal projector is displayed on the screen 53 as a color image.

In the eighth embodiment, the illumination system A3 described above is employed. Accordingly, it is possible to reduce expansion of the secondary light source images acting as the virtual light source for illuminating the liquid crystal panels 1R, 1G and 1B, and, thereby, this arraignment is advantageous for reducing the apertures/diameters of the projection lenses 54.

Although the eighth embodiment is an example of employing the illumination system A3 illustrated in FIGS. 8A through 8C, it is not necessary to be limited to this, and the illumination system in any of the above-described embodiments may be used instead.

Figure 26:
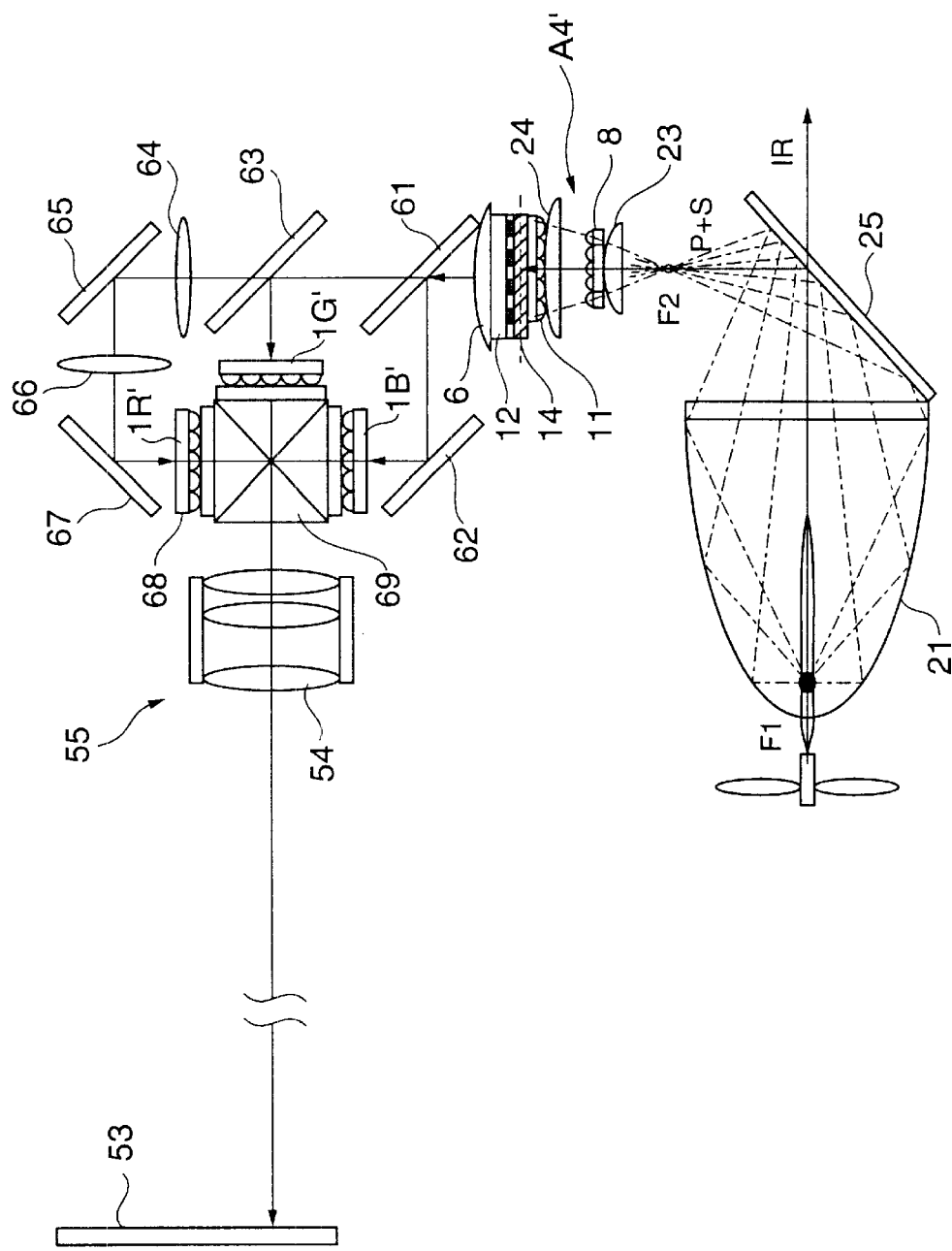
FIG. 26 shows a liquid crystal projector in a variant embodiment of the eighth embodiment of the present invention.

It is also possible to apply an illumination system according to the present invention to a liquid crystal projector employing transmission-type liquid crystal panels 1R', 1G' and 1B', as shown in FIG. 26. In the case of FIG. 26, setting is made such that, with regard to the light flux from the illumination system A4' shown in FIG. 17 made to have the same polarization direction, the light having the wavelength, equal to or shorter than blue B reflected by a spectro mirror 61 for blue, also, reflected by a total reflection mirror 62 is directed to the transmission-type liquid crystal panel 1B', the light having the wavelength longer than blue B and equal to or shorter than green G transmitted by the spectro mirror 61 for blue and reflected by a spectro mirror 63 for green is directed to the transmission-type liquid crystal panel 1G', and the light having the wavelength equal to or longer than the red R transmitted by the spectro mirror 63 for green, and reflected with the length of light path thereof corrected. by a relay lens 64, a total reflection mirror 65, a relay lens 66 and a total reflection mirror 67 is directed to the transmission-type liquid crystal panel 1R'. Further, in this embodiment, a micro lens array 68 is employed instead of the condenser lens 48 for each of the transmission-type liquid crystal panel 1R', 1G' and 1B', and, a light combining prism 69 is employed instead of the spectro condensing device 47. The micro lens array 68 is formed to have a matrix structure for units of liquid crystal elements for improving the light utilization efficiency for each liquid crystal element in the liquid crystal panels.

Figure 27A:
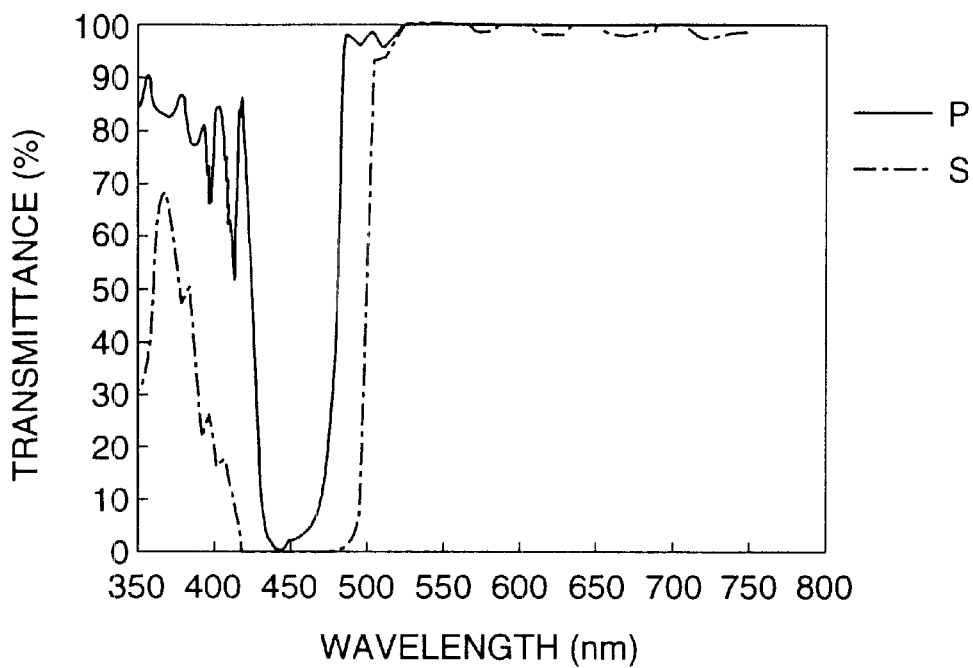
FIGS. 27A and 27B show polarization characteristics of a dichroic prism used in a ninth embodiment of the present invention.
Figure 27B:
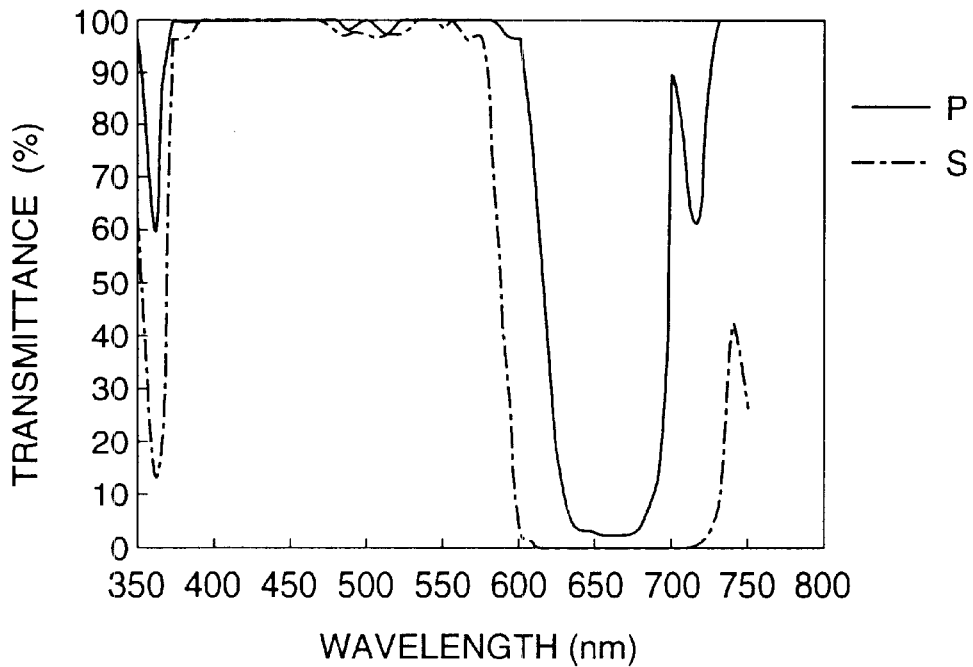

A ninth embodiment of the present invention will now be described based on FIGS. 27A through 38B. In prior to description of a projector, characteristics of a dichroic prism 201 used in the ninth embodiment as a color separation/color combining device will now be described. Also the dichroic prism 201 used in the ninth embodiment is of a cubic shape in which dichroic film 201r for red and a dichroic film 201b for blue are disposed orthogonally, as shown in FIG. 29A and so forth. However, as a result of further improvement in increasing the number of layers constituting each of the dichroic film 201r for red and dichroic film 201b for blue, the dichroic prism 301 has the polarization characteristics shown in FIGS. 27A and 27B. FIG. 27A shows transmittance characteristics/reflectivity characteristics for blue light of each of a P-polarized component and an S-polarized component of the dichroic film 201b for blue. As shown in the figure, the maximum reflectivity is 100% for the S-polarized component while the maximum reflectivity is on the order of 99% for the P-polarized component. It can be seen from that that the reflectivity is on the same order regardless of the polarized components. FIG. 27B shows transmittance characteristics/reflectivity characteristics for red light of each of a P-polarized component and an S-polarized component of the dichroic film 201r for red. As shown in the figure, the maximum reflectivity is 100% for the S-polarized component while the maximum reflectivity is on the order of 98% for the P-polarized component. It can be seen from that that the reflectivity is on the same order regardless of the polarized components. However, according to investigation of the inventors and so forth, it was seen that there is no problems even when the maximum reflectivity for the P-polarized component: is not so high as shown in FIGS. 27A and 27B as long as it is on the order same as that of the maximum reflectivity for the S-polarized component, and, it is sufficient that the maximum reflectivity is equal to or higher than 80% considering commercial values. Anyway, it is seen that, in the dichroic prism 201 used in the ninth embodiment, polarization dependency is reduced, and sufficient separating reflection characteristics can be obtained for both the S-polarized component and P-polarized component.

With regard to the polarization characteristics of the dichroic film 201r for red and dichroic film 201b for blue, ideally, it is preferable for performing color combination providing good color balance that the characteristics for the P-polarized component and S-polarized component coincide with one another. However, actually, it is not possible to cause the characteristics for both to coincide with one another completely. In this point, in the dichroic prism 201 in the ninth embodiment, a shift amount $|\lambda_{50P}-\lambda_{50S}|\approx 50$ nm, where $\lambda_{50P}$ represents the wavelength at which the reflectivity for the P-polarized component becomes 50% and $\lambda_{50S}$ represents the wavelength at which the reflectivity for the S-polarized component becomes 50% in the wavelength range of 400 nm $\leq \lambda \leq 550$ nm in the polarization characteristics of the dichroic film 201b for blue shown in FIG. 27A. A shift amount $|\lambda_{50P}-\lambda_{50S}|\approx 50$ nm, where $\lambda_{50P}$ represents the wavelength at which the reflectivity for the P-polarized. component becomes 50% and $\lambda_{50S}$ represents the wavelength at which the reflectivity for the S-polarized component becomes 50% in the wavelength range of 550 nm $\leq \lambda < 700$ nm in the polarization characteristics of the dichroic film 201r for red shown in FIG. 27B. Thus, each of the dichroic films 201b and 201r has a filtering function having a fixed shift for the P-polarized component with respect to the S-polarized component. Thereby, it is possible to provide color balance in no way inferior to a case where separate optical components are used for color separating and color combining. Also in this case, according to the investigation of the inventors and so forth, there is no problems when, with regard to each of the dichroic film 201r for red and dichroic film 201b for blue, the shift amount is on the order such that 10 nm $\leq |\lambda_{50P}-\lambda_{50S}| \leq 50$ nm.

Figure 28A:
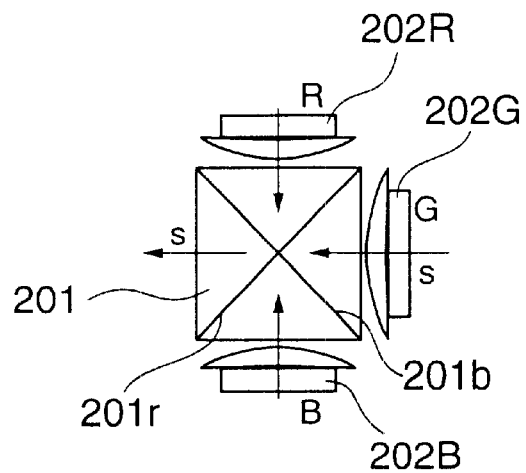
FIGS. 28A and 28B show an arrangement in a case where the dichroic prism is applied to a transmission-type liquid crystal panels and polarization combining characteristics of the dichroic:prism.
Figure 28B:
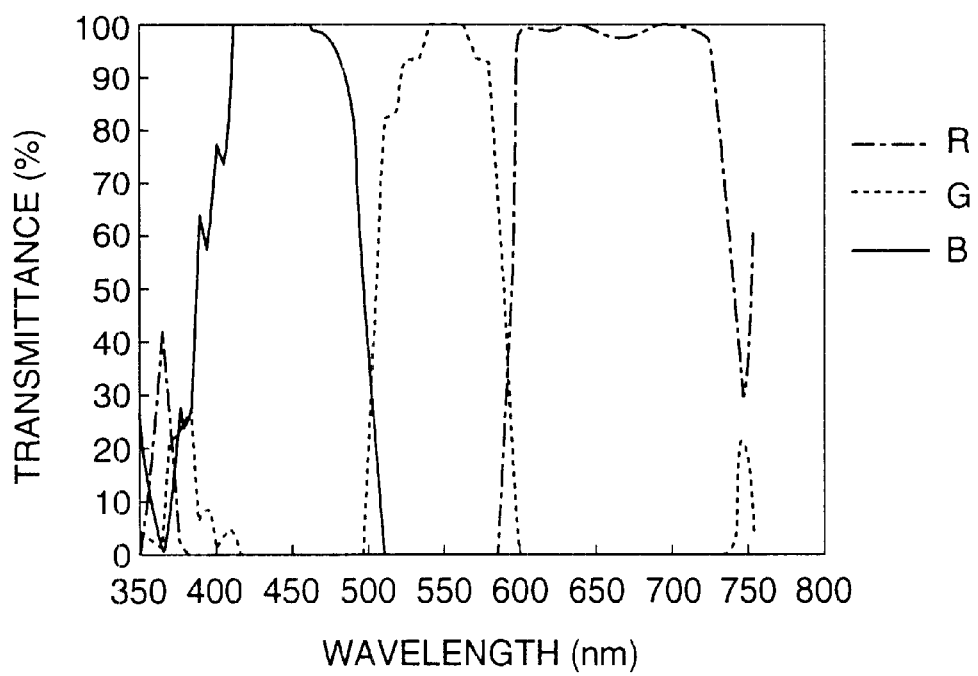
Figure 29A:
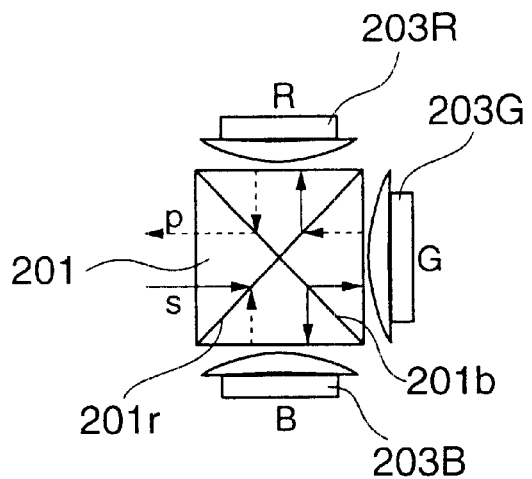
FIGS. 29A and 29B show an arrangement in a case where the dichroic prism is applied to a reflection-type liquid crystal panels and polarization separating and combining characteristics of the dichroic prism.
Figure 29B:
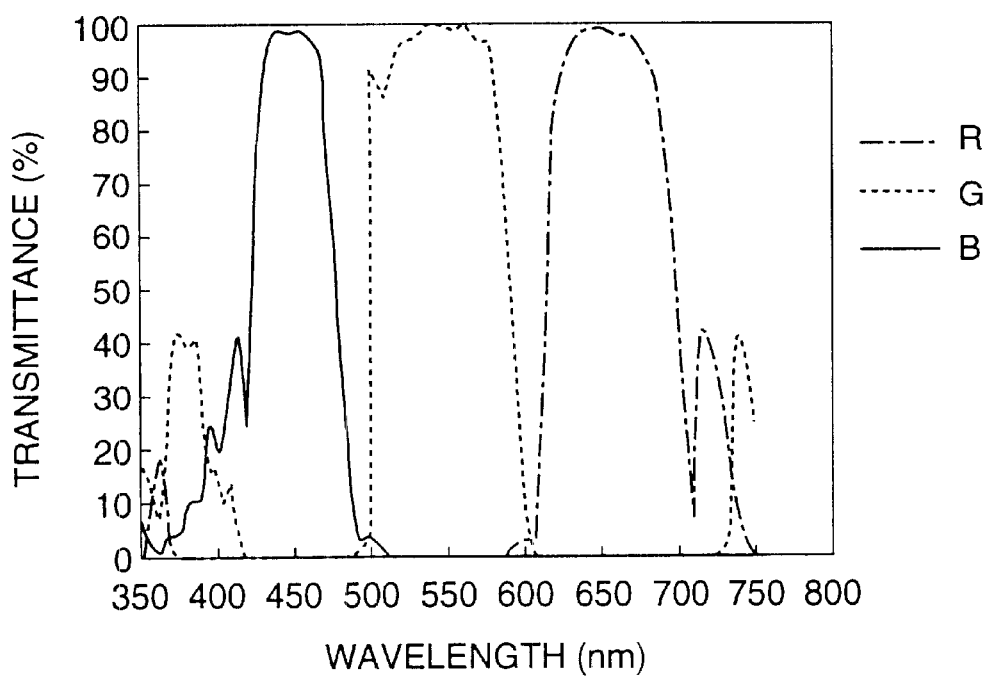

The dichroic prism 201 having the above-described characteristics was used as a color combining device for transmission-type liquid crystal panels 202R, 202G and 202B on which light obtained through color separation by another optical device is incident, as shown in FIG. 28A, and an arrangement was made such that an S-polarized component was obtained from the combination. In this case, the superior polarization combination characteristics were obtained as shown in FIG. 28B.

Figure 4A:
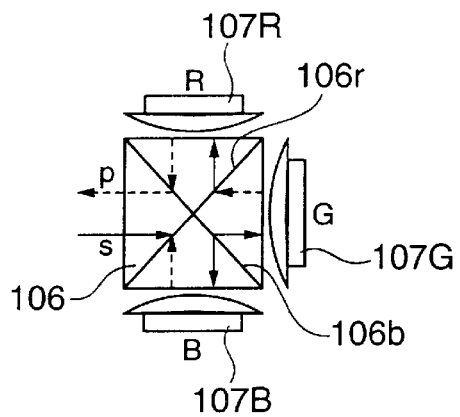
FIGS. 4A and 4B illustrate an arrangement in a case where the dichroic prism is applied,to reflection-type liquid crystal panels and polarization combining characteristics of the dichroic prism.
Figure 4B:
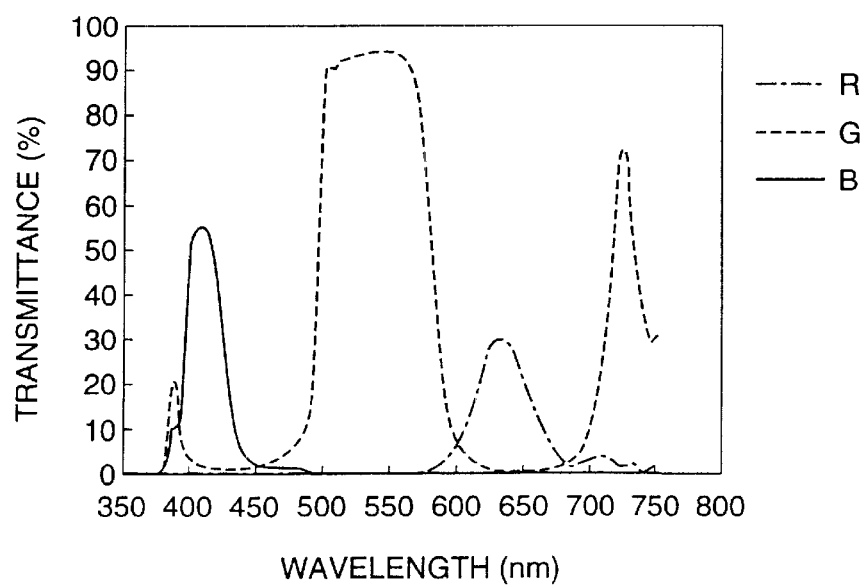
Figure 6:
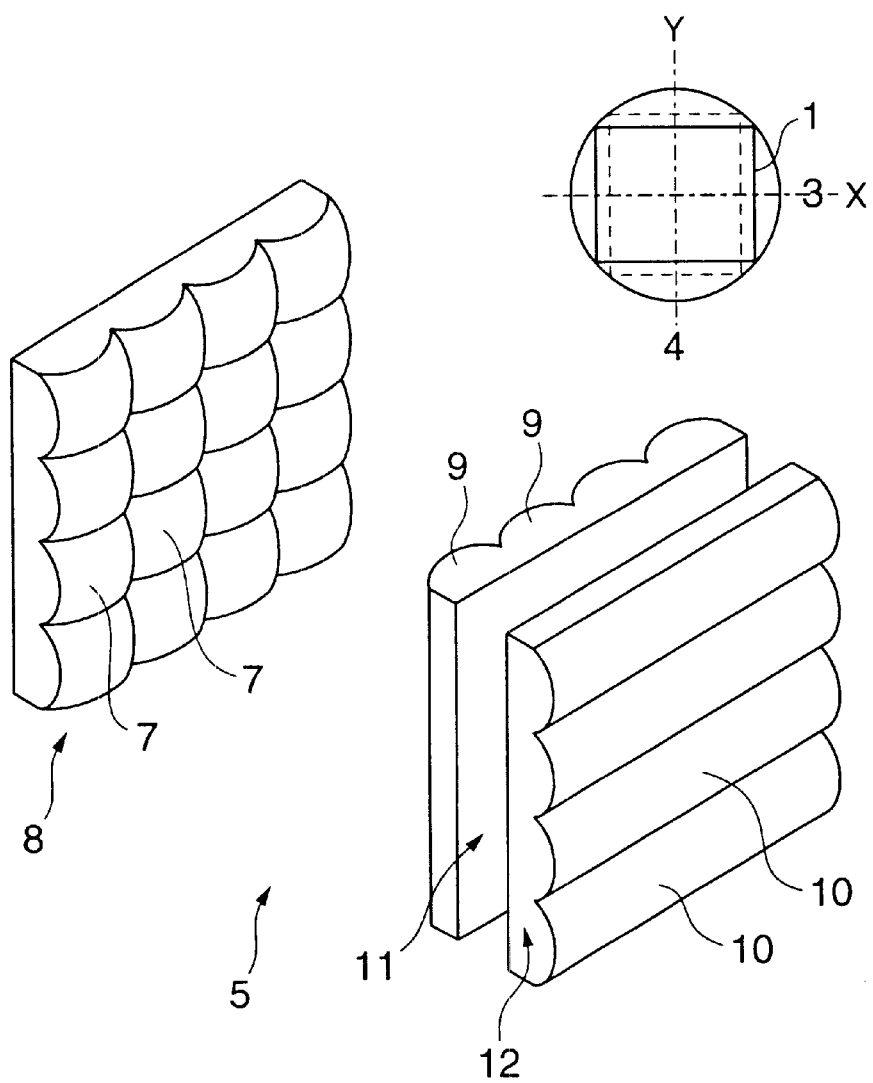
FIG. 6 shows a perspective view showing correspondence relationship between a lens plate and a first and second lenticules.

On the other hand, the dichroic prism 201 was used as a color separation/color combining device for reflection-type liquid crystal panels 203R, 203G and 203B as image forming members which the ninth embodiment is directed to, and an arrangement was made such that an S-polarized component underwent color separation and a P-polarized component was obtained from color combination, as shown in FIG. 29A. In this case, the polarization separating/combining characteristics shown in FIG. 29B were obtained. In comparison to the polarization separating/combining characteristics shown in FIG. 4B, intensity reduction can be prevented with regard to the red light R and blue light B, and the characteristics are greatly improved. However, it is seen that light intensity reduction in the boundary wavelength bands of the respective colors cannot be avoided.

Figure 30:
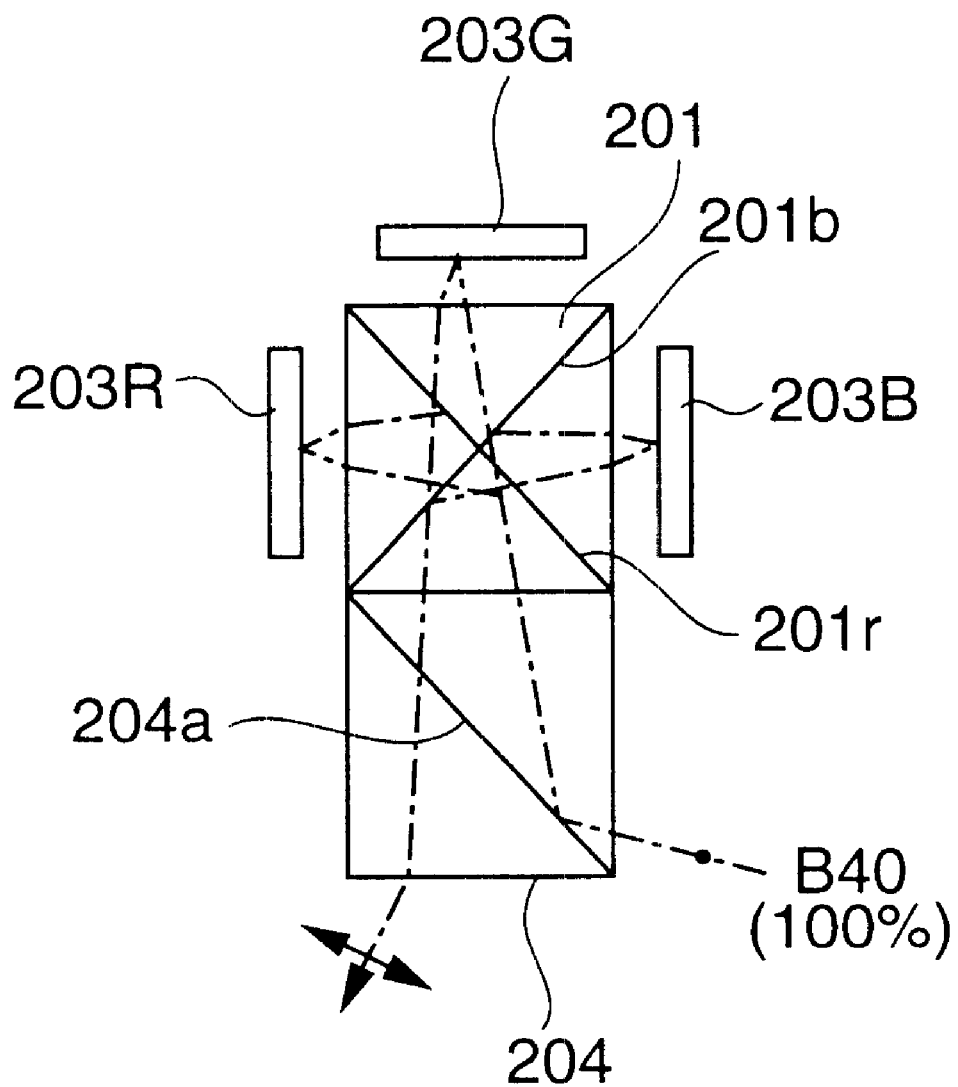
FIG. 30 shows a side view of an arrangement in a case where a polarization beam splitter and the dichroic prism are arranged such that incidence surfaces are parallel.
Figure 31:
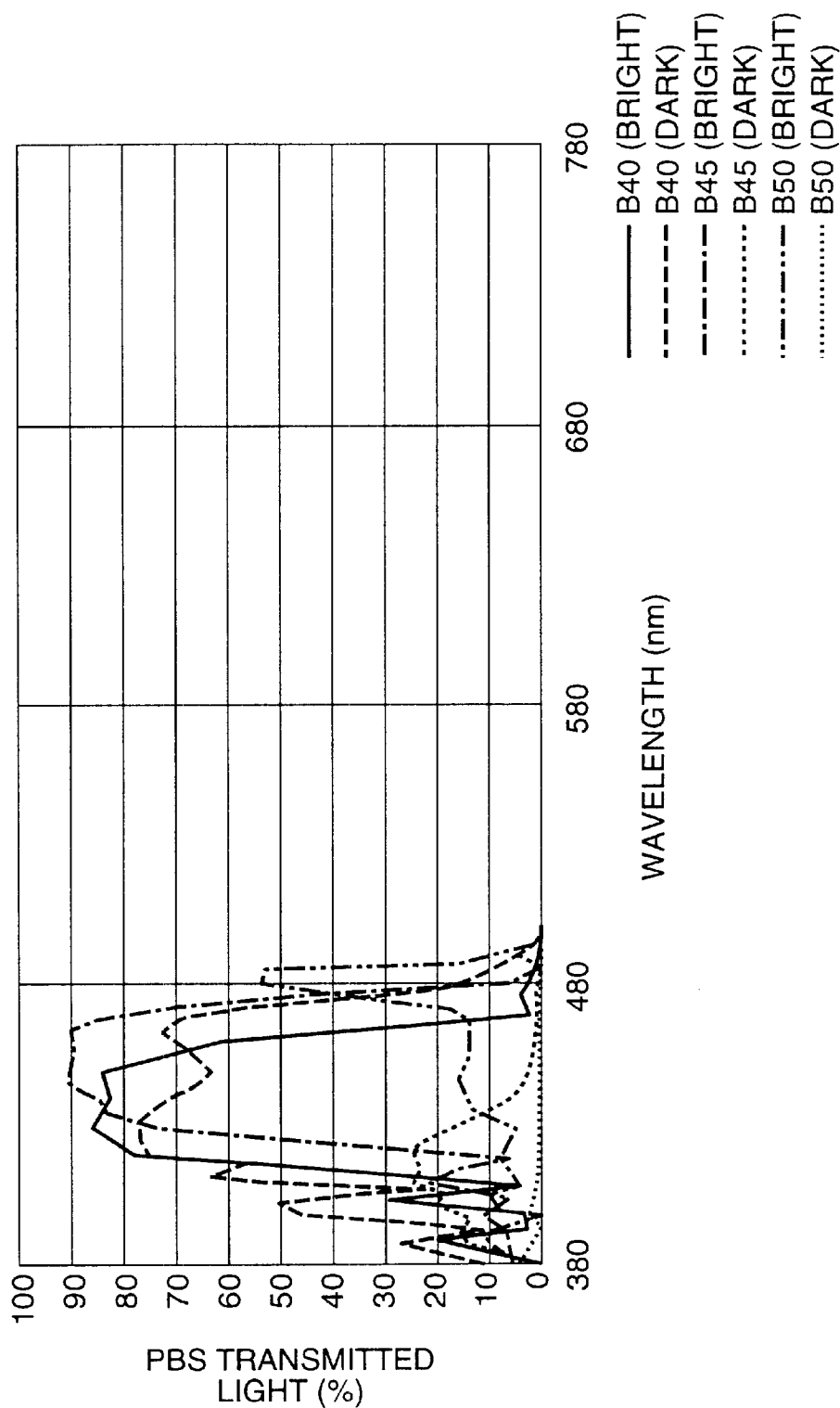
FIG. 31 shows characteristics in angle-dependency for a blue reflection in the case shown in FIG. 30.
Figure 32:
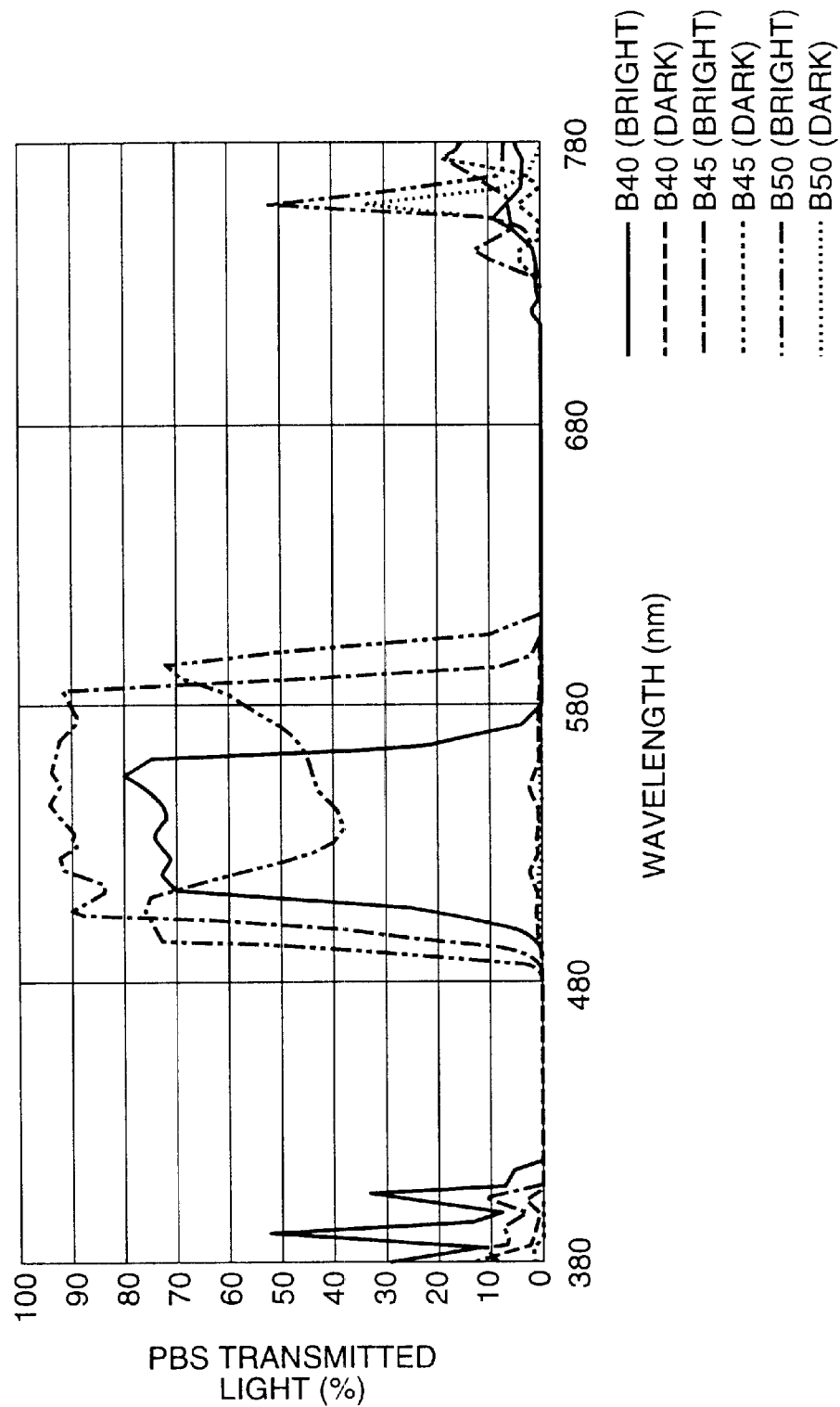
FIG. 32 shows characteristics in angle-dependency for a green reflection in the case shown in FIG. 30.
Figure 33:
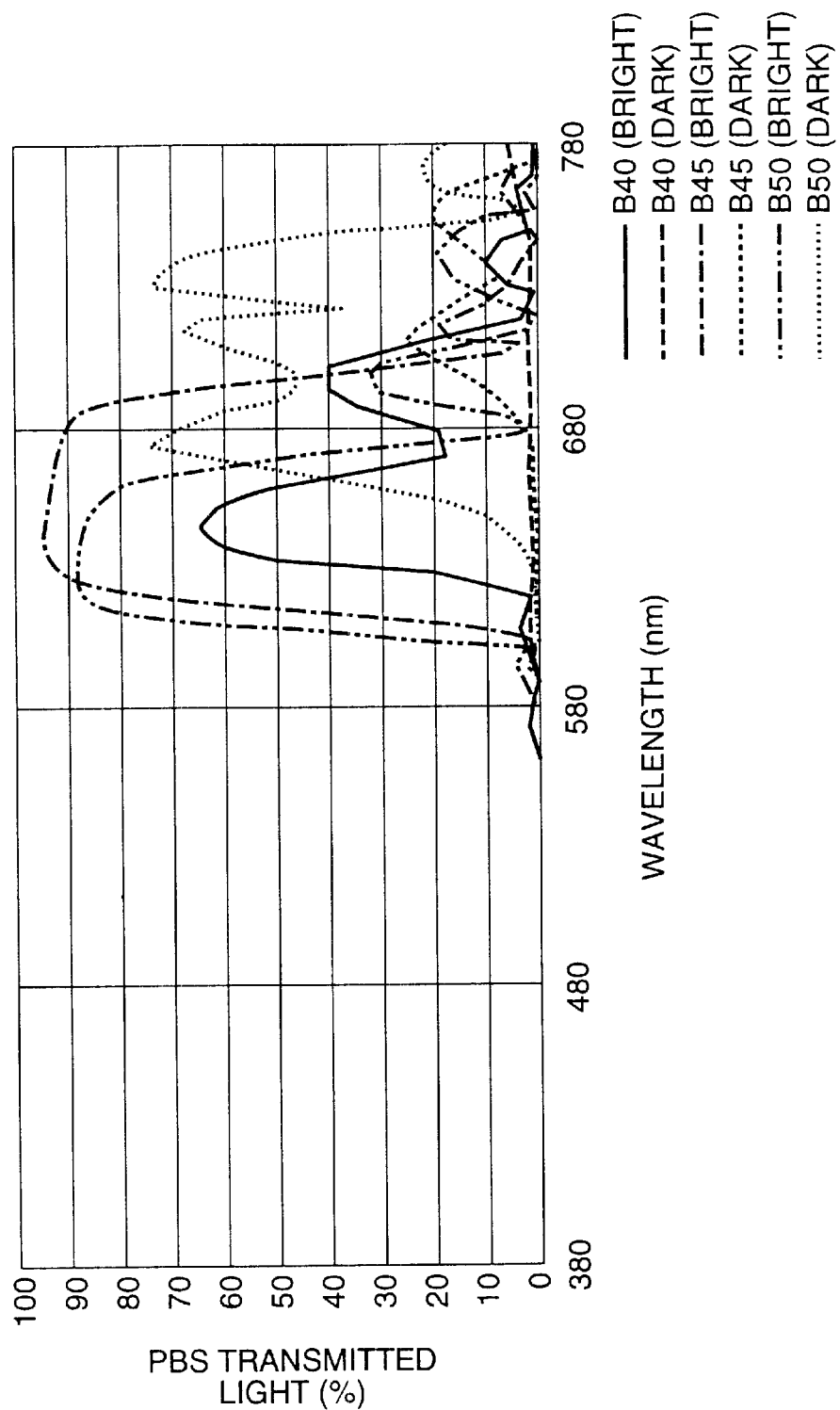
FIG. 33 shows characteristics in angle-dependency for a red reflection in the case shown in FIG. 30.

The incidence-angle depending characteristics of the dichroic prism 201 when being combined with a polarization beam splitter 204 will now be described. An arrangement was made such that the polarization surface 204a of the polarization beam splitter 204 was parallel to the dichroic surface 201r for red. Further, with regard to the respective reflection-type liquid crystal panels 203R, 203G and 203B, a case where all the pixels are made to display ON, that is, the polarization state is rotated by 90 is referred to as (bright) and a case where all the pixels are made to display OFF, that is, the polarization state is not changed is referred to as (dark). Then, the efficiency characteristics of light transmitted by and emitted from the polarization beam splitter 204 when the incidence angle is set to 40°, 45° and 50° were measured. As a result, with regard to the respective blue light B, green light G and red light R, the results shown in FIGS. 31, 32 and 33 were obtained. Because each incidence angle is expressed as an angle with respect to the dichroic film 201b for blue, as shown in FIG. 30, the incidence angle is indicated by "B40", for example. From these results, it can be seen that the wavelength band, contrast and brightness vary together greatly due to change in incidence angle.

Figure 34A:
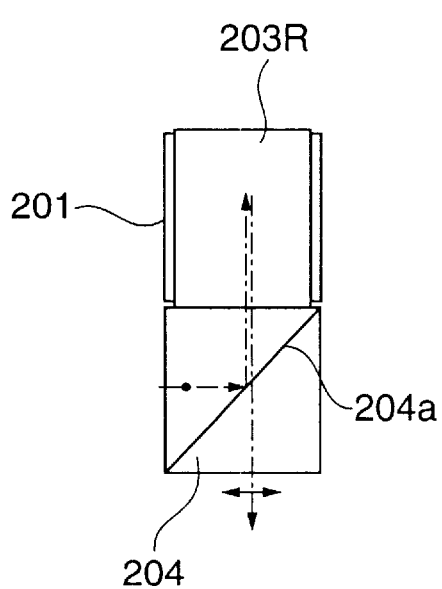
FIGS. 34A and 34B show a plan view and a side view of an arrangement in a case where a polarization beam splitter and the dichroic prism are arranged such that incidence surfaces are orthogonal.
Figure 34B:
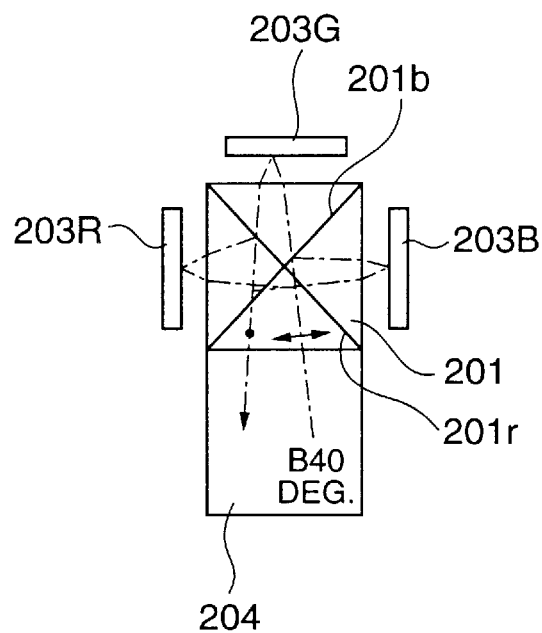
Figure 35:
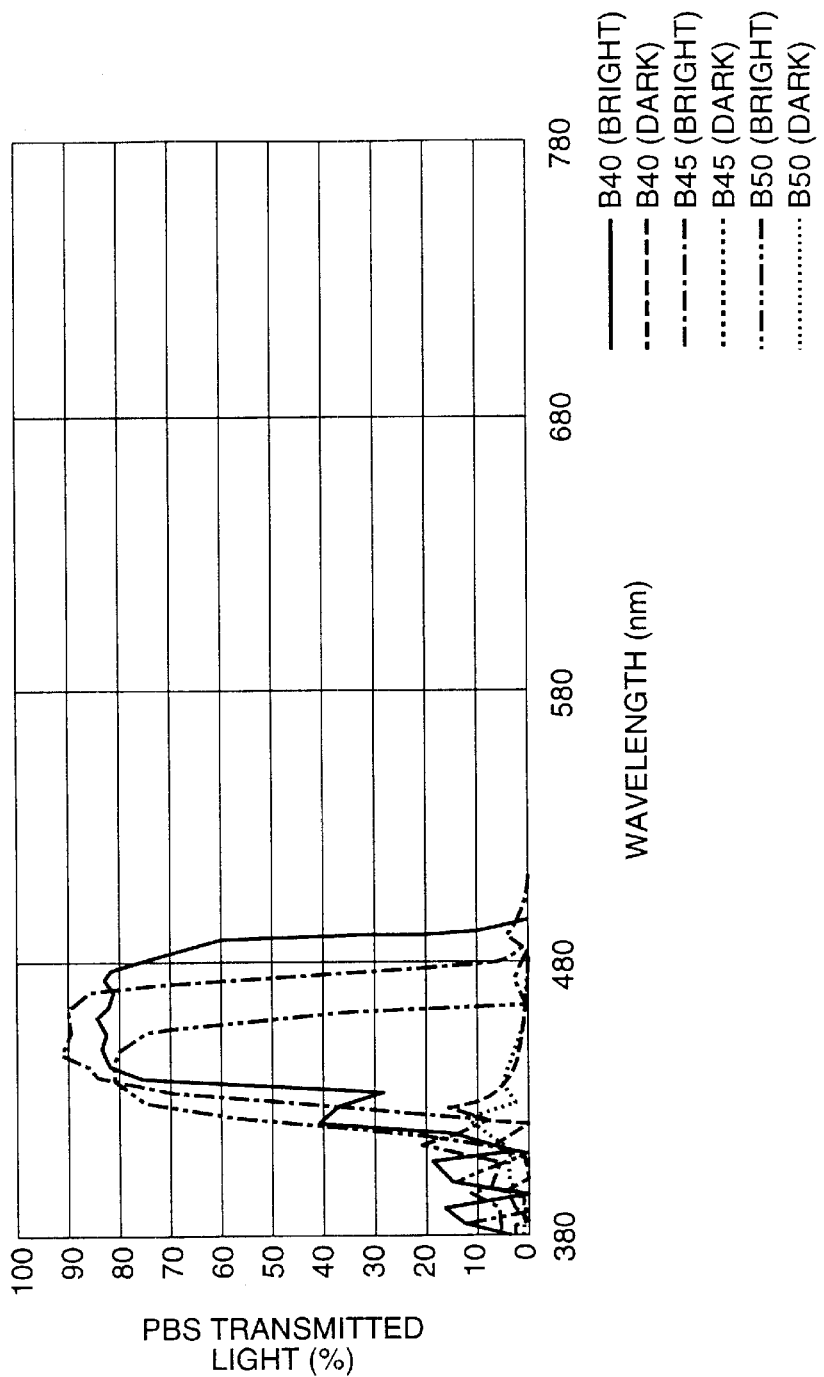
FIG. 35 shows characteristics in angle-dependency for a blue reflection in the case shown in FIGS. 34A and 34B.
Figure 36:
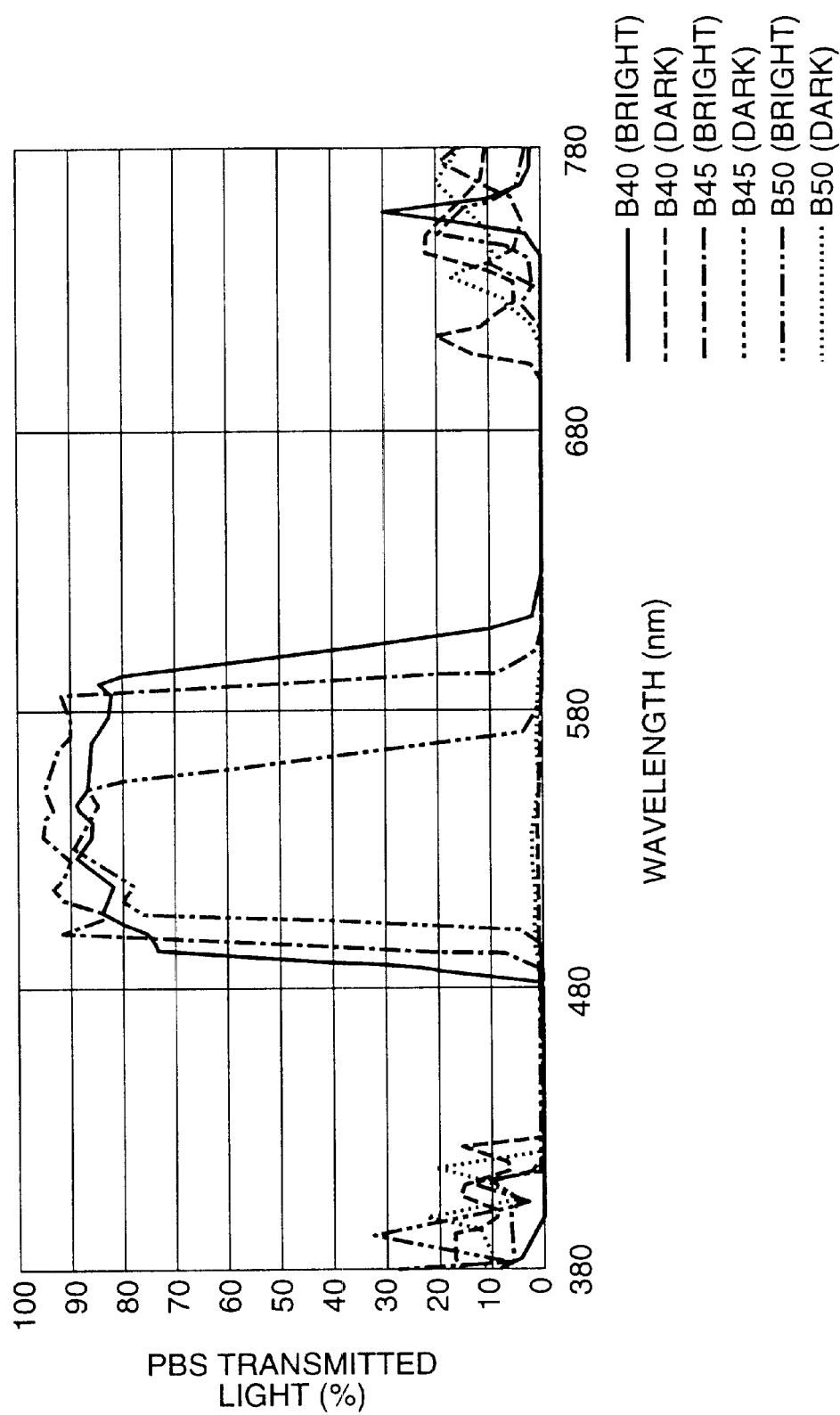
FIG. 36 shows characteristics in angle-dependency for a green reflection in the case shown in FIGS. 34A and 34B.
Figure 37:
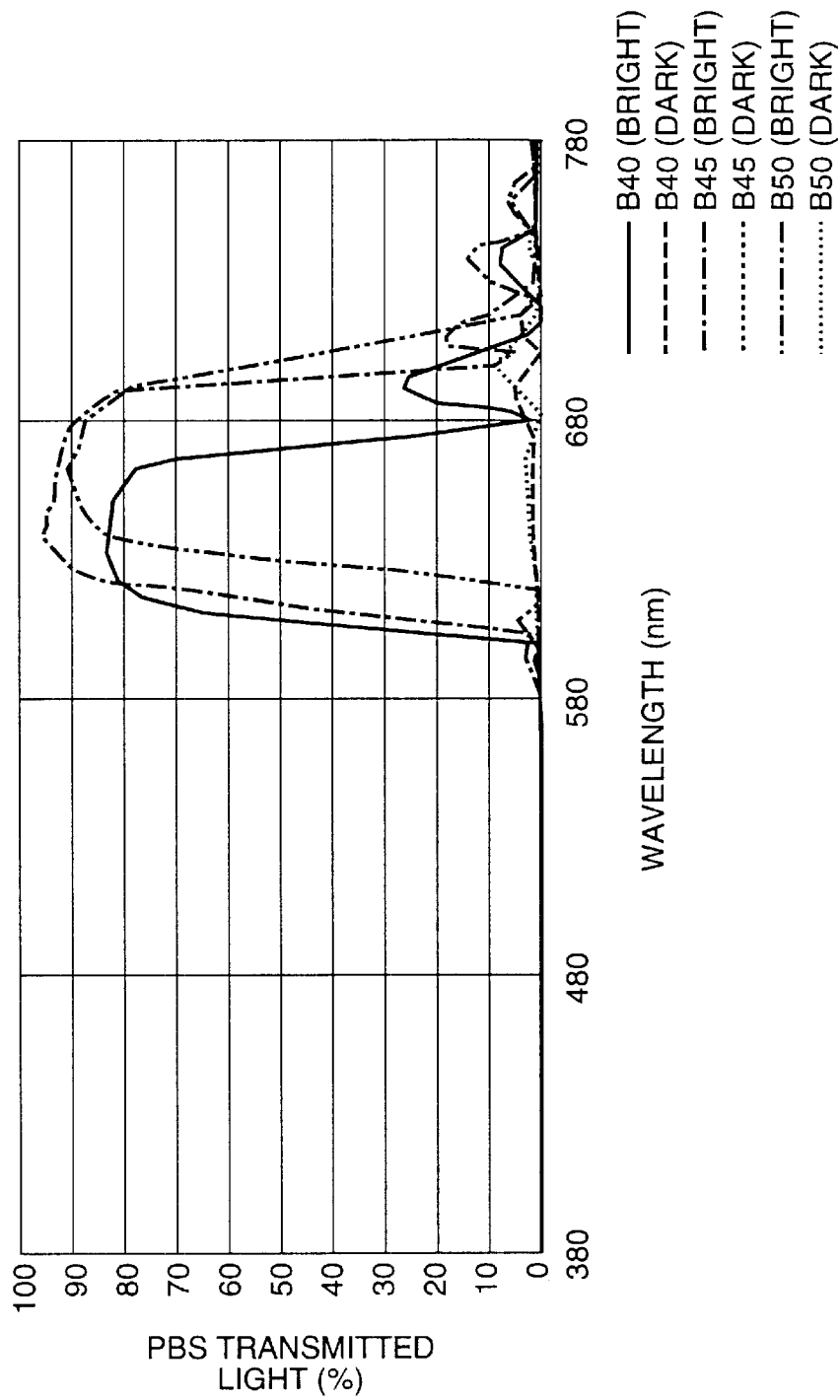
FIG. 37 shows characteristics in angle-dependency with for a red reflection in the case shown in FIGS. 34A and 34B.

In contrast to this, as shown in FIGS. 34A and 34B, an arrangement was made such that the polarization beam splitter 204 and dichroic prism 201 are orthogonal in incidence surface thereof. Then, the efficiency characteristics of light transmitted by and emitted from the polarization beam splitter 204 when the incidence angle is set to 40°, 45° and 50° were measured. As a result, with regard to the respective blue light B, green light G and red light R, the results shown in FIGS. 35, 36 and 37 were obtained. From these results, it can be seen that allowance in incidence angle greatly increases.

Thereby, basically, it can be said that an arrangement (positional relationship) should be made such that the polarization beam splitter 204 and dichroic prism 201 are orthogonal in incidence surface thereof.

Figure 38A:
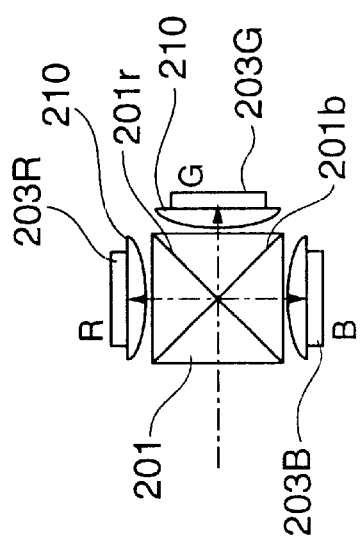
FIGS. 38A and 38B show an example of an arrangement of a projector in the ninth embodiment of the present invention (FIG. 38A showing a plan view of the dichroic prism and surrounding thereof, and FIG. 38B showing a side view of the entirety)
Figure 38B:
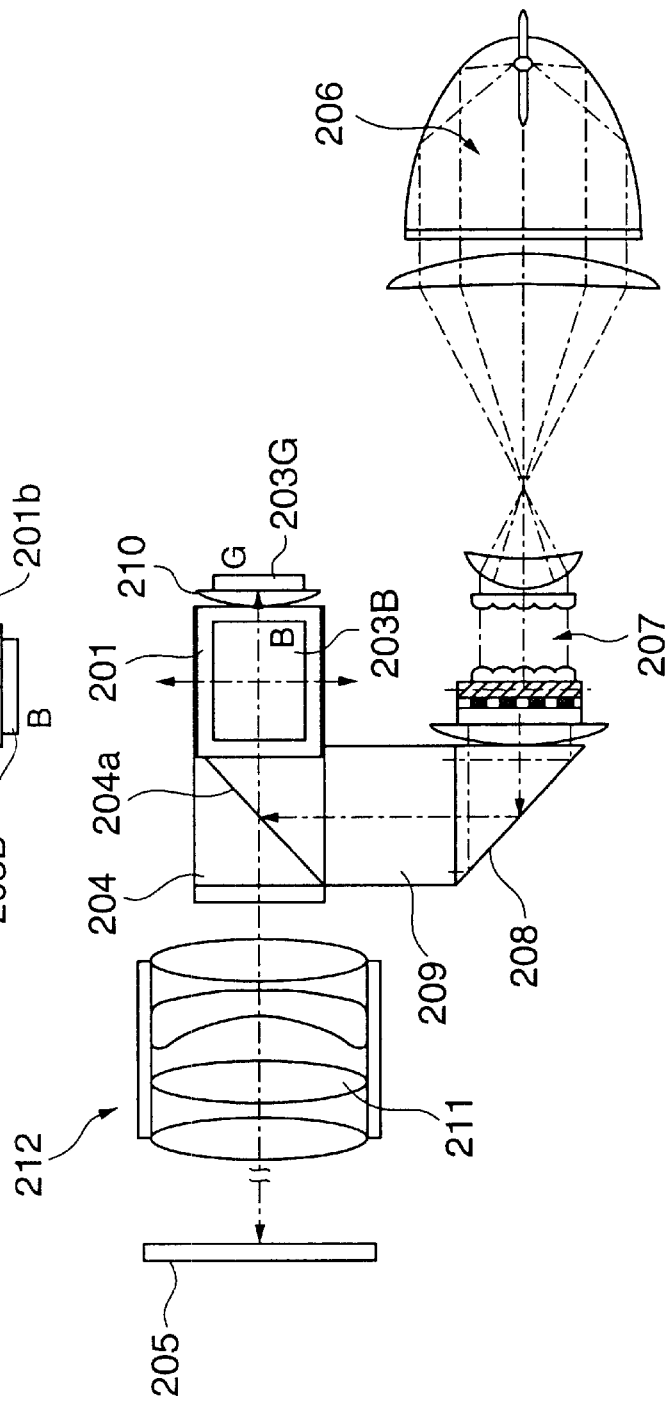

FIGS. 38A and 38B show an example of an arrangement of a reflection-type liquid crystal projector employing this positional relationship between the polarization beam splitter 204 and dichroic prism 201. This projector is a rear projector by which projection is made from the rear side of a screen 205. This projector includes a light source 206, an illumination system 207, a total reflection prism 208, a connection prism 209, the polarization beam splitter 204, dichroic prism 201, three reflection-type liquid crystal panels 203R, 203G and 203B, and a condenser lens for each of the reflection-type liquid crystal panels 203R, 203G and 203B. The polarization beam splitter 204 is disposed on a common incident/emitted light path through which incident light and emitted light pass. A projection lens system 212 having a plurality of projection lenses 211 is provided on a light path through which light emitted from the dichroic prism 201 passes.

In this arrangement, only the S-polarized component of the light from the light source 206 is reflected by the polarization beam splitter 204 and incident on the dichroic prism 201. This light is separated into the red light R, green light G and blue light B as a result of being reflected or transmitted by the dichroic film 201r for red and dichroic film 201b for blue in accordance with the wavelength bands thereof, which are then incident on the corresponding reflection-type liquid crystal panels 203R, 203G and 203B, respectively. The respective reflection-type liquid crystal panels 203R, 203G and 203B are turned on and off in accordance with image signals input to the liquid crystal projector from the information display system. When they are turned off, the S-polarized component is reflected thereby as it is. When they are turned on, the S-polarized component is reflected thereby being transformed (modulated) into be the P-polarized component. The light of the S-polarized component or P-polarized component reflected by the respective reflection-type liquid crystal panels 203R, 203G and 203B is collected and combined by the dichroic prism 201 as a result of being reflected or transmitted by the dichroic film 201r for red and dichroic film 201b for blue thereof, respectively, and returns to the polarization beam splitter 105. At this time, only the P-polarized component reflected by each of the respective reflection-type liquid crystal panels 203R, 203G and 203B at parts corresponding to the turned-on liquid crystal elements thereof is transmitted by the polarization beam splitter 204. Then, the thus-transmitted light is magnified and projected onto the screen 205 through the projection lens system 212. Thereby, an image in accordance with the image signals input to the liquid crystal projector is displayed on the screen 205 as a color image.

Thus, as a result of the sole dichroic prism 201 being used for both color separation and color combination, it is possible to miniaturize and reduce in weight the entirety of the projector. It can be seen that, although the dichroic prism 201 is used to have both the function of color separation and the function of color combination, it is possible to achieve color display having color balance in no way inferior to a case of a transmission-type liquid crystal projector without degradation in the light utilization efficiency, thanks to the position relationship with the polarization beam splitter 204 and the characteristics shown in FIGS. 34A, 34B and 35 through 37. In particular, in the case of the rear projector shown in FIGS. 38A and 38B, there is no anxiety of occurrence of keystoning, therefore no shift is needed, it is possible to dispose the light path from the light source 206 to the projection lens system 212 without special consideration, and the lens apertures/diameters of the projection lenses 211 can be reduced.

Figure 39:
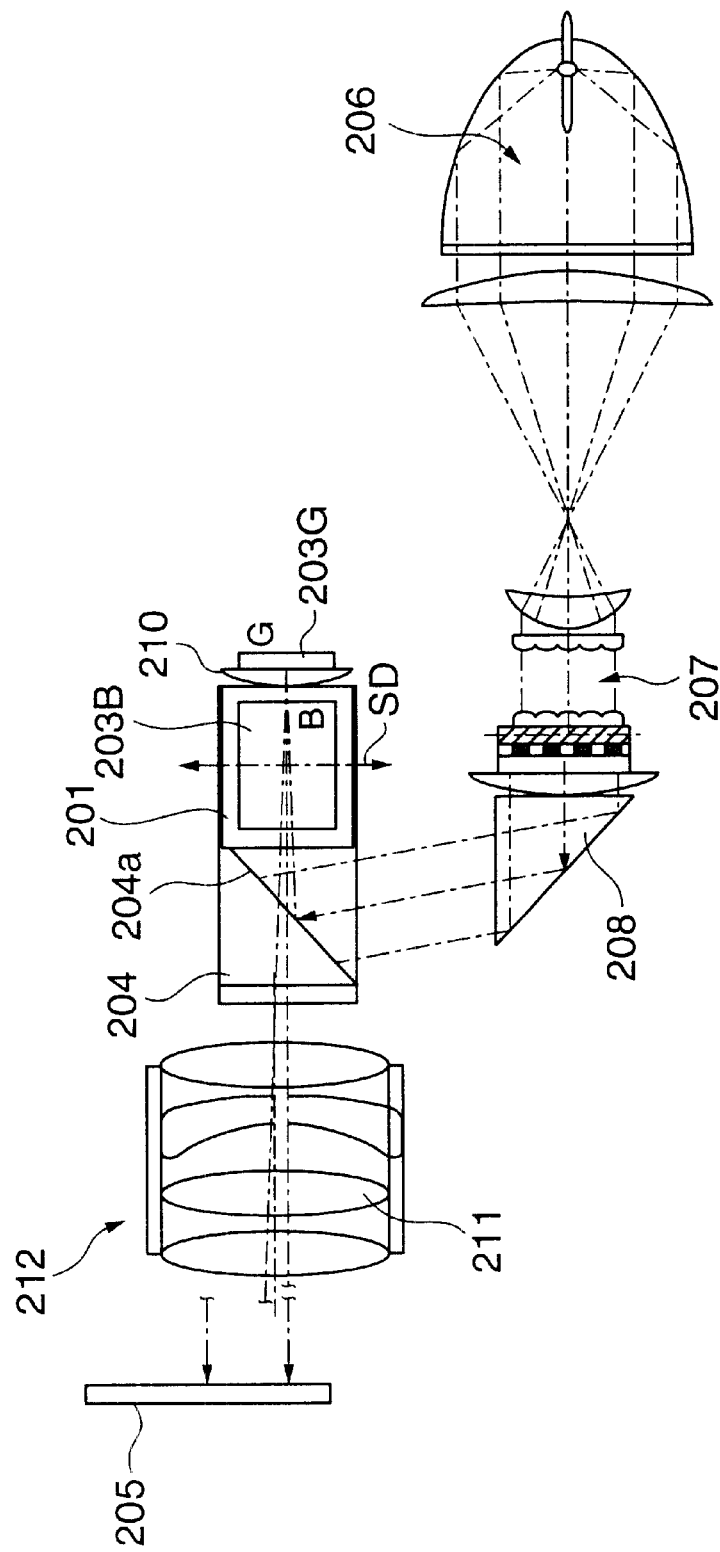
FIG. 39 shows an example of an arrangement of a projector in a tenth embodiment of the present invention (showing a side view of the entirety)

A tenth embodiment of the present invention will now be described based on FIG. 39. The same reference numerals are given to the parts/components same as those of the above-described ninth embodiment, and description thereof will be omitted (This manner will also be applied to the embodiments described hereinafter). The tenth embodiment is a front projector by which projection is made from the front side of the screen 205, and keystoning which otherwise occurs is prevented in the embodiment. That is, in the case of the front projector, the projector is placed on a desk and projection is made onto the screen 205, the bottom side thereof being located above the desk. Thereby, keystoning (trapezoidal distortion) occurs when the arrangement shown in FIGS. 38A and 38B is used as it is. Thereby, the projected image is distorted, and cannot be easily seen. It is well known that an image can be projected on the screen without occurrence of keystoning as a result of the reflection-type liquid crystal panels 203R, 203G and 203 being shifted in the vertical direction perpendicular to the optical axis as indicated by the arrow SD shown in FIG. 39 (The shift ratio on the screen is equal to or larger than 9:1). At this time, in the tenth embodiment, an arrangement is made such that, as a result of the position of the total reflection prism 208 being shifted toward the light source 206, the direction of the incident light is shifted in the direction parallel to the intersecting line on which the dichroic films 201r and 201b intersect, and, thereby, the incident light is incident on the dichroic film 201r for red and dichroic film 201b for blue with approximately equal shift angles through the polarization beam splitter 204.

Thereby, it is possible to prevent keystoning in addition to the advantages obtained from the arrangement shown in FIGS. 38A and 38B.

An eleventh embodiment of the present invention will now be described based on FIGS. 40A and 40B. This embodiment is also a front projector, and keystoning otherwise occurring is prevented. The difference from the embodiment shown in FIG. 39 is that the shifting direction of the incident light is a direction perpendicular to the intersecting line on which the dichroic films 201r and 201b intersect. In this case, as a result of the characteristics of the dichroic films 201r and 201b being modified in consideration of the inclination of the chief ray of the illumination light made in order to shift the direction of the incident light as mentioned above, it is possible to obtain the performance the same as that obtained from the case where such a shift is not made. That is, in accordance with the shifting direction, the incident angle of the incident light on the dichroic film 201r for red may be smaller than 45° and the incident angle of the incident light on the dichroic film 201b for blue may be equal to or larger than 45° in this case, an arrangement should be made such that the characteristics described using FIGS. 27A and 27B are obtained in the condition in which the incident angle of the incident light on the dichroic film 201r for red is a redetermined angle smaller than 45° and the incident angle of the incident light on the dichroic film 201b for blue is a predetermined angle equal to or larger than 45°, respectively. Conversely, the incident angle of the incident light on the dichroic film 201r for red may be equal to or larger than 45° and the incident angle of the incident light on the dichroic film 201b for blue may be smaller than 45°. In this case, an arrangement should be made such that the characteristics described using FIGS. 27A and 27B are obtained in the condition in which the incident angle of the incident light on the dichroic film 201r for red is a predetermined angle equal to or larger than 45° and the incident angle of the incident light on the dichroic film 201b for blue is a predetermined angle smaller than 45°, respectively.

An arrangement of the illumination system 207 including the light source 206 in each of the above-described ninth, tenth and eleventh embodiments will now be described based on FIG. 41. In the illumination system 207, the light source 206 includes a lamp 213, a paraboloid-of-revolution mirror 214 which reflects the light from the lamp 213 and emits it as a parallel light, and a convex lens 215 which condenses the parallel light. On the emitted-light path, a collimator lens 216, a fly-eye lens plate 217, a first lenticule 218, a polarization aligning device 119, a second lenticule 220, and a condenser lens 221 are disposed. Thus, the illumination system 207 is configured. The fly-eye lens plate 217 and the pair of lenticules 218 and 220 form an integrator optical system 222. That is, as shown in FIG. 42, the integrator optical system 222 includes the fly-eye lens plate 217 having a plurality of lens elements 23 each having a rectangular shape having an aspect ratio of 4:3 approximately similar to the shape (generally, a rectangular shape having an aspect ratio of 4:3) of each of the reflection-type liquid crystal panels 203R, 203G and 203B arranged therein two-dimensionally, and the pair of lenticules 218 and 220 having a plurality of cylindrical lenses 24 an 25 arranged therein in directions perpendicular to one another. Thus, the fly-eye lens plate, 217 corresponds to a so-called first fly-eye lens of the integrator optical system, and forms secondary light-source images through division by the respective lens elements 223 from the light reflected by the paraboloid-of-revolution mirror 214. Thus, the plane on which,the secondary light-source images are formed is a virtual light-source plane. The first lenticule 218 disposed subsequent to the fly-eye lens plate 217 is configured so that each cylindrical lens 24 is located for a light flux passing through a respective one of the columns of the lens elements 23. Each cylindrical lens 25 of the second lenticule 220 disposed immediately subsequent to the first lenticule 218 corresponds to a respective one of the rows of the lens elements 23. Thus, the cylindrical lenses 24 and 25 are disposed so as to be perpendicular to one another, and, the pair of lenticules has lens elements arranged two-dimensionally, and corresponds to a so-called second fly-eye lens plate of the integrator optical system. The condenser lens 221 is disposed so as to cause the light path of the light flux formed by each lens element 23 of the fly-eye lens plate 217 to bend, after passing through the first and second lenticules 218 and 220, so that the light flux illuminates the entire surface of each of the reflection-type liquid crystal panels 203R, 203G and 203B. As a result of the rectangular reflection-type liquid crystal panels 203R, 203G and 203B being illuminated by the illumination system 207 including the above-described integrator optical system 222, even illumination of the entire surface is made possible, and a satisfactory color image can be obtained. The integrator optical system may also be configured with a pair of fly-eye lens plates, as in the case shown in FIG. 1.

Figure 43:
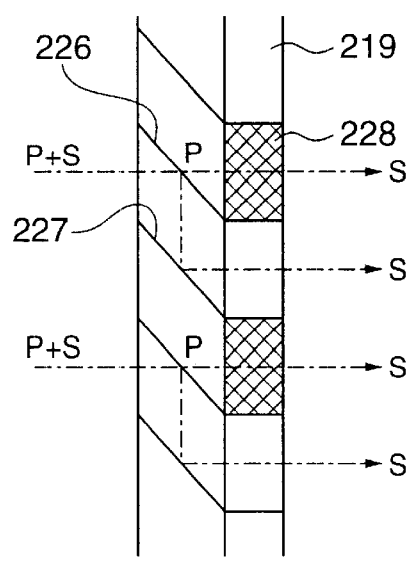
FIG. 43 shows a side view showing an example of an arrangement of a polarization aligning device of the illumination system shown in FIG. 41.

The polarization aligning device 219 disposed between the lenticules 218 and 220 will now be described with reference to FIG. 43. The polarization aligning device 219 is used for having light fluxes having random polarization directions (P+S) emitted from the light source 206 incident thereon and emitting the light fluxes made to have polarized components of one type, that is, the S-polarized components or P-polarized components (in the tenth embodiment, the S-polarized components). Specifically, respective ones of polarization beam splitters 226, reflection prisms 227 and ½ wavelength plates 228 are arranged to be like stripes so as to correspond to the respective cylindrical lenses 24 of the first lenticule 218, where the P-polarized components are transmitted by the polarization beam splitters 226 and rotated by 90° through the ½ wavelength plates 228 so as to be transformed into S-polarized components, while S-polarized components are reflected by the polarization beam splitters 226 and reflection prisms 227 and are emitted therefrom as they are. Thus, all the light fluxes are made to be of the S-polarized components.

Light fluxes having random polarization directions emitted from the lamp 213 are made to be only S-polarized components by the polarization aligning device 219 and are emitted therefrom. In this polarization transformation process, the transformation efficiency is better when the light incident on the polarization beam splitters is parallel light. In this point, because the light passing through a unit of each cylindrical lens 224 of the first lenticule 218 is incident on a respective corresponding polarization beam splitter 226 in the arrangement shown in FIGS. 41, 42 and 43, the transformation efficiency is high.

Anyway, in a case where only polarized light of one type, i.e., P-polarized components or S-polarized components can be used in such a type of a liquid crystal panel as that modulating polarized light, therefore, approximately the half of the light from the light source 206 which emits light flukes having random polarization directions is not used, and the light utilization efficiency from the light-source is very low. However, in this embodiment, it is possible to increase the light utilization efficiency from the light source because the polarization aligning device 219 is provided and light is made to be polarized components of only one type therethrough and then emitted therefrom. At this time, because the row in the first lenticule 218 is made to match the row in the polarization aligning device 219, light fluxes are made incident on the polarization aligning device 219 and then the polarization directions are made to coincide thereby, efficiency in polarization transformation is high.

Figure 44:
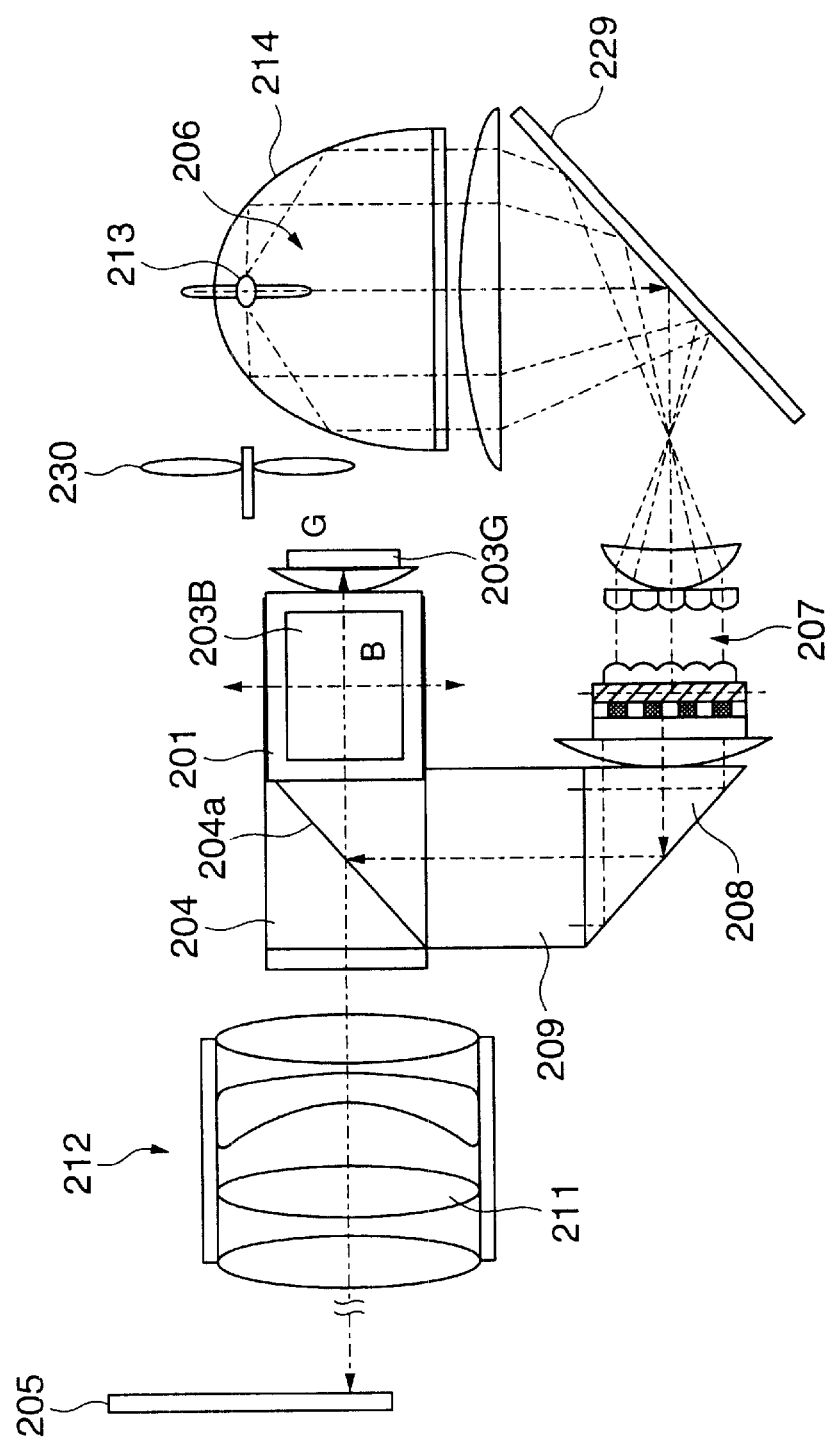
FIG. 44 shows a side view of a projector in a first variant embodiment according to the[]present invention.

Then, more practical embodiments and variant embodiments based on the above-described ninth, tenth and eleventh embodiments will now be described. FIG. 44 shows an embodiment obtained as a result of light from the light source 206 being bent/deflected by 90° through a cold mirror 229 so that the entirety of the liquid crystal projector is made miniaturized and compact, in order to make the arrangement shown in FIGS. 38A and 38B more practical. A cooling fan 230 for cooling the light source 206 is further provided.

Figure 41:
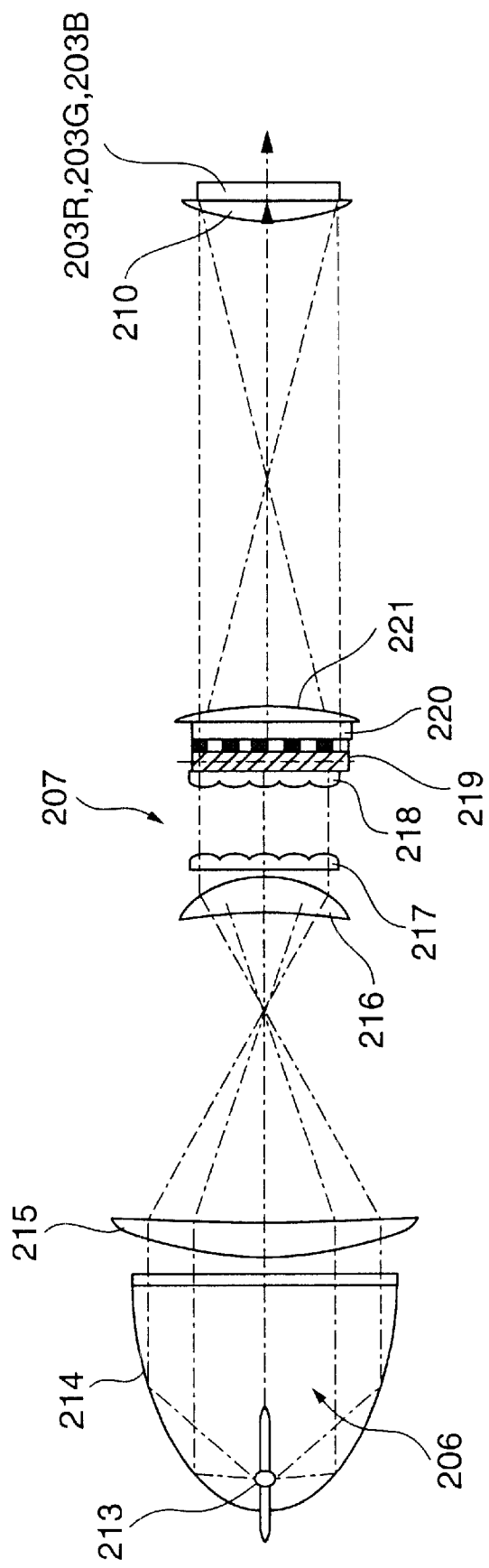
FIG. 41 extractingly shows a side view of an illumination system thereof.
Figure 42:
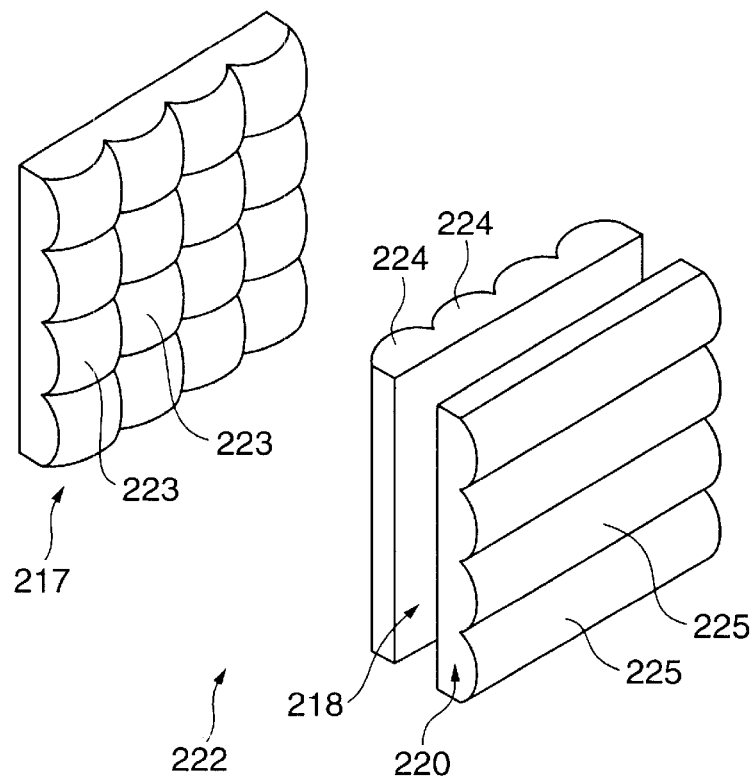
FIG. 42 shows a perspective view of an integrator optical system thereof.
Figure 45:
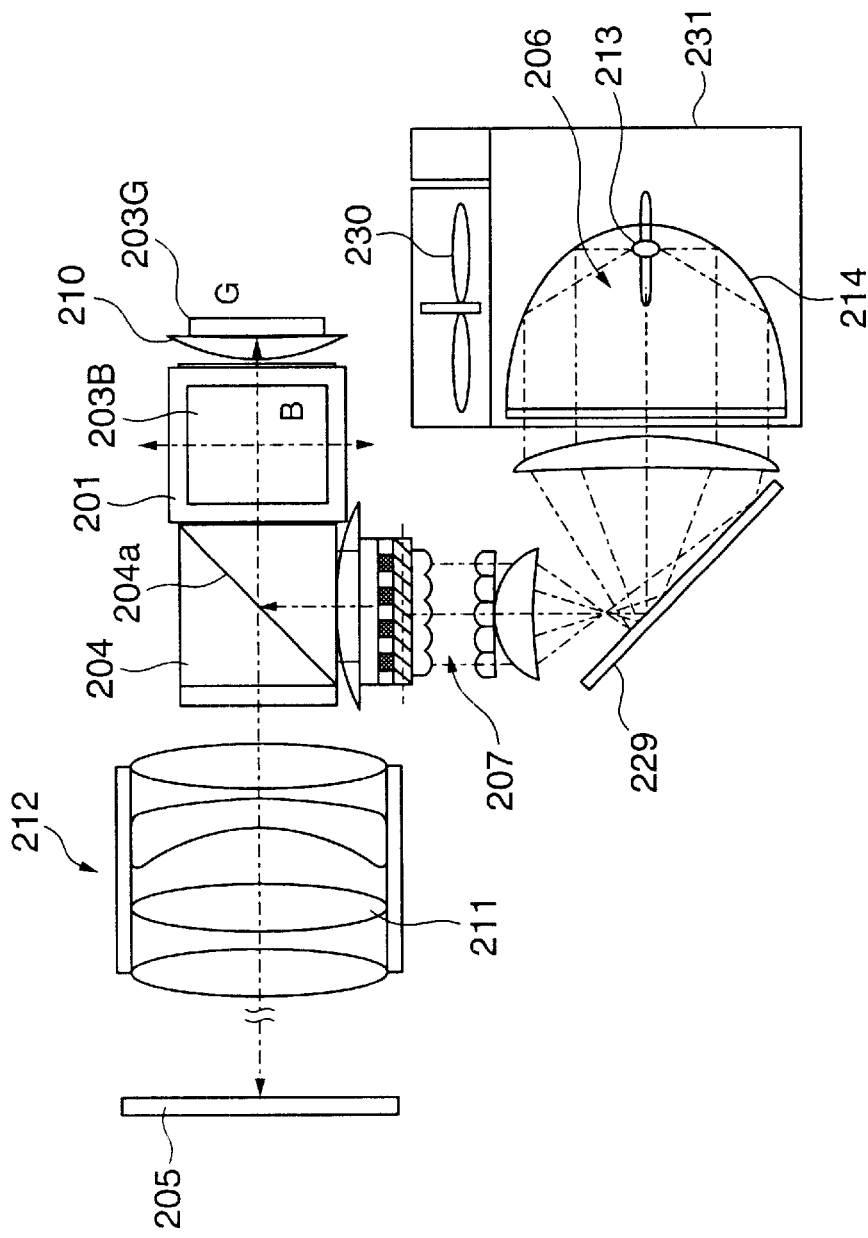
FIG. 45 shows a side view of a projector in a second variant embodiment according to the present invention.

FIG. 45 shows another embodiment in which the light path of the illumination system;207 shown in FIG. 41 is approximately halved as a result of the total reflection prism 208, communication prism 209 and so forth being omitted from the configuration shown in FIGS. 38A and 38B for example. A lamp house 231 is also provided. In this embodiment, somewhat color unevenness occurs. However, it is possible to greatly reduce the system in size, and the compact arrangement is achieved.

Figure 46:
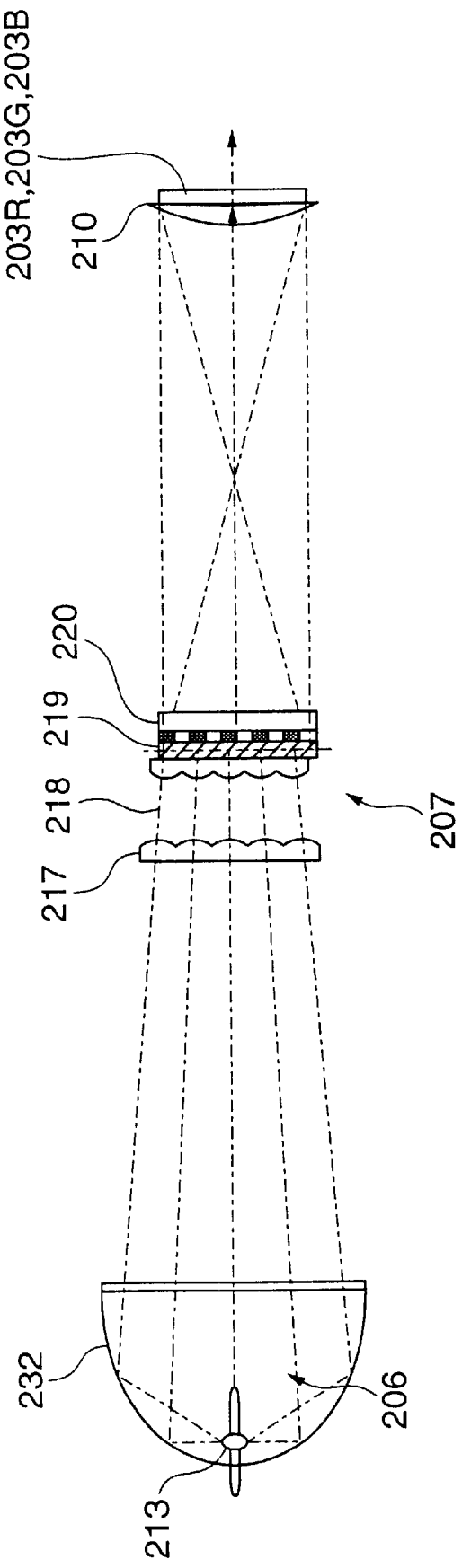
FIG. 46 shows a side view of an illumination system in a third variant embodiment according to the present invention.

FIG. 46 shows another embodiment in which an arrangement is made such that, with regard to the illumination system 207 including the light source 206, a spheroid mirror 232 is used instead of the paraboloid-of-revolution mirror 214, and the lamp 213 is disposed at the first focal point of the spheroid mirror 232 and the surface to be illuminated of each of the reflection-type liquid crystal panels 203R, 203G and 203B is disposed at the second focal point thereof. Thereby, with regard to the illumination system 207, in particular, optical components such as lenses or the like can be omitted, and it is possible to reduce the number of components.

Figure 47:
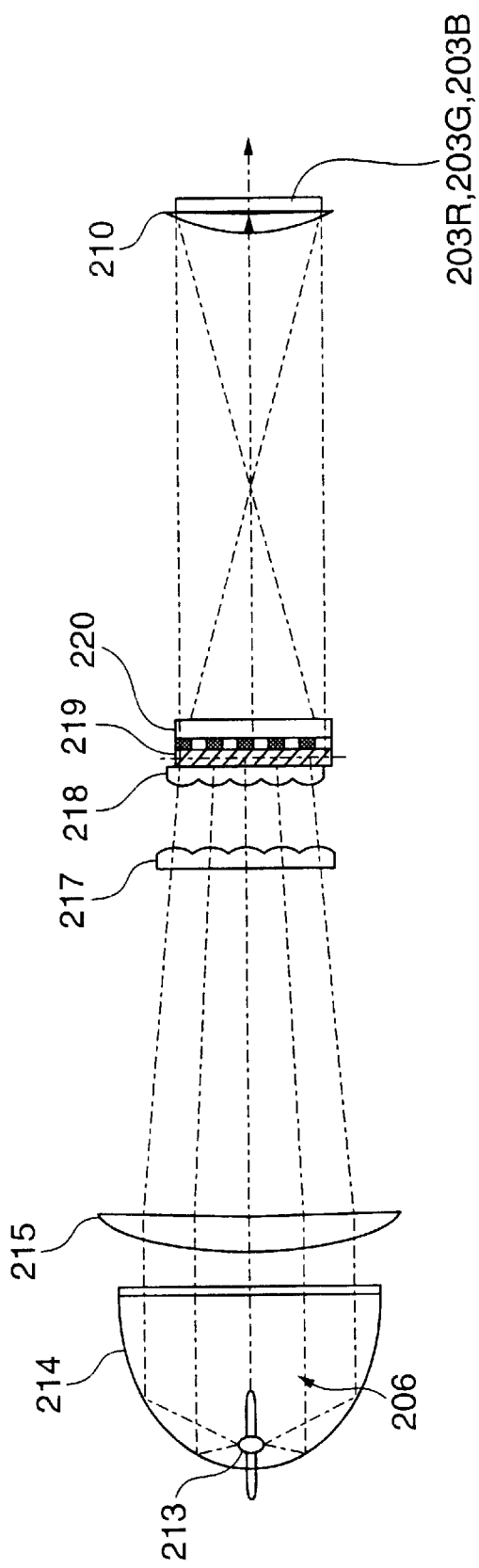
FIG. 47 shows a side view of an illumination system in a fourth variant embodiment according to the present invention.

FIG. 47 shows another embodiment having an arrangement equivalent to the arraignment shown in FIG. 46 as a result of an arrangement being made such that, although, with regard to the illumination system 207 including the light source 206, the paraboloid-of-revolution mirror 214 is used in the light source 206, the second focal point is formed by the convex lens 215, and the surface to be illuminated of each of the reflection-type liquid crystal panels 203R, 203G and 203B is disposed at the second focal point. In comparison to the case of FIG. 46, merely the convex lens 215 is extra. Accordingly, it is also possible to reduce the number of components.

Figure 48:
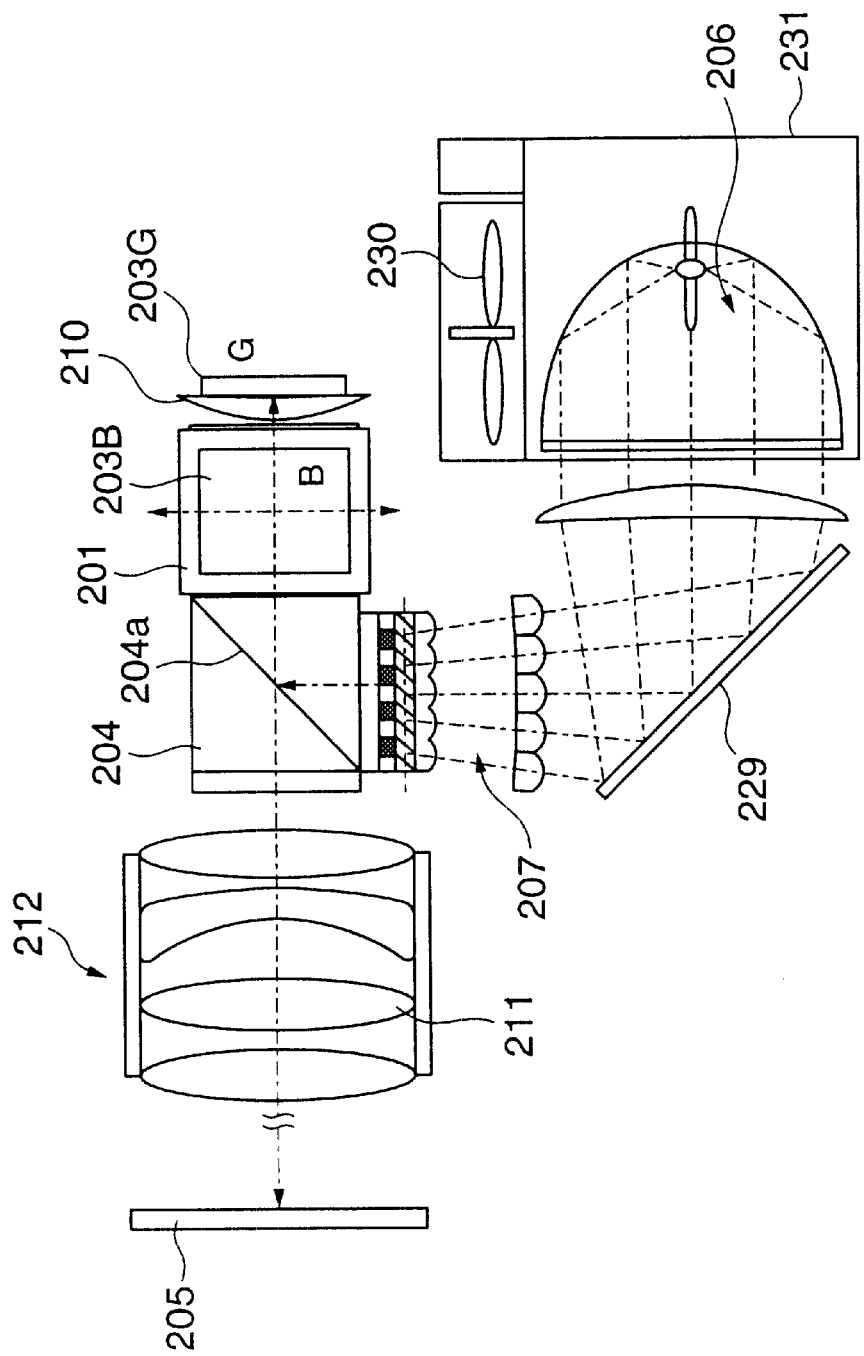
FIG. 48 shows a side view of a projector in a fifth variant embodiment according to the present invention.

FIG. 48 shows another embodiment of a projector in which the illumination system 207 having the arrangement shown in FIG. 47 is used, and which is configured more practically. That is, the second focal point is formed by the convex lens 215, and the surface to be illuminated of each of the reflection-type liquid crystal panels 203R, 203G and 203B is disposed at the second focal point. In this case, the projector is made compact as a result of the optical path being deflected by 90° through a cold mirror 229.

Figure 49:
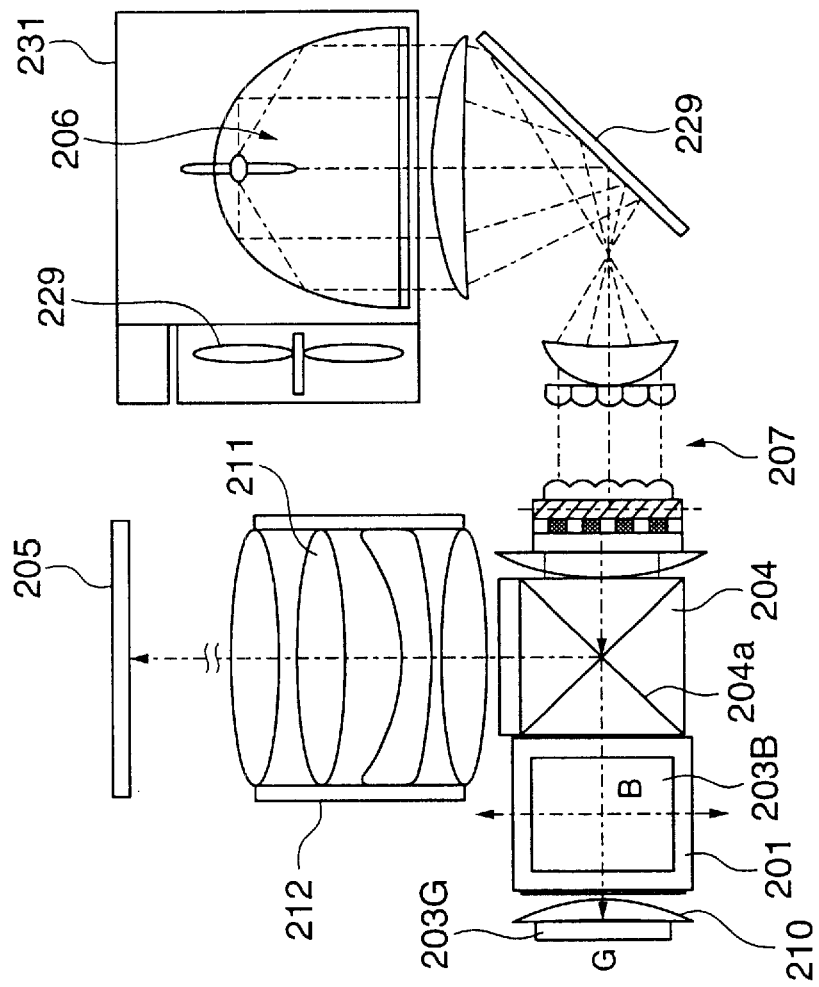
FIG. 49 shows a side view of a projector in a sixth variant embodiment according to the present invention.

FIG. 49 shows an embodiment in which, although the components are equivalent to those of the arrangement shown in FIG. 45, the layout, in particular, the positional relationship between the reflection-type liquid crystal panels 203R, 203G and 203B and the projection lens system 212 is changed from that of the arrangement shown in FIG. 45. That is an arrangement is made such that the light from the light source 206 passes through the polarization beam splitter 204, is incident on the dichroic prism 201, then has the polarization directions thereof modulated by the reflection-type liquid crystal panels 203R, 203G and 203B, is combined by the dichroic prism 201, is reflected by the polarization beam splitter 204, and thus is emitted to the projection lens system 212. When change is made in layout as described above, the light flux incident on the polarization beam splitter 204 should be of P-polarized light, the position at which the ½ wavelength plates are inserted should be changed in the polarization aligning device 219 so that P-polarized light be emitted therefrom, and the signals of turning on and off of the reflection-type liquid crystal panels 203R, 203G and 203B should be reversed. However, it is obvious that the same advantages as those of the above-described case are obtained in view of functions thereof.

The present invention is not limited to the above-described embodiments, and variations and modifications may be made without departing from the scope of the present invention.

The present application is based on Japanese priority application Nos. 11-223328 and 11-324273, filed on Aug. 6, 1999 and Nov. 15, 1999, respectively, the entire contents of which are hereby incorporated by reference.

What is claimed is:

1. An illumination system comprising:
    at least one light-emitting unit;
    at least one reflecting mirror for condensing light;
    a lens plate having a plurality of lens elements, said lens plate disposed, with respect to said reflecting mirror, on the side of an object to be projected and away from said light-emitting unit, said lens plate arranged two-dimensionally and approximately perpendicular to a main optical axis of a projection lens system and said object to be projected, each of the plurality of lens elements having a shape approximately similar to a shape of said object to be projected, said plurality of lens elements being approximately similar in shape for dividing light into a plurality of light fluxes;
    a first lenticule having a plurality of cylindrical lenses disposed such that light passing through the respective lens elements of said lens plate is condensed;
    a second lenticule disposed subsequent to said first lenticule and having a plurality of cylindrical lenses arranged in a direction perpendicular to the direction in which said plurality of cylindrical lenses of said first lenticule are arranged; and
    at least one convex lens disposed so as to refract a light path of the light flux formed by each of the plurality of lens elements of said lens plate so that said light flux illuminates an entire surface of said object to be projected after passing through said first and second lenticules.

2. The device as claimed in claim 1, wherein:
    said reflection mirror comprises a spheroid mirror having said light-emitting unit disposed therein near a first focal point thereof;
    said device further comprises a second convex lens disposed outside of a focal point of said spheroid mirror; and
    said lens plate is disposed towards said object to be projected with respect to said second convex lens.

3. The device as claimed in claim 1, further comprising a polarization aligning prism array having polarization separating prisms and total reflection prisms arranged alternately, and λ/2-phase-difference plates arranged for light fluxes of one type of two types obtained from said polarization separating prisms, wherein the particular cylindrical lenses of said first lenticule are made to correspond to the particular polarization separating prisms, an arrangement is made such that all the light fluxes passing through said particular cylindrical lenses pass through approximately the corresponding polarization separating prisms, and, thus, random light fluxes are made to be polarized components of only one type,
    wherein said second lenticule is disposed subsequent to said polarization aligning prism array.

4. The device as claimed in claim 3, wherein:
    said at least one reflection mirror comprises a spheroid mirror having said light-emitting unit disposed therein at or near a first focal point thereof;
    said device further comprises another convex lens disposed outside of a second focal point of said spheroid mirror; and
    said lens plate is disposed on the side of said object to be projected with respect to said other convex lens.

5. The device as claimed in claim 3, wherein:
    at least one cylindrical lens of said first lenticule has a wider aperture near the center of said at least one cylindrical lens;
    said polarization aligning prism array has a size of a pair of prisms changed correspondingly to the aperture width of said at least one cylindrical lens of said first lenticule.

6. The device as claimed in claim 3, wherein said polarization aligning prism array has polarization separating prisms arranged symmetrically at the center thereof, and total reflection prisms arranged outside thereof, thus the entirety of said polarization aligning prism array including further outside thereof being symmetrical.

7. The device as claimed in claim 3, further comprising a polarization aligning unit comprising a combination of a polarization separating prism, a total revelation prism and a λ/2-phase-difference plate, disposed on the side of said object to be projected with respect to said reflection mirror for condensing light and making random light fluxes be polarized components of one type, wherein said lens plate is disposed on the side of said object to be projected with respect to said polarization aligning unit.

8. The device as in claim 7, wherein:
said at least one reflection mirror comprises a spheroid mirror, said spheroid mirror having said light emitting unit disposed near a first focal point of said spheroid mirror; and
said device further comprising a second convex lens disposed outside of a second focal point of said spheroid mirror.

9. The device as claimed in claim 7, wherein a central wavelength of said $\lambda/2$-phase-difference plate of said polarization aligning unit coincides with a central wavelength of said $\lambda/2$-phase-difference plates of said polarization aligning prism array.

10. The device as claimed in claim 7, wherein a central wavelength of said $\lambda/2$-phase-difference plate of said polarization aligning unit and a central wavelength of said $\lambda/2$-phase-difference plates of said polarization aligning prism array are different to the amounts of ± a predetermined wavelength from a green wavelength, respectively.

11. The device as claimed in claim 1, wherein at least one cylindrical lens of said first lenticule has a wider aperture near the center of said at least one cylindrical lens.

12. The device as claimed in claim 1, wherein at least one cylindrical lens of said second lenticule has a wider aperture near the center of said at least one cylindrical lens.

13. The illumination system as in claim 1 further comprising:
at least one liquid crystal panel in which an image to be projected is formed by an information display system;
said liquid crystal panel regarded as said object to be projected; and
a projection lens system for projecting the image formed in said liquid crystal panel onto a screen.

14. An illumination system comprising:
at least one light-emitting unit;
a unit forming an approximately parallel light;
a unit condensing the approximately parallel light and forming a focal point;
a first convex lens disposed outside of said focal point;
a lens plate having a plurality of lens elements, said lens plate disposed, with respect to said first convex lens, on the side of an object to be projected and away from said light-emitting unit, said lens plate arranged two-dimensionally and approximately perpendicular to a main optical axis of a projection lens system and said object to be projected, each of said plurality of lens elements having a shape approximately similar to a shape of said object to be projected, said plurality of lens elements being approximately similar for dividing light into a plurality of light fluxes;
a first lenticule having a plurality of cylindrical lenses disposed such that light passing through the respective lens elements of said lens plate is condensed;
a second lenticule disposed subsequent to said first lenticule and having a plurality of cylindrical lenses arranged in a direction perpendicular to the direction in which said plurality of cylindrical lenses of said first lenticule are arranged; and
at least one convex lens disposed so as to refract a light path of the light flux formed by each of the plurality of lens elements of said lens plate so that said light flux illuminates an entire surface of said object to be projected after passing through said first and second lenticules.

15. The device as claimed in claim 14, further comprising a polarization aligning prism array having polarization separating prisms and total reflection prisms arranged alternately, and $\lambda/2$-phase-difference plates arranged for light fluxes of one type of two types obtained from said polarization separating prisms, wherein the particular cylindrical lenses of said first lenticule are made to correspond to the particular polarization separating prisms, an arrangement is made such that all the light fluxes passing through said particular cylindrical lenses pass through approximately the corresponding polarization separating prisms, and, thus, random light fluxes are made to be of polarized components of only one type,
wherein said second lenticule is disposed subsequent to said polarization aligning prism array.

16. The device as claimed in claim 15, wherein:
at least one cylindrical lens of said first lenticule has a wider aperture near the center of said at least one cylindrical lens;
said polarization aligning prism array has a size of a pair of prisms changed correspondingly to the aperture width of said at least one cylindrical lens of said first lenticule.

17. The device as claimed in claim 15, wherein said polarization aligning prism array has polarization separating prisms arranged symmetrically at the center thereof, and total reflection prisms arranged outside. thereof, thus the entirety of said polarization aligning prism array including further outside thereof being symmetrical.

18. The device as claimed in claim 15, further comprising a polarization aligning unit comprising a combination of a polarization separating prism, a total revelation prism and a $\lambda/2$-phase-difference plate, and making random light fluxes be polarized components of one type,
wherein said lens plate is disposed on the side of said object to be projected with respect to said polarization aligning unit.

19. The device as claimed in claim 18, wherein a central wavelength of said $\lambda/2$,-phase-difference plate of said polarization aligning unit coincides with a central wavelength of said $\lambda/2$-phase-difference plates of said polarization aligning prism array.

20. The device as claimed in claim 18, wherein a central wavelength of said $\lambda/2$-phase-difference plate of said polarization aligning unit and a central wavelength of said $\lambda/2$-phase-difference plates of said polarization aligning prism array are different to the amounts of ± a predetermined wavelength from a green wavelength, respectively.

21. The device as claimed in claim 14, wherein at least one cylindrical lens of said first lenticule has a wider aperture near the center of said at least one cylindrical lens.

22. The device as claimed in claim 14, wherein at least one cylindrical lens of said second lenticule has a wider aperture near the center of said at least one cylindrical lens.

23. The illumination system as in claim 14 further comprising:
at least one liquid crystal panel in which an image to be projected is formed by an information display system;
said liquid crystal panel regarded as said object to be projected; and
a projection lens system for projecting the image formed in said liquid crystal panel onto a screen.

24. A projector comprising:
three reflection-type image forming members for forming an image to be projected by modulating a polarization state for each color region of a red region, a green region and a blue region;

a light source emitting light for illuminating said image forming members;

a polarization beam splitter disposed on a light path comprising both an incident light path from said light source to said image forming members and an emitted light path from said image forming members to a projection lens system, reflecting a polarized component in one of P-polarization and S-polarization of the light from said light source and transmitting a polarized component in the other polarization of the light in an approximately 90° different direction;

a dichroic prism disposed on a light path between said polarization beam splitter and said three image forming members, and having a dichroic film for red separating a long wavelength band of red light from a wavelength band shorter than green light and a dichroic film for blue separating a short wavelength band from a wavelength band longer than the green light, said dichroic prism acting as a color separating/color combining device having both a function of separating the light of the polarized component of one type obtained from said polarization beam splitter into a red region, a green region and a blue region and directing them to the corresponding image forming members, and a function of combining light of the respective regions having the polarization states modulated by the image forming members and then incident again thereto, wherein said dichroic film for red has the maximum reflectivity for a polarized component in one of S-polarization and P-polarization of the red light equal to or higher than 80% of the maximum reflectivity thereof for a polarized component in the other polarization of the red light, and said dichroic film for blue has the maximum reflectivity for a polarized component in one of S-polarization and P-polarization of the blue light equal to or higher than 80% of the maximum reflectivity thereof for a polarized component in the other polarization of the blue light; and wherein said dichroic prism has said dichroic film for red and dichroic film for blue arranged orthogonally, and, also, an arrangement is made such that incident light is incident on one of said dichroic film for red and dichroic film for blue with a predetermined incidence angle smaller than 45° while the incident light is incident on the other dichroic film with a predetermined incidence angle equal to or larger than 45°.

25. The projector as claimed in claim 24, wherein said dichroic prism has said dichroic film for red and dichroic film for blue arranged orthogonally, and, also, an incidence surface of said polarization beam splitter is approximately perpendicular to incidence surfaces of these dichroic films.

26. The projector as claimed in claim 24, wherein said dichroic prism has said dichroic film for red and dichroic film for blue arranged orthogonally, and, also, an arrangement is made such that incident light is incident on said dichroic film for red and dichroic film for blue with approximately equal shift angles.

27. The projector as claimed in claim 24, further comprising an illumination system having at least one pair of fly-eye lens plates on an incident light path from said light source to said polarization beam splitter.

28. The projector as claimed in claim 24, further comprising an illumination system having at least one fly-eye lens plate, a first lenticule having a plurality of cylinder lenses arranged and disposed such that light passing through said fly-eye lens plate is condensed, and a second lenticule disposed subsequent to said first lenticules and having a plurality of cylindrical lenses arranged in a direction perpendicular to a direction in which the plurality of cylindrical lenses of said first lenticule are arranged, on an incident light path from said light source to said polarization beam splitter.

29. The projector as claimed in claim 28, further comprising a polarization aligning device on a light path between said first and second lenticules, said polarization aligning device making random light fluxes be of polarized components of only one type.

30. A projector comprising:

three reflection-type image forming members for forming an image to be projected by modulating a polarization state for each color region of a red region, a green region and a blue region;

a light source emitting light for illuminating said image forming members;

a polarization beam splitter disposed on a light path comprising both an incident light path from said light source to said image forming members and an emitted light path from said image forming members to a projection lens system, reflecting a polarized component in one of P-polarization and S-polarization of the light from said light source and transmitting a polarized component in the other polarization of the light in an approximately 90® different direction; and a dichroic prism disposed on a light path between said polarization beam splitter and said three image forming members, and having a dichroic film for red separating a long wavelength band of red light from a wavelength band shorter than green light and a dichroic film for blue separating a short wavelength band from a wavelength band longer than the green light, said dichroic prism acting a color separating/color combining device having both a function of separating the light of the polarized component of one type obtained from said polarization beam splitter into a red region, a green region and a blue region and directing them to the corresponding image forming members, and a function of combining light of the respective regions having the polarization states modulated by the image forming members and then incident again thereto, wherein 10 nm$\leq|\lambda_{50P}-\lambda_{50S}|\leq$50 nm, where $\lambda_{50P}$ represents the wavelength at which the reflectivity of said dichroic film for red for P-polarized light becomes 50% and $\lambda_{50S}$ represents the wavelength at which the reflectivity thereof for S-polarized light becomes 50% in the wavelength band of 550 nm $\leq\lambda\leq$700 nm, and 10 nm $\leq|\lambda_{50P}-_{50S}|\leq$50 nm, where $\lambda_{50P}$ represents the wavelength at which the reflectivity of said dichroic film for blue for P-polarized light becomes 50% and $\lambda_{50S}$ represents the wavelength at which the reflectivity thereof for S-polarized light becomes 50% in the wavelength band of 400 nm $\leq\lambda\leq$550 nm.

31. The projector as claimed in claim 30, wherein said dichroic prism has said dichroic film for red and dichroic film for blue arranged orthogonally, and, also, an incidence surface of said polarization beam splitter is approximately perpendicular to incidence surfaces of these dichroic films.

32. The projector as claimed in claim 30, wherein said dichroic prism has said dichroic film for red and dichroic film for blue arranged orthogonally, and, also, an arrangement is made such that incident light is incident on said dichroic film for red and dichroic film for blue with approximately equal shift angles.

33. The projector as claimed in claim 30, wherein said dichroic prism has said dichroic film for red and dichroic film for blue arranged orthogonally, and, also, an arrangement is made such that incident light is incident on one of said dichroic: film for red and dichroic film for blue with a predetermined incidence angle smaller than 45° while the incident light is incident on the other dichroic film with a predetermined incidence angle equal to or larger than 45°.

34. The projector as claimed in claim 30, further comprising an illumination system having at least one pair of fly-eye lens plates on an incident light path from said light source to said polarization beam splitter.

35. The projector as claimed in claim 30, further comprising an illumination system having at least one fly-eye lens plate, a first lenticule having a plurality of cylinder lenses arranged and disposed at or near a position to which light passing through said fly-eye lens plate is condensed, and a second lenticule disposed subsequent to said first lenticules and having a plurality of cylindrical lenses arranged in a direction perpendicular to a direction in which the plurality of cylindrical lenses of said first lenticule are arranged, on an incident light path from said light source to said polarization beam splitter.

36. The projector as claimed in claim 35, further comprising a polarization aligning device on a light path between said first and second lenticules, said polarization aligning device making random light fluxes be of polarized components of only one type.

37. An illumination system comprising:

at least one light-emitting unit;

at least one reflecting mirror for condensing light;

a lens plate having a plurality of approximately identical lens elements, said lens plate disposed away from said light-emitting unit, said plurality of lens elements arranged two-dimensionally and approximately perpendicular to a main optical axis of a projection lens system and an object to be projected, each of the plurality of lens elements having a shape approximately similar to a shape of said object to be projected;

a first lenticule having a plurality of cylindrical lenses disposed such that light passing through the respective lens elements of said lens plate is condensed;

a second lenticule disposed subsequent to said first lenticule and having a plurality of cylindrical lenses arranged in a direction perpendicular to the direction in which said plurality of cylindrical lenses of said first lenticule are arranged; and at least one convex lens disposed so as to refract a light path of the light flux formed by each of the plurality of lens elements such that said light flux illuminates a surface of said object to be projected after passing through said first and second lenticules.

* * * * *